(12) United States Patent
Yager et al.

(10) Patent No.: US 10,282,785 B1
(45) Date of Patent: May 7, 2019

(54) DELIVERY OF CUSTOMIZED INSURANCE PRODUCTS AND SERVICES

(75) Inventors: Floyd M. Yager, Park Ridge, IL (US);
Thomas J. Wilson, Chicago, IL (US);
Pablo Azar, Winnetka, IL (US);
Edward A. Biemer, Glencoe, IL (US);
Jeremy Frank, Chicago, IL (US);
Mark David Pitchford, Evanston, IL (US); Robert Wasserman, Wheaton, IL (US)

(73) Assignee: Allstate Insurance Company, Northbrook, IL (US)

( * ) Notice: Subject to any disclaimer, the term of this patent is extended or adjusted under 35 U.S.C. 154(b) by 1026 days.

(21) Appl. No.: 13/278,432

(22) Filed: Oct. 21, 2011

Related U.S. Application Data

(63) Continuation-in-part of application No. 13/112,825, filed on May 20, 2011, now abandoned, which is a continuation of application No. 12/959,108, filed on Dec. 2, 2010, now Pat. No. 8,219,426, which is a continuation of application No. 12/903,861, filed on Oct. 13, 2010, now Pat. No. 8,046,246, which is a continuation of application No. 12/793,325, filed on
(Continued)

(51) Int. Cl.
*G06Q 40/08* (2012.01)
*G06Q 10/10* (2012.01)
*G06Q 30/02* (2012.01)

(52) U.S. Cl.
CPC ............. *G06Q 40/08* (2013.01); *G06Q 10/10* (2013.01); *G06Q 30/02* (2013.01)

(58) Field of Classification Search
CPC .... G06Q 40/08; G06Q 30/02; G06Q 30/0601; G06Q 10/10
USPC ........................................................ 705/2–4
See application file for complete search history.

(56) References Cited

U.S. PATENT DOCUMENTS

| 4,567,359 A | 1/1986 | Lockwood |
|---|---|---|
| 4,667,336 A | 5/1987 | Best |

(Continued)

FOREIGN PATENT DOCUMENTS

| CA | 2231459 | 2/1997 |
|---|---|---|
| CA | 2235566 | 2/1998 |

(Continued)

OTHER PUBLICATIONS

Nationwide's Responses and Objections to Allstate's Second Set of RFPs Nos. 106-126. Filed May 20, 2013.
(Continued)

*Primary Examiner* — Joy Chng
(74) *Attorney, Agent, or Firm* — Banner & Witcoff, Ltd.

(57) ABSTRACT

Systems and methods provide customizable insurance according to consumer preferences and attributes. An enhanced attributes analysis server may analyze the attributes of a consumer and match these attributes with attributes of current customers of an entity managing the server. The insurance products/plans preferred by the matched customers may then be used to present insurance options to the consumer. In addition, the server may further customize insurance options based on answers to questions that relate to the consumer's specific situation. Further still, the consumer's social network may be used to understand insurance products/plans that may be preferred by the consumer.

21 Claims, 17 Drawing Sheets

Related U.S. Application Data

Jun. 3, 2010, now Pat. No. 8,046,244, which is a continuation of application No. 11/551,595, filed on Oct. 20, 2006, now Pat. No. 7,774,217, which is a continuation-in-part of application No. 11/270,611, filed on Nov. 10, 2005, now abandoned.

(60) Provisional application No. 60/629,318, filed on Nov. 19, 2004.

(56) References Cited

U.S. PATENT DOCUMENTS

| | | |
|---|---|---|
| 4,843,578 A | 6/1989 | Wade |
| 5,191,522 A | 3/1993 | Brosco et al. |
| 5,359,528 A | 10/1994 | Haendel et al. |
| 5,430,432 A | 7/1995 | Camhi et al. |
| 5,483,442 A | 1/1996 | Black et al. |
| 5,499,182 A | 3/1996 | Ousborne |
| 5,550,551 A | 8/1996 | Alesio |
| 5,638,273 A | 6/1997 | Coiner et al. |
| 5,752,236 A | 5/1998 | Sexton et al. |
| 5,797,134 A | 8/1998 | McMillan et al. |
| 5,845,256 A | 12/1998 | Pescitelli et al. |
| 5,864,305 A | 1/1999 | Rosenquist |
| 5,873,066 A | 2/1999 | Underwood et al. |
| 5,877,707 A | 3/1999 | Kowalick |
| 5,893,072 A | 4/1999 | Zizzamia |
| 5,950,169 A | 9/1999 | Borghesi et al. |
| 5,963,951 A * | 10/1999 | Collins .............. G06Q 10/10 |
| 6,026,364 A | 2/2000 | Whitworth |
| 6,029,139 A | 2/2000 | Cunningham et al. |
| 6,044,352 A | 3/2000 | Deavers |
| 6,064,970 A | 5/2000 | McMillan et al. |
| 6,092,047 A | 7/2000 | Hyman et al. |
| 6,185,540 B1 | 2/2001 | Schreitmuller et al. |
| 6,185,567 B1 | 2/2001 | Ratnaraj et al. |
| 6,397,212 B1 | 5/2002 | Biffar |
| 6,466,919 B1 | 10/2002 | Walker et al. |
| 6,502,020 B2 | 12/2002 | Lang |
| 6,735,569 B1 | 5/2004 | Wizig |
| 6,795,759 B2 | 9/2004 | Doyle |
| 6,795,795 B2 | 9/2004 | Doyle |
| 6,868,386 B1 | 3/2005 | Henderson et al. |
| 6,925,441 B1 | 8/2005 | Jones et al. |
| 6,978,249 B1 | 12/2005 | Beyer et al. |
| 6,980,098 B2 | 12/2005 | Shinada et al. |
| 7,035,935 B1 | 4/2006 | Voois et al. |
| 7,188,070 B2 | 3/2007 | Dar et al. |
| 7,333,939 B1 | 2/2008 | Stender et al. |
| 7,346,525 B1 | 3/2008 | Milanovich |
| 7,366,675 B1 | 4/2008 | Walker et al. |
| 7,398,218 B1 | 7/2008 | Bernaski et al. |
| 7,409,355 B1 | 8/2008 | Guyan et al. |
| 7,505,921 B1 | 3/2009 | Lukas et al. |
| 7,774,217 B1 | 8/2010 | Yager et al. |
| 7,904,327 B2 | 3/2011 | Phelan et al. |
| 7,941,329 B2 | 5/2011 | Kenedy et al. |
| 8,046,244 B1 | 10/2011 | Yager et al. |
| 8,046,246 B1 | 10/2011 | Yager et al. |
| 8,219,426 B1 | 7/2012 | Yager et al. |
| 8,219,427 B1 | 7/2012 | Yager et al. |
| 2001/0014868 A1 | 8/2001 | Herz et al. |
| 2001/0042002 A1 | 11/2001 | Koopersmith |
| 2001/0044733 A1 | 11/2001 | Lee et al. |
| 2002/0002475 A1 | 1/2002 | Freedom et al. |
| 2002/0002502 A1 * | 1/2002 | Maes .............. G06Q 30/02 705/26.7 |
| 2002/0004730 A1 | 1/2002 | Yoshioka et al. |
| 2002/0007289 A1 | 1/2002 | Malin et al. |
| 2002/0010598 A1 | 1/2002 | Johnson et al. |
| 2002/0010599 A1 | 1/2002 | Levison |
| 2002/0013754 A1 | 1/2002 | Frank et al. |
| 2002/0032586 A1 | 3/2002 | Joao |
| 2002/0035488 A1 | 3/2002 | Aquila et al. |
| 2002/0049617 A1 | 4/2002 | Lencki et al. |
| 2002/0087364 A1 | 7/2002 | Lerner et al. |
| 2002/0095316 A1 | 7/2002 | Toan et al. |
| 2002/0099596 A1 | 7/2002 | Geraghty |
| 2002/0103677 A1 | 8/2002 | Sexton et al. |
| 2002/0103678 A1 | 8/2002 | Burkhalter et al. |
| 2002/0111725 A1 | 8/2002 | Burge |
| 2002/0116228 A1 | 8/2002 | Bauer et al. |
| 2002/0116231 A1 * | 8/2002 | Hele .............. G06Q 10/10 705/4 |
| 2002/0120474 A1 | 8/2002 | Hele et al. |
| 2002/0120476 A1 | 8/2002 | Labelle et al. |
| 2002/0128882 A1 | 9/2002 | Nakagawa et al. |
| 2002/0143680 A1 * | 10/2002 | Walters .............. G06Q 30/02 705/36 R |
| 2002/0152115 A1 | 10/2002 | Morita et al. |
| 2002/0161779 A1 | 10/2002 | Brierley et al. |
| 2002/0178033 A1 | 11/2002 | Yoshioka et al. |
| 2002/0188480 A1 | 12/2002 | Liebeskind et al. |
| 2002/0188484 A1 * | 12/2002 | Grover .............. G06Q 40/00 705/4 |
| 2002/0194033 A1 | 12/2002 | Huff |
| 2003/0105682 A1 | 6/2003 | Dicker et al. |
| 2003/0139985 A1 | 7/2003 | Hollar et al. |
| 2003/0171959 A1 | 9/2003 | Galloway |
| 2003/0177032 A1 | 9/2003 | Bonissone et al. |
| 2003/0182165 A1 | 9/2003 | Kato et al. |
| 2003/0187702 A1 | 10/2003 | Bonissone et al. |
| 2003/0187704 A1 | 10/2003 | Hashiguchi et al. |
| 2004/0024619 A1 | 2/2004 | DiBella |
| 2004/0039503 A1 | 2/2004 | Doyle |
| 2004/0039609 A1 | 2/2004 | Burkitt |
| 2004/0039610 A1 | 2/2004 | Weitermann et al. |
| 2004/0103022 A1 * | 5/2004 | Chilcoat, III .......... G06Q 30/02 705/14.16 |
| 2004/0103065 A1 * | 5/2004 | Kishen ............. G06Q 20/382 705/64 |
| 2004/0117217 A1 | 6/2004 | Reber et al. |
| 2004/0133542 A1 | 7/2004 | Doerksen et al. |
| 2004/0153362 A1 | 8/2004 | Bauer et al. |
| 2004/0193455 A1 | 9/2004 | Kellington |
| 2004/0230459 A1 | 11/2004 | Dordick et al. |
| 2004/0230460 A1 | 11/2004 | Thomas et al. |
| 2004/0249643 A1 | 12/2004 | Ouyang et al. |
| 2004/0260579 A1 | 12/2004 | Tremiti |
| 2005/0102172 A1 | 5/2005 | Sirmans |
| 2005/0108064 A1 | 5/2005 | Castleman et al. |
| 2005/0137913 A1 | 6/2005 | Laning et al. |
| 2005/0267774 A1 | 12/2005 | Merritt et al. |
| 2006/0041454 A1 | 2/2006 | Matisonn et al. |
| 2006/0053038 A1 | 3/2006 | Warren et al. |
| 2006/0059020 A1 | 3/2006 | Davidson |
| 2006/0074724 A1 | 4/2006 | Schwartz et al. |
| 2006/0106670 A1 * | 5/2006 | Cai .............. G06O 30/02 705/13 |
| 2006/0143053 A1 | 6/2006 | Van Rensburg |
| 2006/0155587 A1 | 7/2006 | Sparrow |
| 2006/0253307 A1 | 11/2006 | Warren et al. |
| 2007/0027726 A1 | 2/2007 | Warren et al. |
| 2007/0100668 A1 | 5/2007 | Webb |
| 2007/0118411 A1 | 5/2007 | Conner, III et al. |
| 2007/0136104 A1 | 6/2007 | Bowen et al. |
| 2007/0136109 A1 | 6/2007 | Yager et al. |
| 2011/0029366 A1 | 2/2011 | Bernstein |
| 2011/0178908 A1 | 7/2011 | Benefield et al. |

FOREIGN PATENT DOCUMENTS

| | | |
|---|---|---|
| CA | 2321459 | 4/2001 |
| EP | 1050853 | 11/2000 |
| EP | 1313043 | 5/2003 |
| EP | 1557779 | 7/2005 |
| EP | 1557780 | 7/2005 |
| EP | 1746537 | 1/2007 |
| EP | 1160707 | 2/2009 |
| EP | 1083510 | 3/2011 |
| FR | 2801262 | 5/2001 |
| GB | 2143978 | 2/1985 |
| JP | 4182868 | 6/1992 |

(56) References Cited

FOREIGN PATENT DOCUMENTS

| | | |
|---|---|---|
| JP | 02117237 | 4/2002 |
| JP | 02149984 | 5/2002 |
| JP | 02203108 | 7/2002 |
| JP | 2003-168006 A | 6/2003 |
| JP | 2004249552 | 9/2004 |
| JP | 168006 | 6/2006 |
| JP | 2006168006 | 6/2006 |
| JP | 0341537 | 12/2006 |
| JP | 257602 | 10/2007 |
| JP | 2007257602 | 10/2007 |
| KR | 02045186 | 6/2002 |
| KR | 020075327 | 10/2002 |
| KR | 20020075327 | 10/2002 |
| KR | 02091629 | 12/2002 |
| KR | 03043196 | 6/2003 |
| KR | 20020091629 | 6/2003 |
| KR | 20030043196 | 6/2003 |
| WO | 9727561 | 1/1997 |
| WO | 139090 | 5/2001 |
| WO | 0184427 | 11/2001 |
| WO | 0203163 | 1/2002 |
| WO | 0215090 | 2/2002 |
| WO | 2002015079 A1 | 2/2002 |
| WO | 0221375 | 3/2002 |
| WO | 079919 | 10/2002 |
| WO | 02086422 | 10/2002 |
| WO | 02088889 | 11/2002 |
| WO | 015535 | 2/2004 |
| WO | 2004015535 | 2/2004 |
| WO | 044696 | 5/2004 |
| WO | 2004044696 | 5/2004 |
| WO | 016350 | 2/2008 |
| WO | 2008016350 | 2/2008 |
| WO | 054722 | 5/2008 |
| WO | 2008054722 | 5/2008 |
| WO | 2009006617 | 1/2009 |

OTHER PUBLICATIONS

Nationwide's Responses and Objections to Allstate Second Set of Interrogatory Nos. 10-12. Filed May 20, 2013.
Allstate's Responses to Nationwide's Second Set of Interrogatories Nos. 11-18. Filed Jun. 17, 2013.
Allstate's Responses to Nationwide's Third Set of Interrogatories Nos. 19-20. Filed Jun. 24, 2013.
Allstate's Responses to Nationwide's Third Set of Requests for Production of Documents Nos. 57-132. Filed Jun. 24, 2013.
Notice of Deposition & Document Production Subpoena of Electric Insurance Company. Filed Jul. 29, 2013.
Nationwide's Notice of Deposition of American Modern Insurance Group—Subpoena (w/exhibits). Filed Jul. 30, 2013.
Nationwide's Notice of Deposition of AMIG. Filed Jul. 30, 2013.
Nationwide's Notice of Deposition & Subpoena to Metropolitan Property & Casualty Insurance Company. Filed Aug. 2, 2013.
Atlantic Mutual Companies—Notice of Insurance Information Practices Includes the text "ATL12-0401".
New Jersey Internal Appeals Procedure Includes the text "ATL16 0902".
New Jersey Third Party Designation Notice Includes the text "ATL17-0902".
New Jersey Coverage Selection Form Includes the text "AUTO95-0704".
New Jersey Personal Injury Protection—Decision Point Review/Pre-Certification Plan Notice Includes the text "AUTO99-0902".
Automobile Insurance Consumer Bill of Rights Includes the text "Auto 187 (06-04) UNIFORM".
New Jersey Auto Insurance Buyer's Guide Includes the text "V411k (06-04), Auto 94 (06-04) UNIFORM".
Introduction: Important Information About Your Home Policy Includes the text "HOME-0606".
Introduction: Important Information About Your Auto Policy Includes the text "AUTO-0701".
Introduction: Important Information About Your Personal Umbrella Policy Includes the text "UMBRELLA-0701".
Countrywide Insurance Group—Your Privacy At Countrywide Insurance Group Includes the text "Corporate Privacy Policy Notice Effective Date: Dec. 2004".
New Jersey Internal Appeals Procedure Includes the text "ATL 16/0606".
New Jersey Earthquake Insurance Availability Notice Includes the text "HOME1 DD-D2D3".
Water Back-Up of Sewers or Drains Includes the text "HOME22-0205".
Lender's Loss Payable Endorsement Includes the text "HOME41-1298".
Home Deductible Reserve Includes the text "HOME56-0802".
New Jersey Home Endorsement Includes the text "HOME69-09/03".
New Jersey Workers' Compensation and Employers' Liability Insurance Includes the text "HOME72-0902".
New Jersey Notice Regarding Flood Damage Coverage Includes the text "HOME75-0902".
Limited Coverage for Fungi, Wet or Dry Rot, or Bacteria Includes the text "HOME79-0902".
Loss Payable Clause Includes the text "AUT014-1298".
New Jersey Coverage Selection Form Includes the text "AUT095-0704".
New Jersey Rating Information Form Includes the text "AUT096-0104".
New Jersey Auto Endorsement Includes the text "AUT097-0104".
New Jersey Uninsured Motorists Coverage—Single Limit Includes the text "AUTO 101 (0104)".
New Jersey Personal Injury Protection Coverage Includes the text "Copyright, Insurance Services Office, Inc., 2003".
Corvel—Information Sheet: Overview of the Provisions of the NJ Automobile Insurance Cost Reduction Act Includes the text "Aut099-0606/PL 194B (Jun. 2006)".
Loss of Use of Your Car Includes the text "Auto11-1298".
Auto Deductible Reserve—Comprehensive Coverage Includes the text "AUT082-0802".
Auto Deductible Reserve—Collision Coverage Includes the text "AUT083-0802".
New Jersey Umbrella Endorsement Includes the text "Umbrella 13-0902".
Atlantic Master Plan—Policy Holder Portfolio Includes the text "AMPA9 (Jul. 1996)".
Corvel—Information Sheet: Overview of the Provisions of the NJ Automobile Insurance Cost Reduction Act Includes the text "Aut099-0904IPL 1948 (Sep. 2004)".
Introduction: Important Information About Your Home Policy Includes the text "HOME-0801".
Final Rejection dated Jun. 12, 2012 for U.S. Appl. No. 12/426,667.
Epinions, Progressive Group—Auto Review, Jan. 2, 2001, pp. 1-4.
U.S. Office Action dated Aug. 28, 2013 in U.S. Appl. No. 13/730,079.
Non-Final Rejection dated Oct. 10, 2013 for U.S. Appl. No. 11/774,423.
Non-Final Rejection dated Oct. 15, 2013 for U.S. Appl. No. 13/353,218.
Notice of Allowance and Fees Due dated Jun. 5, 2013 for U.S. Appl. No. 13/353,218.
Notice of Allowance and Fees Due dated Feb. 15, 2013 for U.S. Appl. No. 13/353,218.
Notice of Allowance dated Fees Due dated Dec. 21, 2012 for U.S. Appl. No. 13/353,218.
Amendment/Request Reconsideration After Final Rejection filed on Dec. 12, 2012 for U.S. Appl. No. 12/426,667.
Amendment/Request Reconsideration After Non-Final Rejection filed on Jan. 22, 2014 in U.S. Appl. No. 13/730,079.
Examiner Interview Summary Record Mail Room Date Dec. 20, 2013 for U.S. Appl. No. 13/730,079.
Amendment/Request Reconsideration After Non-Final Rejection filed on Nov. 25, 2013 for U.S. Appl. No. 13/730,079.

(56) References Cited

OTHER PUBLICATIONS

Amendment/Request Reconsideration After Non-Final Rejection filed on Oct. 18, 2013 in U.S. Appl. No. 14/018,913.
Notice of Allowance and Fees Due dated Feb. 14, 2013 for U.S. Appl. No. 13/112,825.
Notice of Allowance and Fees Due dated Oct. 11, 2012 for U.S. Appl. No. 13/112,825.
Non-Final Rejection dated Nov. 20, 2013 for U.S. Appl. No. 13/905,957.
Notice of Allowance and Fees Due dated Jun. 4, 2013 for U.S. Appl. No. 13/353,232.
Notice of Allowance and Fees Due dated Feb. 20, 2013 for U.S. Appl. No. 13/353,232.
Notice of Allowance and Fees Due dated Dec. 21, 2012 for U.S. Appl. No. 13/353,232.
Kansas State Filing Transmittal and Approval Notice. Allstate Insurance Company. Filing No. R14198. Date: Jul. 14, 2003.
Nebraska State Filing Transmittal and Approval Notice. Allstate Insurance Company. Filing No. R14222. Date: Jun. 6, 2003.
Nebraska State Filing Transmittal and Approval Notice. Allstate Property and Casualty Insurance Company. Filing No. R14223. Date: Jun. 6, 2003.
Colorado State Filing Transmittal and Approval Notice. Allstate Insurance Company. Filing No. R14728. Date: Nov. 5, 2003.
Final Rejection from USPTO dated Mar. 5, 2014 for U.S. Appl. No. 13/730,079.
Amendment/Request Reconsideration After Non-Final Rejection filed on Mar. 10, 2014 in U.S. Appl. No. 11/774,423.
Amendment/Request Reconsideration After Non-Final Rejection filed on Mar. 12, 2014 in U.S. Appl. No. 13/353,218.
Amendment/Request Reconsideration After Non-Final Rejection filed on Mar. 18, 2014 in U.S. Appl. No. 14/018,913.
"Background—Universal Auto vs. Allstate® Your Choice Auto." Jun. 22, 2004.
"Idaho Allstate Your Choice Auto ALSTAR Enhancements." 2003.
"Idaho Your Choice Auto:" Jul. 2003.
"Allstate Your Choice Auto 2003." 2003.
Email. "FW: Your Choice Auto—Product Cluster and Strategy Development." Sent. Oct. 21, 2003.
Email. "FW: MSMT Needs for Your Choice Auto—Northeast." Sent May 11, 2004.
Memo. "Your Choice Auto Pricing." Nov. 1, 2003.
Mutual Policy Conditions Includes the text "ATL1-0101".
New Jersey Earthquake Insurance Availability Notice Includes the text "HOME 100 (Feb. 2003)".
Water Back-Up of Sewers or Drains Includes the text "HOME22-0701".
Lender's Loss Payable Endorsement Includes the text (rev. May 1, 1942).
Limited Coverage for Fungi, Wet or Dry Rot, or Bacteria Includes the text "HOME79-0802".
Loss of Use of Your Car Includes the text "Aut011-1298".
Additional Interest—Part II: Your Liability Coverage Includes the text "AUT012-0199".
Replacement Cost Coverage Includes the text "AUT079-0801".
New Jersey Internal Appeals Procedure Includes the text "PL296(Jan. 2002)".
Agreed Value Boat Coverage Includes the text "AMP583 (Jun. 2001)".
Atlantic Mutual Companies—Notice of Insurance Information Practices Includes the text "PL258 (Apr. 2001)".
Replacement Cost for Your Cars Includes the text "AMP 101 (Jan. 1983)".
Additional Interest—Part III Your Liability Coverage Includes the text "AMP89B (Dec. 1998)".
Notice Regarding Flood Damage Coverage—New Jersey Includes the text "PL 256 (Dec. 2000)".
$2500 Deductible Reserve Fund Includes the text "AMP 158A (Nov. 1994)".

New Jersey—Amendatory Cancellation and Nonrenewal Endorsement Includes the text "AMP4848 (Jan. 1997)".
New Jersey Workers Compensation and Employers Liability Coverage for Residence Employees Endorsement Includes the text "AMP149A (Dec. 1999)".
Policyholder Notice—Your Atlantic Master Plan is Different Please Read It Includes the text "AMP579 (May 2001)".
Road Service Includes the text "AMP570 (Jul. 2000)".
New Jersey Umbrella Coverage Include the text "AMP561 (Apr. 1999)".
New Jersey Personal Injury Protection (PIP) Decision Point Review/Pre-Certification Plan Includes the text "PL 194A (Mar. 2001)".
Uninsured/Underinsured Motorists Coverage Exclusion Endorsement Includes the text "V476 (2-88)".
Personal Injury Protection Coverage (Standard Personal Auto Policy)—New Jersey Includes the text "V475G(Jun. 2001)".
Coverage Selection Form Includes the text "AMP270a (Oct. 1999)".
Uninsured Motorists Coverage—New Jersey Includes the text "AMP529A (Mar. 1999)".
Rating Information—New Jersey Includes the text "V6638 (Mar. 1999)".
Amendment of Policy Provisions Physical Damage Coverages—New Jersey Includes the text "V571 (ED Jun. 1991)".
Electric Insurance Company—Preferred Customer Club—Great Rewards for Exceptional Driver includes the text "PCC-OVER-0102".
Electric Insurance Company—Letter to Customer re Preferred Customer Club includes the text "PCC-REN-0402".
Electric Insurance Company—Web screen shots from EIC website regarding insurance quote includes the text "PCC-OVER-0102".
Amendment/Request Reconsideration After Non-Final Rejection filed on Apr. 21, 2014 for U.S. Appl. No. 13/905,957.
Amendment/Request Reconsideration After Final Rejection filed on Apr. 24, 2014 for U.S. Appl. No. 13/730,079.
BNO's Bulletin Board System: Bus Conversion Insurance; [on-line] [retrieved on Nov. 26, 2012]. Retrieved from the internet: <URL: http://www.busnut.com/bbs/messages/233/6472.html? 1089775175> p. 1-3 (Publication Date Alleged by Nationwide—2004) (includes text: "Posted on Sunday, Jun. 27, 2004").
Walters, Michael A., Homeowners Insurance Ratemaking; Retrieved from the internet: <URL: http://www.casact.org/pubs/proceed/proceed74/74015.pdf>p. 15-57 (Publication Date Alleged by Nationwide 1974)
Boone, Elisabeth, The Hartford Dimensions Plan Tracks Insureds Through Their Driving Lifetime, Retrieved from the internet: <URL: http://dialogweb.com/cgi/dwclient?req=1344540724699> (Publication Date Alleged by Nationwide—2004) (includes text: "Thursday, Jan. 1, 2004"); p. 1-6.
Lee, Yoong-Sin, On the Representation of Loss and Indemnity Distributions (Publication Date Alleged by Nationwide—1990); p. 204-224.
Mahul, Olivier, Optimal Insurance Design with Random Initial Wealth; (Publication Date Alleged by Nationwide—2000) (includes text: "Accepted on Jun. 15, 2000"); p. 1-6.
Vercammen, James, Optimal Insurance with Nonseparable Background Risk; (Publication Date Alleged by Nationwide—2001) (includes text: "Copyright the Journal of Risk and Insurance, 2001, vol. 68, No. 3") p. 437-448.
Temporary Archives—Towing and Hauling, Retrieved from the internet: <URL:http://www.thedieselstop.com/archives/ubbthreads/Towing1/showflat.php-Cat=&Number=6 . . . > (Publication Date Alleged by Nationwide—2001) (includes text: "All else copyright 1997-2001"); p. 1-16.
TeamTalk, General MasterCraft Topics, General Discussions, Insurance prices?—Retrieved from the internet: <URL: http://www.mastercraft.com/teamtalk/archive/index.php/t-512.html (Publication Date Alleged by Nationwide—2004) (includes text: "comments dated Sep. 2, 2004"); p. 1-4.
Josephson Gary R., et al. Crop-Hail Insurance Ratemaking: (Publication Date Alleged by Nationwide—1993); p. 155-201.
Enhanced Value Endorsement—Disappearing Collision Deductible—includes: Transmittal Header, Form Filing Transmittal, Explanatory

(56) References Cited

OTHER PUBLICATIONS

Memorandum and Cover letter; (Publication Date Alleged by Nationwide—2003) (includes text: "Filing date: Jul. 29, 2003"); p. 1-9.
Fishing Boat Insurance; Retrieved from the internet: <URL: http://web.archive.org/web/20030805201708/http:/watercraft.progressive.com/fish_bt_insrn . . . (Publication Date Alleged by Nationwide—2003); p. 1-2
Pleasure Boat Insurance—Retrieved from the Internet: <URL: http://web.archive.org/web/20030806001648/http:/watercraft.progressive.com/plese_bt_insr . . . (Publication Date Alleged by Nationwide—2003); p. 1.
Peterson, Brent—The Complete Idiot's Guide RVing, (Publication Date Alleged by Nationwide—2001); p. 1-2.
Steuer, Anthony, et al. Another Market-Conduct Maelstrom Brewing, (Publication Date Alleged by Nationwide—Apr. 2001) (includes text: "Copyright 2001, A.M. Best Company"); p. 1-4.
Insurance Companies Offer Discounts on Code Approved Windows and Doors Made With Impact Resistant Glass Solutia Inc.'s KeepSafe Maximum Meets Criteria; (Publication Date Alleged by Nationwide—Sep. 2004) (includes text: "Copyright 2004 PR Newswire"); p. 1-3.
Schreiner, John—Lost and found: A Vancouver firm hopes its online service will make it easier to get lost items back to their owners, (Publication Date Alleged by Nationwide—Sep. 2003) (includes text: "Copyright Ottawa Citizen 2001"); p. 1-3.
Finefrock, Don—Shutters May Mean Insurance Discounts: (Publication Date Alleged by Nationwide—Jul. 1994) (Incudes text: Copyright ? 2004, The Miami Herald . . . Jun. 16, 1994), p. 1-2.
Shore, David CBC's Fuzzy Logic (Publication Date Alleged by Nationwide—Jul. 1997) (includes text: "Copyright Vancouver Sun 1997"); p. 1-2.
Daid Yin,Hai-Tao—Risk-Based Pricing and Risk Prevention: Does the Private Insurance Market Help Reduce Underground Storage Tank (UST) Release Rates? (Publication Date Alleged by Nationwide—Nov. 2005) (includes text: "Copyright 2005 by Hai-Tao David Yin,"); p. 1-54.
Cheers & Jeers Editorial: Ashcroft, scams, Smokeout; (Publication Date Alleged by Nationwide—Nov. 2004) (includes text: "Copyright 2004 The Journal Gazette"); p. 1-2.
A PPO for Auto Work, (Publication Date Alleged by Nationwide—Aug. 1995) (includes text: "Copyright (1995) State-Record Co. (Columbia, SC)"); p. 1-2.
GTCC Offers Health Insurance Seminar, (Publication Date Alleged by Nationwide—Jan. 1991) (includes text: "Copyright 1991 2001 Greensboro News & Record"); p. 1-2.
Other Market News, (Publication Date Alleged by Nationwide—Oct. 2004) (includes text: "Copyright 2004 Commerce Publishing Company"); p. 1-2.
Atlantic Mutual Reduces Deductibles by 10% Each Year for Home, Auto Customers; Innovative Program Rewards Claim-Free Homeowners and Drivers; (Publication Date Alleged by Nationwide—Jul. 2004) (includes text: "Copyright 2004 PR Newswire Association, Inc,"); p. 1-2.
A Directory of Markets for Truck Insurance; (Publication Date Alleged by Nationwide—Oct. 2003) (includes text: "Copyright 2003 ProQuest Information and Learning Company"); p. 1-10.
Nationwide Insurance Banner; Retrieved from the Internet: <URL: http://web.archive.org/web/19970714132736fw_/http://www.nationwide.com/main.html—(includes text: "Copyright 1996, 1997 Nationwide Mutual Insurance Company").
Nationwide Insurance Agency Locator—Retrieved from the internet: <URL: http://web.archive.org/web/19970714135530/http://www.nationwide.com/nationwide/locat . . . (includes text: "Copyright 1997 Nationwide Insurance Enterprise").
Nationwide Auto Insurance for Maximum Protection and Value; Retrieved from the Internet: <URL: http://web.archive.org/web/19980523213338/http://www.nationwide.com/nationwide/prod . . . (includes text: "Copyright 1996-1998 Nationwide Mutual Insurance Company").
Auto Insurance Quote Request; Retrieved from the internet: <URL: http://web.archive.org/web/19980523213305/http://www.nationwide.com/nationwide/prod. (includes text: "Copyright 1996-1998 Nationwide Mutual Insurance Company").
Nationwide Insurance Agency Locator; Retrieved from the intern0et: <URL: http://web.archive.org/web/19980523213311/http://www.nationwide.com/nationwide/locat . . . (includes text: "Copyright 1996-1998 Nationwide Mutual Insurance Company").
"Tuition Waiver Coverage", Thomas A. McCoy, Rough Notes, vol. 140, Jun. 1997, No. 6, 4 pages, ISSN: 0035-8525.
"Passengers Stranded by Cruise Line Covered by Travel Insurance Policy", PR Newswire, p. 0912, Sep. 15, 2000, Dialog File 16.
"Interviews with HO Claimants Pinpoint Needs", Roy C. McCormick, Rough Notes, Mar. 2002, 35 pages.
"Overlooked Coverages can help round out homeowner's insurance", Carol Stuck, Pittsburgh Business Times, Aug. 12, 2006, 4 pages.
"College Student Risks and Insurance Needs", Roy C. McCormick, Rough Notes, Oct. 2003.
High Point, N.C.—Area Homeowners Weigh Filing Policies in Wake of Storm published on Dec. 16, 2002 in High Point Enterprise—from Knight-Ridder Tribune Business News. From Dialog File 20 (Dialog Global Reporter) (Dialog ID No. 26630651).
Defendants Nationwide Mutual Insurance Company's Nationwide Mutual Fire Insurance Company's, Nationwide General Insurance Company's and Nationwide Insurance Company of America's Initial Disclosures Filed Sep. 16, 2012—6 pages.
Allstate's Initial Disclosures Pursuant to Federal Rule of Civil Procedures 26(a)(1)(A) and Local Patent Rule 2.1 Filed on Filed Sep. 16, 2012—6 pages.
Memorandum of Law in Support of Defendants' Motion to Dismiss Allstate's Indirect Infringement Claims Pursuant to Fed.R. CIV. P. 12(b)(6) Filed on Aug. 31, 2012—10 pages.
Defendant's Motion to Dismiss Allstate's Indirect Infringement Claims Pursuant to Fed. R. CIV. P. 12(b)(6) Filed on Aug. 31, 2012—3 pages.
First Amended Complaint for Patent Infringement Filed on Aug. 6, 2012—71 pages.
Rhode Island Revised Index, Rules and Rates—"Date: Mar. 11, 2002"—Filing No. R13159; pp. 1-56.
Oregon Revised Rules and Rates "Date: Dec. 2, 2004"—Filing No. R15676; pp. 1-25.
Oregon Revised Rules "Date: Oct. 19, 2004"—Filing No. R15370; pp. 1-161.
Amendment/Request Reconsideration After Non-Final Reject filed on Aug. 15, 2012 for U.S. Appl. No. 11/774,423.
Non-Final Rejection dated May 18, 2012 for U.S. Appl. No. 11/774,423.
Amendment Submitted enter with filing of CPA/RCE filed on Mar. 9, 2012 for U.S. Appl. No. 11/774,423.
Final Rejection dated Sep. 13, 2011 for U.S. Appl. No. 11/774,423.
Amendment/Request Reconsideration After Non-Final Reject filed on Aug. 31, 211 for U.S. Appl. No. 11/774,423.
Non-Final Rejection dated Mar. 8, 2011 for U.S. Appl. No. 11/774,423.
Amendment Submitted Entered with Filing of CPA/RCE filed on Mar. 2, 2011 for U.S. Appl. No. 11/774,423.
Final Rejection dated Dec. 6, 2010 for U.S. Appl. No. 11/774,423.
Amendment/Request Reconsideration After Non-Final Rejection filed on Dec. 1, 2010 for U.S. Appl. No. 11/774,423.
Non-Final Rejection dated Sep. 7, 2010 for U.S. Appl. No. 11/774,423.
Amendment Submitted/Entered with Filing of CPA/RCE on Aug. 31, 2010 for U.S. Appl. No. 11/774,423.
Final Rejection dated Mar. 10, 2010 for U.S. Appl. No. 11/774,423.
Amendment/Request Reconsideration After Non-Final Rejection filed on Jan. 26, 2010 for U.S. Appl. No. 11/774,423.
Non-Final Rejection dated Nov. 4, 2009 for U.S. Appl. No. 11/774,423.
Advisory Action dated Sep. 10, 2009 for U.S. Appl. No. 11/774,423.
Amendment Submitted entered with Filing of CPA/RCE filed on Aug. 14, 2009 for U.S. Appl. No. 11/774,423.
Supplemental Final Rejection dated Jun. 17, 2009 for U.S. Appl. No. 11/774,423.
Final Rejection dated May 27, 2009 for U.S. Appl. No. 11/774,423.
Amendment/Request Reconsideration After Non-Final Rejection filed on Mar. 16, 2009 for U.S. Appl. No. 11/774,423.

(56) References Cited

OTHER PUBLICATIONS

Examiner Interview Summary Record dated Mar. 6, 2009 for U.S. Appl. No. 11/774,423.
Non-Final Rejection dated Oct. 15, 2008 for U.S. Appl. No. 11/774,423.
Non-Final Rejection dated Oct. 1, 2009 for U.S. Appl. No. 11/774,409.
Examiner Interview Summary Record dated Sep. 25, 2009 for U.S. Appl. No. 11/774,409.
Amendment/Request Reconsideration After Non-Final Rejection filed on Apr. 19, 2012 for U.S. Appl. No. 12/426,667.
Amendment/Request Reconsideration-After Non-Final Rejection filed on Jan. 3, 2012 for U.S. Appl. No. 12/426,667.
Non-Final Rejection dated Sep. 21, 2011 for U.S. Appl. No. 12/426,667.
Response to Amendment Under Rule 312 dated Jun. 9, 2010 for U.S. Appl. No. 11/551,595.
Amendment after notice of Allowance Rule dated Jun. 2, 2010 for U.S. Appl. No. 11/551,595.
Supplemental Notice of Allowability dated May 27, 2010 for U.S. Appl. No. 11/551,595.
Notice of Allowance and Fees Due dated May 17, 2010 for U.S. Appl. No. 11/551,595.
Amendment Submitted/Entered with Filing of CPA/RCE filed on Jan. 26, 2010 for U.S. Appl. No. 11/551,595.
Final Rejection dated Dec. 8, 2009 for U.S. Appl. No. 11/551,595.
Examiner Interview Summary Record dated Aug. 21, 2009 for U.S. Appl. No. 11/551,595.
Amendment/Request Reconsideration After Non-Final Rejection filed on Aug. 21, 2009 for U.S. Appl. No. 11/551,595.
Non-Final Rejection dated May 22, 2009 for U.S. Appl. No. 11/551,595.
Notice of Allowance and Fees Due dated Jul. 11, 2011 for U.S. Appl. No. 12/903,861.
Amendment/Request Reconsideration After Non-Final Rejection filed on May 5, 2011 for U.S. Appl. No. 12/903,861.
Non-Final Rejection dated Feb. 15, 2011 for U.S. Appl. No. 12/903,861.
Certificate of Correction dated Jun. 12, 2012 for U.S. Appl. No. 12/793,325.
Request for Certificate of Correction filed on May 9, 2012 for U.S. Appl. No. 12/793,325.
Notice of Allowance and Fees Due dated Jul. 5, 2011 for U.S. Appl. No. 12/793,325.
Amendment/Request Reconsideration After Non-Final Rejection filed on May 5, 2011 for U.S. Appl. No. 12/793,325.
Non-Final Rejection dated Feb. 15, 2011 for U.S. Appl. No. 12/793,325.
Notice of Allowance and Fees Due dated May 11, 2012 for U.S. Appl. No. 12/959,108.
Applicant Initiated Interview Summary dated Apr. 6, 2012 for U.S. Appl. No. 12/959,108.
Amendment/Request Reconsideration After Non-Final Rejection filed on Mar. 30, 2012 for U.S. Appl. No. 12/959,108.
Deductibles Endorsement—Part D, Coverage for Damage to Your Travel Trailer, American Modern Insurance Group, Inc.; includes the text "V855T 10/98".
American Modern Home Holiday Traveler Travel Trailer Program—Illinois; includes the text "V8TIL—Effective Date Jul. 1, 2003—Publication Date Mar. 18, 2013" [sic].
American Modern Home Leisure Guard Motor Home Program—Illinois; includes the text "V8OIL—Effective Date Jul. 1, 2002—Publication Date Mar. 18, 2013" [sic].
American Modern Home Holiday Traveler Travel Trailer Program; includes the text "V8TOH—Effective Date Jul. 1, 2001—Publication Date Mar. 6, 2001".
American Modern Home Holiday Traveler Travel Trailer Program—Ohio, Forms List; includes the text "V8TOH—Effective Date Feb. 1, 2002—Publication Date Oct. 23, 2001".
American Modern Home Leisure Guard Motor Home Program—Ohio; includes the text "V8OH—Effective Date Feb. 1, 2004—Publication Date Dec. 19, 2003".
American Modern Home Leisure Guard Motor Home Program—Ohio, Forms List; includes the text "V8OH—Effective Date Feb. 1, 2004—Publication Date Mar. 17, 2004".
Atlantic Master Plan—Forms Portfolio May 1988, Atlantic Mutual Insurance Company; includes the text "AMP 1D (May 1988)".
Atlantic Master Plan—Loss Assessment Coverage for Earthquake, Atlantic Mutual Insurance Company; includes the text "AMP 26A (Dec. 1985)".
Atlantic Master Plan—Condominium Renter to Others, Atlantic Mutual Insurance Company; includes the text "AMP 29 (Jan. 1983)".
Atlantic Master Plan—Unattached Structures Renter to Others, Atlantic Mutual Insurance Company; includes the text AMP 31 (Jan. 1983).
Atlantic Master Plan—Additional Insured-Residence Coverage, Atlantic Mutual Insurance Company; includes the text "AMP 32A (Jan. 1983)".
Atlantic Master Plan—Office, Professional, Private School or Studio Use—Other Structures, Atlantic Mutual Insurance Company; includes the text "AMP 33B (Dec. 1984)".
Atlantic Master Plan—Office, Professional, Private School or Studio Use—Other Residence, Atlantic Mutual Insurance Company; includes the text "AMP 34A (Jan. 1983)".
Atlantic Master Plan—Earthquake, Atlantic Mutual Insurance Company; includes the text "AMP 36B (Jul. 1987)".
Atlantic Master Plan—Incidental Farming Personal Liability, Atlantic Mutual Insurance Company; includes the text "AMP 40 (Jun. 1983)".
Atlantic Master Plan—Water Back Up of Sewers or Drains, Atlantic Mutual Insurance Company; includes the text "AMP 42A (Dec. 1984)".
Atlantic Master Plan—Credit for Existing Insurance Endorsement, Atlantic Mutual Insurance Company; includes the text "AMP 44 (Jan. 1983)".
Atlantic Master Plan—Personal Home Computer, Atlantic Mutual Insurance Company; includes the text "AMP 45A (Dec. 1984)".
Atlantic Master Plan—Loss of Use of Your Car, Atlantic Mutual Insurance Company; includes the text "AMP 82 (Dec. 1984)".
Atlantic Master Plan—Sound Equipment, Atlantic Mutual Insurance Company; includes the text "AMP 83 (Dec. 1984)".
Atlantic Master Plan—Business Pursuits, Atlantic Mutual Insurance Company; includes the text "AMP 86 (Dec. 1984)".
Atlantic Master Plan—Watercraft, Atlantic Mutual Insurance Company; includes the text "AMP 87 (Dec. 1984)".
Atlantic Master Plan—Additional Interest—Part III Your Liability Coverage, Atlantic Mutual Insurance Company; includes the text "AMP 89 (Dec. 1984)".
Atlantic Master Plan—Replacement Cost for Your Cars, Atlantic Mutual Insurance Company; includes the text "AMP 101 (Jan. 1983)".
Atlantic Master Plan—Full Coverage for Safety Glass, Atlantic Mutual Insurance Company; includes the text "AMP 102 (Jan. 1983)".
Atlantic Master Plan—Coverage for Recordings, Atlantic Mutual Insurance Company; includes the text "AMP 103 (Jan. 1983)".
Atlantic Master Plan—Deductible Reserve Fund, Atlantic Mutual Insurance Company; includes the text "AMP 158 (Dec. 1985)".
Atlantic Master Plan—Corporate Cars, Atlantic Mutual Insurance Company; includes the text "AMP 159 (Jul. 1986)".
Atlantic Master Plan—Added Coverage, Atlantic Mutual Insurance Company; includes the text "AMP 161 (Jul. 1986)".
Atlantic Master Plan—Named Peril Contents Coverage, Atlantic Mutual Insurance Company; includes the text "AMP 164 (Jul. 1986)".
Atlantic Master Plan—Camping Equipment Endorsement, Atlantic Mutual Insurance Company; includes the text "AMP 210 (Dec. 1987)".
Atlantic Master Plan—$5000 Deductible Reserve Fund, Atlantic Mutual Insurance Company; includes the text "AMP 223 (May 1988)".

(56) References Cited

OTHER PUBLICATIONS

"Seeing Auto and Homeowning Customers in a New Light", The Hartford; includes the text "© 2003 The Hartford, Hartford, CT 06115".
"New Dimensions in Personal Lines", Rough Notes Magazine Jan. 2004.
"Finding the Right Insurance", Paraplegia News Magazine Nov. 2000.
"Carving a Niche in the Mature Market" by John H. Lafayette, Best's Review includes the text " . . . Hanover Insurance Group and could expand its marketing to as many as 10 states by year-end 1984 . . . " and the text "The development of Mature Outlook was in the serious planning staged through most of 1983 . . . ".
Filing Postcard for Application for Systems and Methods for Customizing Insurance; dated Nov. 10, 2005.
Filing Postcard for New Application for Systems and Methods for Customizing Insurance; dated Nov. 10, 2005.
Filing Postcard for New U.S. Provisional Application for Systems and Methods for Customizing Insurance; dated Nov. 19, 2004.
Filing Postcard for New U.S. Provisional Application for Systems and Methods for Customizing Insurance; dated Nov. 29, 2004.
Filing Postcard for U.S. Appl. No. 60/629,318 for Systems and Methods for Customizing Insurance; dated Feb. 7, 2005.
Allstate's Responses to Nationwide's First Set of Interrogatories (Nos. 1-10), dated Oct. 15, 2012 Civil Action No. 1:12-CV-03609, N.D.I.L., Eastern Division, Judge Joan H. Lefkow [Subject to Protective Order].
Non-Final Rejection mailed from USPTO dated Jan. 11, 2012 for U.S. Appl. No. 12/959,108.
Anonymous—How Forgiving is your Auto Insurance? Changing Times (pre-1986); Nov. 1984; 38, 011; ABI/INFORM p. 42.
Zinkewica, Paul. Specialty Niche Programs Take on Increasing Importance for Growth-Orientated Agencies. Nov. 1994. Rough Notes. http://findarticles.com/p/articles/mi_qa3615/is_199411/ai_n8709928.
Goldmine Insurance Case Study. 2004. http://www.frontrange.com/common/Files/Downloads/Case_Studies/SMRM_Casestudies/SMRM_GoldMine_CaseStudyRAandRInusance_NA_EN.pdf.
Target Markets News and Information Newsletter. Feb. 2004. http://www.odbcworkz.com/htmlmail/targetmkts/febnews/feb04news.pdf.
Keller, Wolfgang. Some Patterns for Insurance Systems. 1998. http://www.objectarchitects.de/ObjectArchitects/papers/Published/ZippedPapers/inspat03.pdf.
Wikipedia Webpage on Focus Groups. May 8, 2004. http://web.archive.org/web/20040508214920/http://en.wikipedia.org/wiki/Focus_group.
Philadelphia Insurance Companies Webpages. Jan. 23, 2002. http://web.archive.org/web/20020123150654/http://phly.com.
Monroe, Melissa. Auto Insurance Driving Down Costs. Many Policy Holdersignore ways to Reduce Premiums. San Antonio Express News. San Antonio Texas, Jan. 6, 2003. p. 01.L.
Long Term Care Insurance Policy Optional Benefits. Insurance Planners Website. Aug. 12, 2004. http://web.archive.org/web/20040812182952/http://www.long-term-care-insurance-planners.com/optional_benefits.html.
Niche Insurance Companies. Stewart Economics, Inc. 1997. http://www.stewarteconomics.com/Niches.pdf.
Anonymous, How Forgiving Is Your Auto Insurance?, Nov. 1984, Changing Times, 38, 011, p. 42-44.
Non-Final Rejection mailed from USPTO dated Nov. 23, 2011 for U.S. Appl. No. 11/774,442.
Defendants' Initial Invalidity Contentions filed Nov. 9, 2012. p. 1-42.
Appendix 1 to Defendants' Initial Invalidity Contentions—The Accident Forgiveness References—Nov. 9, 2012 p. 1-3.
Appendix 2 to Defendants' Initial Invalidity Contentions—The Automobile References—Nov. 9, 2012—p. 1-5.
Appendix 3 to Defendants' Initial Invalidity Contentions—The Affects Premium References—Nov. 9, 2012—p. 1-5.
Appendix 4 to Defendants' Initial Invalidity Contentions—The Calculate Cost References—Nov. 9, 2012—p. 1-3.
Appendix 5 to Defendants' Initial Invalidity Contentions—The Upon Enrollment Reference—Nov. 9, 2012—p. 1-3.
Appendix 6 to Defendants' Initial Invalidity Contentions—The Computer References—Nov. 9, 2012—p. 1-5.
Attachment to Defendants' Initial Invalidity Contentions—Allied's Extra Coverages System—U.S. Pat. No. 8,046,246—Nov. 9, 2012—. p. 1-11.
Attachment to Defendants' Initial Invalidity Contentions—Allied's Extra Coverages System—U.S. Pat. No. 8,219,426—Nov. 9, 2012—p. 1-12.
Attachment to Defendants' Initial Invalidity Contentions—Allied's Extra Coverages System—U.S. Pat. No. 8,219,427—Nov. 9, 2012—p. 1-18.
Attachment to Defendants' Initial Invalidity Contentions—Atlantic Mutual's Home and Auto Insurance—U.S. Pat. No. 8,046,246—Nov. 9, 2012—p. 1-11.
Attachment to Defendants' Initial Invalidity Contentions—Atlantic Mutual's Home and Auto Insurance—U.S. Pat. No. 8,219,426—Nov. 9, 2012—p. 1-12.
Attachment to Defendants' Initial Invalidity Contentions—Atlantic Mutual's Home and Auto Insurance—U.S. Pat. No. 8,219,427—Nov. 9, 2012—p. 1-126.
Attachment to Defendants' Initial Invalidity Contentions—Hartford's Dimensions Auto Policy—U.S. Pat. No. 8,046,246—Nov. 9, 2012—p. 1-16.
Attachment to Defendants' Initial Invalidity Contentions—Hartford's Dimensions System—U.S. Pat. No. 8,219,426—Nov. 9, 2012—p. 1-18.
Attachment to Defendants' Initial Invalidity Contentions—Hartford's Dimensions Auto Policy—U.S. Pat. No. 8,219,427—Nov. 9, 2012—p. 1-28.
Attachment to Defendants' Initial Invalidity Contentions—Insurance Services Office's Disappearing Deductible Clause—U.S. Pat. No. 8,046,246.—Nov. 9, 2012—p. 1-12.
Attachment to Defendants' Initial Invalidity Contentions—Insurance Services Office's Disappearing Deductible Clause—U.S. Pat. No. 8,219,426. p. 1-14.
Attachment to Defendants' Initial Invalidity Contentions—Insurance Services Office's Disappearing Deductible Clause U.S. Pat. No. 8,219,427—Nov. 9, 2012—p. 1-24.
Attachment to Defendants' Initial Invalidity Contentions—Progressive's Boat Insurance—U.S. Pat. No. 8,046,246—Nov. 9, 2012—p. 1-19.
Attachment to Defendants' Initial Invalidity Contentions—Progressive's Boat Insurance—U.S. Pat. No. 8,219,426—Nov. 9, 2012—p. 1-21.
Attachment to Defendants' Initial Invalidity Contentions—Progressive's Boat Insurance—U.S. Patent No.—Nov. 9, 2012—U.S. Pat. No. 8,219,427 p. 1-33.
Attachment to Defendants' Initial Invalidity Contentions—Progressive's 2CoolFishing Boat Insurance—U.S. Pat. No. 8,046,246—Nov. 9, 2012—p. 1-23.
Attachment to Defendants' Initial Invalidity Contentions—Progressive's 2CoolFishing Boat Insurance—U.S. Pat. No. 8,219,426—Nov. 9, 2012—p. 1-22.
Attachment to Defendants' Initial Invalidity Contentions—Progressive's 2CoolFishing Boat Insurance—U.S. Pat. No. 8,219,427—Nov. 9, 2012—p. 1-40.
Wiening, Eric A., Foundations of Risk Management and Insurance Pennsylvania 2002—(Publication Date Alleged by Nationwide—2002), p. 1-142.
Henderson, Daniel J., Leisure Guard Motor Home Now Available in Connecticut—Marketing Bulletin (Publication Date Alleged by Nationwide—2001)—(includes text: "Dec. 21, 2001") p. 1.
Baldwin, Ben G. The Complete Book of Insurance: The Consumer's Guide to Insuring your Life, Health Property, and Income. Illinois (Publication Date Alleged by Nationwide —1996) (includes text: "Copyright Ben G. Baldwin, 1989, 1991 and 1996") p. 1-26.
Vaughan Emmett J.,et al., Fundamentals of Risk and Insurance; (Publication Date Alleged by Nationwide—2003) (includes text: " New York 2003"), p. 1-113.

(56) References Cited

OTHER PUBLICATIONS

Disappearing Deductible Clause—p. 1 (includes text: "(Ed. 05 77)").
Allied Extra Coverages p. 1-2 (includes text: "AA 0008 (Feb. 2007)").
Waiver of Collision Deductible p. 1 (includes text: "AA 0070 (Nov. 2003)").
Quote, Compare & Buy Auto Insurance—[on-line] [retrieved on Oct. 25, 2012] Retrieved from the internet: <URL: http://web.archive.org/web/20000304173417/http://progressive.com/icr/auto.cgi download Oct. 25, 2012> p. 1 (includes text: "Copyright 1995-2000").
Progressive Insurance Co. The Place to Insure your Motorhome! [on-line] [retrieved on Oct. 20, 2012] Retrieved from the Internet: <URL: http://www.epinions.com/review/finc-Insurance-All-Progressive_Group_-_Auto/finc-revi> (Publication Date Alleged by Nationwide—2001) (includes text: "Written: Oct. 24, 2000 (Updated Jan. 2, 2001)"), p. 1-2
Blue Water Links—[on-line] [retrieved on Oct. 30, 2012] Retrieved from the internet: <URL: <http://2coolfishing.com/ttmbforum/showthread.php?=2769> (Publication Date Alleged by Nationwide—Jul. 2004) (includes text: "Jul. 7, 2004"), p. 1-4.
Boat/Personal Watercraft 2003/2004 Product Guide & Underwriting Guidelines—(includes text: "Copyright 2003 Progressive Casualty Insurance Company") p. 1-17.
Appendices—Appendix A Extended Package Factors, Appendix B Repair or Replacement Cost Coverage, Appendix C Lease/Loan Gap Coverage, Appendix D Allstate Towing and Labor Costs Service, Appendix E Enhanced Accident Forgiveness, Appendix F $50,000 Automobile Death Indemnity Coverage, Appendix G Renewal Guarantee, Appendix I Basic Package Factor, Appendix J No Accident Forgiveness, Appendix K $30,00 Policy Fee, Appendix L $15.00 Late Payment Charge, Appendix M $100.00 Add, and Change, Replacement Car Charge. (April 2003 or earlier).
www.esurance.com, retrieved from web.archive.org, commitment.asp (Feb. 14, 2003), car_insurance_coverage.asp (Oct. 3, 2003), buy_auto_insurance_policy.asp (Mar. 5, 2003), auto_insurance_policy_changes.asp (Mar. 18, 2004).
D'Alesio-Tretle Insurance Services, www.dtins.com, retrieved from web.archive.org, auto.html (Jun. 21, 2003), autoxtras.html (Oct. 29, 2003).
Office Action from US Appl. No. 13/112,825, dated Apr. 12, 2012.
Complaint for Patent Infringement—Allstate Insurance Company vs. Nationwide Mutual Company, Nationwide Mutual Fire Insurance Company, Nationwide General Insurance Company, and Nationwide Insurance Company of America—Filed May 10, 2012—26 pages.
Office Action for U.S. Appl. No. 12/426,667 dated Jun. 12, 2012.
Sep. 13, 2006: Revised Hearing Notice Proposed Amendments to 211 CMR 134.00—Safe Driver Insurance Plan; dated: Aug. 21, 2006; p. 1-28. http://146.243.60.39/ocabr/business/insurance/doi-regulatory-info/doi-public-hearings/2006-doi-public-hearings/9-13-2006-revised-hearing-notice-proposed.html.
Amendment Submitted/Entered with filing of CPA/RCE dated Aug. 15, 2012 for U.S. Appl. No. 11/774,442.
Final Rejection dated May 21, 2012 for U.S. Appl. No. 11/774,442.
Amendment/Request Reconsideration After Non-Final Rejection filed on Mar. 1, 2012 for U.S. Appl. No. 11/744,442 .
Amendment Submitted/Entered with Filing of CPA/RCE filed on Jan. 26, 2010 for U.S. Appl. No. 11/774,442.
Final Rejection dated Dec. 16, 2009 for U.S. Appl. No. 11/774,442.
Amendment/Request Reconsideration After Non-Final Rejection filed on Oct. 2, 2009 for U.S. Appl. No. 11/774,442.
Examiner Interview Summary Record dated Sep. 30, 2009 for U.S. Appl. No. 11/774,442.
Non-Final Rejection dated Aug. 6, 2009 for U.S. Appl. No. 11/774,442.
Notice of Allowance and Fees Due dated May 9, 2012 for U.S. Appl. No. 13/114,805.
Notice of Allowance and Fees Due dated Jul. 10, 2012 for U.S. Appl. No. 13/353,218.
Preliminary Amendment filed on May 9, 2012 for U.S. Appl. No. 13/353,218.
Preliminary Amendment filed on May 9, 2012 for U.S. Appl. No. 13/353,232.
Final Rejection dated Sep. 19, 2012 for U.S. Appl. No. 11/774,423.
Amendment/Request Reconsideration After Non-Final Rejection filed on Sep. 12, 2012 for U.S. Appl. No. 13/112,825.
Notice of Allowance and Fees Due dated Aug. 30, 2012 for U.S. Appl. No. 13/353,232.
SmartApp Next Generation (SNG) Training Guide; includes the text "Last Revised Oct. 23, 2003".
American Modern Home Insurance Company (077) Illinois Motor Home Application; includes the text "V61-IL (Feb. 2004)" and "© American Modern Insurance Group 2004".
American Modern Home Leisure Guard Motor Home Uninsured and Underinsured Motorists Coverage Selection Form; includes the text "V64-IL (Sep. 1995)".
American Modern Home Insurance Company Illinois Motor Home Application; includes the text "V61-IL (Apr. 2000)" and "© American Modern Insurance Group 2004".
American Modern Home Insurance Company (077) Illinois Motor Home Application; includes the text "V61-IL (Jul. 2003)" and "© American Modern Insurance Group 2003".
American Modern Home Insurance Company (077) Illinois Motor Home Application; includes the text "V61-IL (Aug. 2002)" and "© American Modern Insurance Group 2004".
American Modern Home Insurance Company (077) Illinois Motor Home Application; includes the text "V61-IL (Aug. 2004)" and "© American Modern Insurance Group 2004".
Driver Exclusion Endorsement; includes the text "VRD00 (Feb. 2004)".
American Modern Home Insurance Company (077) Illinois Holiday Traveler Travel Trailer Application; includes the text "V6TIL (Jul. 2003)" and "© American Modern Insurance Group 2003".
American Modern Home Insurance Company (077) Illinois Holiday Traveler Travel Trailer Application; includes the text "V6TIL (Aug. 2002)" and "© American Modern Insurance Group 2002".
American Modern Home Insurance Company (077) Illinois Travel Trailer Application; includes the text "VT6IL (Aug. 2004)" and "© American Modern Insurance Group 2004".
Driver Exclusion Endorsement; includes the text "VTDOO (Apr. 2004)".
American Modern Insurance Group, Inc. Marketing Bulletin—Updates to Leisure Guard Motor Home Program in Illinois; dated Jun. 24, 2002.
American Modern Insurance Group, Inc. (077) Leisure Guard Program Motor Home Illinois—New Business May 15, 2000, Renewal Business Jun. 15, 2000; includes the text "V6OIL (May 2000)"; "Copyright, Insurance Services Office, Inc., 1996".
American Modern Insurance Group, Inc. (077) Motor Home Rate and Rule Manual Illinois—New Business Jul. 1, 2003, Renewal Business Aug. 1, 2003; includes the text "VRMIL (Jul. 2003)"; "© American Modern Insurance Group 2003".
American Modern Insurance Group, Inc. (077) Motor Home Rate and Rule Manual Illinois—New Business Aug. 1, 2002, Renewal Business Sep. 1, 2002; includes the text "VRMIL (Aug. 2002)"; "© American Modern Insurance Group 2002".
American Modern Insurance Group, Inc. (077) Travel Trailer Rate and Rule Manual Illinois—New Business Jul. 1, 2003, Renewal Business Aug. 1, 2003; includes the text "VRTIL (Jul. 2003)"; "© American Modern Insurance Group 2003".
American Modern Insurance Group, Inc. (077) Travel Trailer Rate and Rule Manual Illinois—New Business Aug. 1, 2002, Renewal Business Sep. 1, 2002; includes the text "VRTIL (Aug. 2002)"; "© American Modern Insurance Group 2002".
American Modern Insurance Group, Inc. (077) Travel Trailer Rate and Rule Manual Ohio—New Business Jul. 1, 2001, Renewal Business Aug. 1, 2001; includes the text "VRTOH (Jul. 2001)"; "© American Modern Insurance Group 2001".
American Modern Insurance Group, Inc. (077) Travel Trailer Rate and Rule Manual Ohio—New Business Nov. 1, 2002, Renewal Business Dec. 1, 2002; includes the text "VRTOH (Nov. 2002)"; "© American Modern Insurance Group 2002".

(56) References Cited

OTHER PUBLICATIONS

American Modern Insurance Group, Inc. (077) Travel Trailer Rate and Rule Manual Ohio—New Business Feb. 1, 2004, Renewal Business Mar. 1, 2004; includes the text "VRTOH (Feb. 2004)"; "© American Modern Insurance Group 2004".
American Modern Home Insurance Company (077) Ohio Motor Home Application; includes the text "V61-OH (Oct. 2001)" and "© American Modern Insurance Group 2001".
American Modern Insurance Group, Inc.—Offer of Uninsured/Underinsured Motorist Liability and Property Damage Coverage and Selection of Limits or Rejection of Coverage—Personal Lines (Ohio); includes the text "V64OH (Rev. Jul. 2001)".
American Modern Home Insurance Company (077) Ohio Leisure Guard Motor Home Application; includes the text "V61-OH (Dec. 2003)" and "© American Modern Insurance Group 2003".
American Modern Home Insurance Company (077) Ohio Motor Home Application; includes the text "V61-OH (Feb. 2004)" and "© American Modern Insurance Group 2004".
American Modern Insurance Group, Inc.—Offer or Rejection of Uninsured/Underinsured Motorist Liability and Selection or Rejection of Property Damage Coverage (Ohio); includes the text "VM4OH (Jan. 2003)".
American Modem Home Insurance Company (077) Ohio Motor Home Application; includes the text "V61-OH (Jul. 2004)" and "© American Modern Insurance Group 2004".
Driver Exclusion Endorsement; includes the text "VRD34 (Aug. 2004)".
American Modern Insurance Group, Inc. Marketing Bulletin—Revised Ohio Leisure Guard Motor Home Program; dated Nov. 14, 2001.
American Modern Insurance Group, Inc. (077) Motor Home Rate and Rule Manual Ohio—New Business Dec. 1, 2001 Renewal Business Jan. 1, 2002; includes the text "VRMOH (Dec. 2001)"; "© American Modern Insurance Group 2001".
American Modern Insurance Group, Inc. (077) Motor Home Rate and Rule Manual Ohio—New Business Feb. 1, 2004, Renewal Business Mar. 1, 2004; includes the text "VRMOH (Feb. 2004)"; "© American Modern Insurance Group 2004".
Brochure, American Modern Insurance Group, Inc. "Hit the Open Road and Leave the Worry Behind" Recreational Vehicle Insurance Coverage; includes the text "© American Modern Insurance Group 2004".
Deductibles Endorsement—Part D, Coverage for Damage to Your Motor Home, American Modern Insurance Group, Inc.; includes the text "V8551 Oct. 1998".
Deductibles Endorsement—Part D, Coverage for Damage to Your Travel Trailer, American Modern Insurance Group, Inc.; includes the text "V855T Oct. 1998".
Sales Sheet for Motor Home / Travel Trailer, American Modern Insurance Group, Inc.; Includes the text "Motor Home-GRO-G (Oct. 2004)".
Letter, American Modern Home Insurance Company to Illinois Dept. of Insurance re Holiday Traveler Travel Trailer Program Forms Filing; dated Jan. 31, 2000.
Letter, American Modern Home Insurance Company to Illinois Dept. of Insurance re Leisure Grand Motor Home Program Forms Filing; dated Feb. 9, 2000.
Filing Notice, State of Ohio Department of Insurance for American Modern Home Insurance Company—Holiday Travel Trailer; Includes the text "Effective Date: Jul. 1, 2001".
Letter, American Modern Home Insurance Company to Ohio Dept. of Insurance re Holiday Traveler Travel Trailer Program Rate, Rule, Form Revisions; Dated May 22, 2001.
Letter, American Modern Home Insurance Company to Ohio Dept. of Insurance re Holiday Traveler Travel Trailer Program Rate, Rule, Form Revisions; Dated Apr. 23, 2001.
Explanatory Memorandum re Ohio Travel Trailer Program Changes, American Modern Home Insurance; Includes the text "We propose an effective date of Jul. 1, 2001".
Filing Notice, State of Ohio Department of Insurance for American Modern Home Insurance Company—Leisure Guard Rate Rule Form; Includes the text "Effective Date: Dec. 1, 2001".
Email from American Modern Home Insurance Company to Ohio Dept. of Insurance re proposal to amend effective; date Includes the text "propose to amend the effective date to Dec. 1, 2001 for new business and Jan. 1, 2002 for renewals".
Filing Notice, State of Ohio Department of Insurance for American Modern Home Insurance Company—Leisure Guard Rate Rule Form; Includes the text "Effective Date: Oct. 1, 2001".
Letter, American Modern Home Insurance Company to Ohio Dept. of Insurance re Leisure Guard Motor Home Program; Dated Aug. 27, 2001.
Letter from State of Ohio Department of Insurance to American Modern Home Insurance Company re Leisure Guard Motor Home Program; Dated Aug. 1, 2001.
Letter, American Modern Home Insurance Company to Ohio Dept. of Insurance re Leisure Guard Motor Home Program Rate, Rule, Form Revisions; Dated Jul. 13, 2001.
Explanatory Memorandum re Ohio Motor Home Program Changes, American Modern Home Insurance; Includes the text "We propose an effective date of Oct. 1, 2001".
Yager Exhibit No. 6—"Draft Good Driver Deductible Reduction" Mar. 22, 2004.
Yager Exhibit No. 7—email; Subject: "YCA Features Update" Mar. 31, 2004.
Yager Exhibit No. 8—"Draft Good Driver Deductible Reduction" Mar. 31, 2004.
Yager Exhibit No. 9—"Draft Customer Requirements Description" Jun. 2004.
Yager Exhibit No. 10—email; Subject: "YCA Concepts—Group 5 Denver" Jul. 28, 2003.
Yager Exhibit No. 11—"YCA Concepts, Group 5" Jul. 28, 2003.
Yager Exhibit No. 12—email thread; Subject: "Re: YCA Concepts—Steering Committee Summary of Chicago Groups / Subject: YCA Concepts—Group 5 Denver " Jul. 28, 2003.
Yager Exhibit No. 13—"Allstate Your Choice Auto Insurance, Segmenting the Demand Curve, Steering Committee Update" Jul. 24, 2003.
Yager Exhibit No. 14—email thread; Subject: "YCA Concepts—Group 5 Denver" Jul. 28, 2003.
Yager Exhibit No. 15—email; Subject: "YCA—Focus Group Discussion Guide" Jul. 16, 2003.
Yager Exhibit No. 16—"Allstate Your Choice Auto Insurance Safari Groups Discussion Guide—Draft" Jul. 16, 2003.
Yager Exhibit No. 17—"Auto Insurance Safari Groups Discussion Guide—Final" Aug. 21, 2013.
Yager Exhibit No. 20—email thread; Subject: "Your Choice Quantitative Survey—Initial Working Draft" Aug. 12, 2003.
Yager Exhibit No. 22—email thread; Subject: "FW: Your Choice Survey—FINAL (at Last)" Sep. 9, 2003 through Jan. 13, 2004.
Yager Exhibit No. 25—"Allstate Your Choice Auto Insurance, Developing Superior Product Strategies for Your Choice Auto, Document of Record" Jan. 15, 2004.
Yager Exhibit No. 27—letter; Re: "Consumer Survey—Outstanding Issues" Sep. 3, 2003.
Yager Exhibit No. 29—"Allstate Corporation, Introduction to Demand Strategy and Customer Demand Analysis (CDA)" Feb. 20, 2003.
Yager Exhibit No. 30—email thread; Subject: "FW: YCA Measurement and Modeling Early Update" / "YCA # Update" Jun. 30, 2004 through Jul. 8, 2004; Re: YCA Measurement and Modeling Early Update Jul. 8, 2004.
Yager Exhibit No. 31—email thread; Subject: "Re: AYC—Final Concepts Used for Group 8" / "Advertising—Quant. Concept Testing" Jul. 31, 2003 through Aug. 1, 2003.
Yager Exhibit No. 32—"YCA Concepts Group 8" Aug. 1, 2003.
Yager Exhibit No. 33—email; Subject: "Your Choice Auto—Progressive Example and Pricing" Jul. 26, 2004.
Yager Exhibit No. 34—"Progressive Auto Insurance Example" Jul. 26, 2004.
Yager Exhibit No. 36—email thread; Subject: "AARP . . . YCA 'watered-down look alike'" May 17, 2005 through May 25, 2005.

(56) References Cited

OTHER PUBLICATIONS

Yager Exhibit No. 37—email; Subject: "Competitor Feature Offerings" Jun. 29, 2004.
Yager Exhibit No. 39—email thread; Subject: "Your Choice Survey Final (at Last)" Sep. 9, 2003 through Jan. 13, 2004.
Yager Exhibit No. 43—"Allstate New Business Model, Quantitative Report: Wave I" Jan. 7, 2000.
Yager Exhibit No. 49—letter; Re: "Activities by Hartford Financial Services that are Covered by Allstate Intellectual Property" Oct. 25, 2006.
Yager Exhibit No. 50—email; Subject: "Updates—Wilson Mtg 12/2—Auto and Property Product Section" Nov. 21, 2003.
Yager Exhibit No. 51—"Update on future Auto/Property Products" Dec. 2, 2003.
Yager Exhibit No. 52—"Allstate Insurance Co. Professional Services Agreement, Schedule 4: 'Universal Auto Marketing Project'" May 2003.
Yager Exhibit No. 53—"Allstate Insurance Co. Statement of Work, Schedule 7: 'Your Choice Auto—Optimized Product Positioning & Launch Planning Project'" Jul. 2004.
Yager Exhibit No. 54—"Allstate Insurance Co. Statement of Work, Schedule #8: Your Choice Auto—Additional Quantitative Research Proposal" Sep. 2004.
Yager Exhibit No. 56—email; Subject: "Midwest Competitor Auto & Home Report" Nov. 19, 2008.
Yager Exhibit No. 57—email; Subject: "Midwest Competitor Auto & Home Report" May 29, 2009.
Deposition Transcript of Floyd Yager. Volume I. Aug. 22, 2013.
Deposition Transcript of Floyd Yager. Volume II. Aug. 22, 2013.
30(6)(b) Deposition Transcript of Floyd Yager. Aug. 23, 2013.
Office Action mailed from USPTO dated Mar. 26, 2012 for U.S. Appl. No. 12/426,667.
Form Filing—Private Passenger Auto—File No. L030020-A Includes the text "Sent: Jan. 10, 2003".
Problem Report Includes the text "Sent: Jan. 22, 2003".
Disposition Report Includes the text "Sent: Apr. 29, 2003".
Form Filing—Private Passenger Auto—File No. L030020-A Includes the text "Jan. 29, 2003".
Application for Approval of Insurance Rates Includes the text "Jan. 29, 2003 Date of Filing".
Form Filing—Private Passenger Auto—File No. L030020-A Includes the text "Feb. 18, 2003".
Progressive Casualty Insurance Co.—Rates & Forms Filing Transmittal documents in the State of Florida Feb. 5, 2003.
Progressive Casualty Insurance Co.—1994 Recreation Vehicle Form Filing in the State of Montana Mar. 1, 1994.
Progressive Northern Insurance Co.—Nov. 1999 Pleasure Boat Program Rates and Rules Filing in the State of Feb. 17, 2000 Pennsylvania.
Johannes Mehring; Premium Rates in the German Motor Insurance Business; The Austin Bulletin; vol. III, Part 1, Dec. 1963; Dusseldorf, West Germany; pp. 13-19.
Joseph J. Muir—"Principles and Practices in Connection with Classification Rating Systems for Liability Insurance as Applied to Private Passenger Automobiles"; Proceedings of the Casualty Actuarial Society; May 23, 1957 and Nov. 21, 1957; pp. 19-44; vol. XLIV.
Stephen S. Makgill; Panel Discussion—May 1963 Meeting; "An Analysis of the Adequacy of the Various Factors and Rating Values Used in Retrospective Eating"; pp. 32-49; ; Proceedings of the Casualty Actuarial Society; May 1963, Oct. 1963; pp. 32-49; vol. L.
Allstate Choice Auto Insurance. [on-line] [attached copy retrieved on Feb. 6, 2009]. Retrieved from the internet: http://www.allstate.com/auto-insurance/auto-insurance-features.aspx.
Good Driver Car Insurance Rewards Safe Driving. [on-line], [attached copy retrieved on Feb. 6, 2009]. Retrieved from internet:http://www.insureme.com/content/rsrc/auto/good-driver-car-insurance.
Take Advantage Auto Insurance Discounts, Dec. 8, 2008 [on-line], [attached copy retrieved on Apr. 20, 2009]. Retrieved from internet: http://www.insurance.com/quotes/article.aspx/Take_Advantage_Autoinsurance_Discounts/artid/160.
"New Price Quotes for Massachusetts Drivers Now Available From Liberty Mutual" Feb. 18, 2008; Liberty Mutual New Releases; [on-line], [attached copy retrieved on Jun. 4, 2008]. Retrieved from the internet: http://www.libertymutual.conn/omapps/ContentServer?cid=1003349317278&prid=11383550083.
Ajit Chaudhari. Safe-T-Net Traffic Safety Design Chaudhari, et al. Oct. 20, 1997. [on-line], [attached copy retrieved on Dec. 7, 2007]. Retrieved from the internet: http:captology.stanford.edu/resources/designs/project2/safetnet.html.
Advocating Mileage-Based Auto Insurance (Spring 2002). [on-line], [attached copy retrieved on Jan. 22, 2009]. Retrieved from the internet: http://www.clf.org/general/index.asp?.id=49.
Charoen Kitti Kanya; Customers Hold All the Aces;—Bangkokpost 1999 Economic Review. [on-line], [attached copy retrieved on Dec. 7, 2007]. Retrieved from Internet: http://www.bangkokpost.com/99year-end/16insurance.htm.
Drowsy Driver Deterent Project—Nov. 2, 1998, The Association for Automobile Safety and Accident Prevention. [attached copy retrieved on Dec. 7, 2007]. Retrieved from the internet: http://cmgm.standford.edu~pbrutlag/portfolio/ddd/index.html.
Low No Claims Bonus, [on-line], [attached copy retrieved on Dec. 7, 2007]. Retrieved from the internet: http://www.bell.co.uk/about_us.php.
Ian Ayres, Make Car Insurance Fairer; and Barry Nalebuff; Mar. 17, 2003; vol. 171: Issue 06; Forbes Magazine—Copyright 2003 Forbes, Inc.
Ben Jacklet; Pay as you drive' policies get boost; Portland Tribune Jan. 10, 2003; [on-line], [attached copy retrieved on Dec. 7, 2007]. Retrieved from Internet: http://www.portlanddtribune.com/news/story.php?story_id=15889.
Rewarding Safe Drivers; Apr. 25, 2002—News Release [on-line], [Attached copy retrieved on Dec. 7, 2007]. Retrieved from the internet: http://www.sgi.sk.ca/news_releases/2002/apr_25_2002.htm.
Road Safety Council Bill 2001; Apr. 11, 2002 [on-line] Attached copy retrieved from the Internet: http://www.parliament.wa.gov.au/hansard/hans35.nsf(ATT)/B3CFBB73FDE9421BC825733F002600FC/$file/C36+S1+20020411+p9427d-943la.pdf.
The Safest Cars of 91, Published Date Dec. 3, 1990, edition U.S. News and World Report; Edward Baig.
Martin Rosenberg, Rate Classification Reform in New Jersey,1992), [on-line], [attach copy retrieved on Feb. 6, 2009]. Retrieved from the Internet http://www.faqs.org/abstracts/Insurance/London-Rate-classification-reform-in-New-Jersey.
YCA Sensation Reignites Excitement Around Allstate Your Choice Auto. Nov. 6, 2007 [On-line], [attached copy retrieved on Nov. 11, 2007] Retrieved from the Internet: http://cr/allstateenow/allstate/2007-11-06-YCA.htm.
Responsible Driver Guarantee, [On-line], [attached copy retrieved on Jun. 4, 2008], Retrieved from the Internet: File://D:\np/responsibledriver.htm.
Car Insurance Rates and Accidents; copyright 1995-2008 [on-line], [attached copy retrieved on May 23, 2008]. Retreived from the Internet: http://auto.progressive.com/progressive-car-insurance/accident-forgiveness.aspx.
Allstate Corporation; Rules Manual; Implementation Dates: Aug. 28, 1989 and Nov. 16, 1992; pp. 11-16; Wisconsin Department of Insurance; Wisconsin, USA.
Allstate Corporation; Rules Manual; Implementation Date: Dec. 13, 2004; pp. 58-1-58-4; Wisconsin Department of Insurance; Wisconsin, USA.
Allstate Corporation; Rules Manual; Implementation Dates: Aug. 11, 1997 and Jun. 7, 1999 ; pp. 36-40; Maine Department of Insurance; Maine, USA.
Allstate Corporation; Rules Manual; Implementation Date: Dec. 6, 2004; p. 55-1; Oregon Department of Insurance; Oregon, USA.
Allstate Corporation; Rules Manual; Implementation Date: Dec. 6, 2004; pp. 54-1-54-2; Oregon Department of Insurance; Oregon, USA.

(56) References Cited

OTHER PUBLICATIONS

Allstate Corporation; Rules Manual; Implementation Date: Dec. 6, 2004; pp. 22-1-22-10; Oregon Department of Insurance; Oregon, USA.
Allstate Corporation; Rules Manual; Implementation Date: Feb. 26, 2001; p. H026-1; Mississippi Department of Insurance; Mississippi, USA.
Allstate Corporation; Rules Manual; Implementation Date: Jul. 31, 2000; pp. HO23-1-HO23-2; Missouri Department of Insurance; Missouri, USA.
Allstate Corporation; Rules Manual; Implementation Date: Mar. 6, 2006; p. HOPC26-1; Idaho Department of Insurance; Idaho, USA.
Allstate Corporation; Rules Manual; Implementation Date: Nov. 3, 2003; p. HOPC26-1; Colorado Department of Insurance; Colorado, USA.
Allstate Corporation; Rules Manual; Implementation Date: Jan. 3, 2000; pp. 22-1-22-8; Colorado Department of Insurance; Colorado, USA.
Allstate Corporation; Rules Manual; Implementation Date: Dec. 13, 2004; pp. 59-1-59-2; Wisconsin Department of Insurance; Wisconsin, USA.
Allstate Corporation; Rules Manual; Implementation Date: Oct. 31, 2005; pp. 59-1-59-3; Indiana Department of Insurance; Indiana, USA.
Allstate Corporation; Rules Manual; Implementation Date: Mar. 6, 2006; p. HOPC36-1; Idaho Department of Insurance; Idaho, USA.
Allstate Corporation; Rules Manual; Implementation Date: Mar. 6, 2006; p. HOPC37-1; Idaho Department of Insurance; Idaho, USA.
Webwire, Insurancewide addresses the public's mistrust in the price comparison industry, http://www.webwire.com/ViewPressRel.asp?ald=85762, Jan. 28, 2009, 2 pages, London.
Michelle Andrews, Insurance Trade-Off: Reducing Premiums by Eliminating Expensive Doctors, http://www.kaiserhealthnews.org/Features/Insuring-Your-Health/Michlle-Andrews-on-Premiums-and-Prices.aspx, Mar. 1, 2011, 2 pages, Washington, DC.
May 6, 2013 U.S. Notice of Allowance—U.S. Appl. No. 13/353,218.
Apr. 30, 2015 U.S. Final Office Action—U.S. Appl. No. 13/730,079.
Feb. 10, 2015 U.S. Final Office Action—U.S. Appl. No. 14/018,913.
Feb. 20, 2015 U.S. Non-Final Office Action—U.S. Appl. No. 14/060,326.
Feb. 11, 2015 U.S. Non-Final Office Action—U.S. Appl. No. 14/501,266.
Feb. 10, 2015 U.S. Non-Final Office Action—U.S. Appl. No. 14/501,282.
Feb. 10, 2015 U.S. Non-Final Office Action—U.S. Appl. No. 14/501,287.
May 20, 2015 U.S. Final Office Action—U.S. Appl. No. 14/501,266.
May 21, 2015 U.S. Final Office Action—U.S. Appl. No. 14/501,287.
May 20, 2015 U.S. Final Office Action—U.S. Appl. No. 14/501,282.
May 14, 2015 U.S. Final Office Action—U.S. Appl. No. 11/774,442.
Apr. 30, 2015 U.S. Final Office Aciton—U.S. Appl. No. 13/730,079.
Apr. 28, 2015 U.S. Final Office Action—U.S. Appl. No. 13/905,957.
Jun. 9, 2015—U.S. Non-Final Office Action—U.S. Appl. No. 14/018,913.
Aug. 6, 2015 U.S. Final Office Action—U.S. Appl. No. 14/060,326.
Aug. 19, 2015 U.S. Final Office Action—U.S. Appl. No. 14/311,046.
Aug. 25, 2015 U.S. Final Office Action—U.S. Appl. No. 12/426,667.
Aug. 10, 2015—U.S. Final Office Action—U.S. Appl. No. 13/353,218.
Oct. 7, 2014 U.S. Non-Final Office Action—U.S. Appl. No. 11/774,442.
Feb. 11, 2015 U.S. Non-Final Office Action—U.S. Appl. No. 12/426,667.
Mar. 2, 2015 U.S. Final Office Action—U.S. Appl. No. 11/774,423.
Oct. 28, 2015—U.S. Non-Final Office Action—U.S. Appl. No. 11/774,423.
Oct. 8, 2015—U.S. Non-Final Office Action—U.S. Appl. No. 14/501,282.
Oct. 8, 2015—U.S. Non-Final Office Action—U.S. Appl. No. 14/501,287.
Epinions, Progressive Group—Auto Review, dated Jan. 2, 2001, pp. 1-4.
The Courier, Accidents don't always raise insurance rate, Jan. 1, 1984, p. 2C.
Oct. 5, 2015 U.S. Non-Final Office Action U.S. Appl. No. 13/905,957.
Nov. 30, 2015—U.S. Final Office Action—U.S. Appl. No. 14/018,913.
Dec. 1, 2015—U.S. Final Office Action—U.S. Appl. No. 14/060,326.
Feb. 5, 2016—U.S. Non-Final Office Action—U.S. Appl. No. 13/112,825.
Progressive, Boat/Personal Watercode 2003-2004 Product Guide & Underwriting Guidelines, 17 pages.
Sep. 22, 2015 U.S. Non-Final Office Action—U.S. Appl. No. 13/730,079.
Mar. 21, 2016—U.S. Final Office Action—U.S. Appl. No. 11/774,423.
Mar. 21, 2016—U.S. Non-Final Office Action—U.S. Appl. No. 14/018,913.
Mar. 23, 2016 U.S. Non-Final Office Action—U.S. Appl. No. 14/060,326.
May 5, 2014 (US)—Non-Final Office Action—U.S. Appl. No. 13/730,079.
Aug. 15, 2012 U.S. Amendment Submitted/Entered with Filing of CPA/RCE—U.S. Appl. No. 11/774,442.
May 21, 2012 U.S. Final Office Action—U.S. Appl. No. 11/774,442.
Mar. 1, 2012—U.S. Amendment/Request Reconsideration After Non-Final Rejection—U.S. Appl. No. 11/744,442.
Nov. 23, 2011 (US)—Non-Final Office Action—U.S. Appl. No. 11/774,442.
Dec. 16, 2009 U.S. Final Office Action—U.S. Appl. No. 11/774,442.
Oct. 2, 2009 U.S. Amendment/Request Reconsideration After Non-Final Rejection—U.S. Appl. No. 11/744,442.
Sep. 30, 2009 U.S. Examiner Interview Summary—U.S. Appl. No. 11/774,442.
Aug. 6, 2009 (US)—Non-Final Office Action—U.S. Appl. No. 11/774,442.
May 9, 2012 (US)—Notice of Allowance—U.S. Appl. No. 13/114,805.
May 9, 2012 U.S. Preliminary Amendment—U.S. Appl. No. 13/353,218.
Sep. 19, 2012 U.S. Final Office Action—U.S. Appl. No. 11/774,423.
Sep. 12, 2012 U.S. Amendment/Request Reconsideration After Non-Final Rejection—U.S. Appl. No. 13/112,825.
Aug. 30, 2012 U.S. Notice of Allowance—U.S. Appl. No. 13/353,232.
Mar. 19, 2013 U.S. Amendment Submitted/Entered with Filing of CPA/RCE—U.S. Appl. No. 11/774,423.
Sep. 11, 2014 U.S. Non-Final Office Action—U.S. Appl. No. 11/774,423.
Jun. 12, 2012 (US) Certificate of Correction—U.S. Appl. No. 12/793,325.
Dec. 21, 2012 U.S. Notice of Allowance—U.S. Appl. No. 13/353,218.
Oct. 11, 2012—U.S. Notice of Allowance U.S. Appl. No. 13/112,825.
Jun. 5, 2013 U.S. Notice of allowance—U.S. Appl. No. 13/353,218.
Jun. 4, 2013 U.S. Notice of Allowance—U.S. Appl. No. 13/353,232.
Feb. 20, 2013 U.S. Notice of Allowance—U.S. Appl. No. 13/353,232.
Feb. 15, 2013 U.S. Notice of Allowance—U.S. Appl. No. 13/353,218.
Feb. 14, 2013 U.S. Notice of Allowance—U.S. Appl. No. 13/112,825.
Dec. 21, 2012 U.S. Notice of Allowance—U.S. Appl. No. 13/353,232.
Jul. 11, 2011—U.S. Notice of Allowance U.S. Appl. No. 12/903,861.
May 17, 2010 U.S. Notice of Allowance—U.S. Appl. No. 11/551,595.
May 11, 2012—U.S. Notice of Allowance U.S. Appl. No. 12/959,108.
Jul. 5, 2011 U.S. Notice of Allowance—U.S. Appl. No. 12/793,325.
Oct. 15, 2013 U.S. Non-Final Office Action—U.S. Appl. No. 13/353,218.
Oct. 10, 2013—U.S. Office Action—U.S. Appl. No. 11/774,423.
Nov. 20, 2013 U.S. Office Action—U.S. Appl. No. 13/905,957.
Nov. 4, 2009 U.S. Office Action—U.S. Appl. No. 11/774,423.
Oct. 15, 2008 U.S. Office Action—U.S. Appl. No. 11/774,423.
Oct. 1, 2009 U.S. Office Action—U.S. Appl. No. 11/774,409.
Sep. 21, 2011 U.S. Office Action—U.S. Appl. No. 12/426,667.
Sep. 7, 2010 U.S. Office Action—U.S. Appl. No. 11/774,423.
May 22, 2009 U.S. Office Action—U.S. Appl. No. 11/551,595.
Apr. 12, 2012—U.S. Office Action—U.S. Appl. No. 13/112,825.
Mar. 26, 2012 U.S. Office Action—U.S. Appl. No. 12/426,667.
Mar. 8, 2011 U.S. Office Action—U.S. Appl. No. 11/774,423.
Feb. 15, 2011 U.S. Office Action—U.S. Appl. No. 12/903,861.
Jan. 11, 2012—U.S. Office Action—U.S. Appl. No. 12/959,108.
Oct. 18, 2013 U.S. Non-Final Office Action—U.S. Appl. No. 14/018,913.

(56) References Cited

OTHER PUBLICATIONS

Dec. 8, 2009 U.S. Final Office Action—U.S. Appl. No. 11/551,595.
Dec. 6, 2010 U.S. Final Office Action—U.S. Appl. No. 11/774,423.
Sep. 13, 2011 U.S. Final Office Action—U.S. Appl. No. 11/774,423.
Jun. 12, 2012 U.S. Final Office Action—U.S. Appl. No. 12/426,667.
May 27, 2009 U.S. Final Office Action—U.S. Appl. No. 11/774,423.
Mar. 10, 2010—U.S. Final Office Action—U.S. Appl. No. 11/774,423.
Mar. 5, 2014 U.S. Final Office Action—U.S. Appl. No. 13/730,079.
Dec. 20, 2013 U.S. Examiner Interview Summary—U.S. Appl. No. 13/730,079.
Sep. 25, 2009 U.S. Examiner Interview Summary—U.S. Appl. No. 11/774,409.
Aug. 21, 2009 U.S. Examiner Interview Summary—U.S. Appl. No. 11/551,595.
Mar. 6, 2009 U.S. Examiner Interview Summary—U.S. Appl. No. 11/774,423.
May 5, 2011 U.S. Amendment/Request Reconsideration After Non-Final Rejection—U.S. Appl. No. 12/903,861.
May 5, 2011 U.S. Amendment/Request Reconsideration After Non-Final Rejection—U.S. Appl. No. 12/793,325.
Apr. 19, 2012 U.S. Amendment/Request Reconsideration After Non-Final Rejection—U.S. Appl. No. 12/426,667.
Mar. 30, 2012 U.S. Amendment/Request Reconsideration After Non-Final Rejection—U.S. Appl. No. 12/959,108.
Mar. 16, 2009 U.S. Amendment/Request Reconsideration After Non-Final Rejection—U.S. Appl. No. 11/774,423.
Jan. 26, 2010 U.S. Amendment/Request Reconsideration After Non-Final Rejection—U.S. Appl. No. 11/774,423.
Aug. 31, 2011 U.S. Amendment/Request Reconsideration After Non-Final Reject—U.S. Appl. No. 11/774,423.
Aug. 15, 2012 U.S. Amendment/Request Reconsideration After Non-Final Reject—U.S. Appl. No. 11/774,423.
Dec. 12, 2012 U.S. Amendment/Request Reconsideration After Final Rejection—U.S. Appl. No. 12/426,667.
Apr. 24, 2014 U.S. Amendment/Request Reconsideration After Final Rejection—U.S. Appl. No. 13/730,079.
Jan. 26, 2010 U.S. Amendment Submitted/Entered with Filing of CPA/RCE—U.S. Appl. No. 11/774,442.
Aug. 31, 2010 U.S. Amendment Submitted/Entered with Filing of CPA/RCE—U.S. Appl. No. 11/774,423.
Aug. 14, 2009 U.S. Amendment Submitted entered with Filing of CPA/RCE—U.S. Appl. No. 11/774,423.
Mar. 2, 2011 U.S. Amendment Submitted Entered with Filing of CPA/RCE—U.S. Appl. No. 11/774,423.
Mar. 9, 2012 U.S. Amendment Submitted enter with filing of CPA/RCE—U.S. Appl. No. 11/774,423.
Jan. 3, 2012 U.S. Amendment/Request Reconsideration-After Non-Final Rejection—U.S. Appl. No. 12/426,667.
Nov. 25, 2013 U.S. Amendment/Request Reconsideration After Non-Final Rejection—U.S. Appl. No. 13/730,079.
Mar. 8, 2014 U.S. Amendment/Request Reconsideration After Non-Final Rejection—U.S. Appl. No. 14/018,913.
Mar. 12, 2014 U.S. Amendment/Request Reconsideration After Non-Final Rejection—U.S. Appl. No. 13/353,218.
Jan. 22, 2014 U.S. Amendment/Request Reconsideration After Non-Final Rejection—U.S. Appl. No. 13/730,079.
Apr. 21, 2014 U.S. Amendment/Request Reconsideration After Non-Final Rejection—U.S. Appl. No. 13/905,957.
Aug. 21, 2009 U.S. Amendment/Request Reconsideration After Non-Final Rejection—U.S. Appl. No. 11/551,595.
Dec. 1, 2010 U.S. Amendment/Request Reconsideration After Non-Final Rejection—U.S. Appl. No. 11/774,423.
Jun. 2, 2010 U.S. Amendment after notice of Allowance—U.S. Appl. No. 11/551,595.
Sep. 10, 2009—U.S. Advisory Action—U.S. Appl. No. 11/774,423.
Jul. 10, 2012 (US)—Notice of Allowance—U.S. Appl. No. 13/353,218.
May 9, 2012 U.S. Preliminary Amendment—U.S. Appl. No. 13/353,232.
May 18, 2012 U.S. Non-Final Office Action—U.S. Appl. No. 11/774,423.
Jun. 17, 2009 U.S. Supplemental Final Office Action—U.S. Appl. No. 11/774,423.
Jan. 26, 2010 U.S. Amendment Submitted/Entered with Filing of CPA/RCE—U.S. Appl. No. 11/551,595.
May 9, 2012 U.S. Request for Certificate of Correction—U.S. Appl. No. 12/793,325.
Feb. 15, 2011 U.S. Non-Final Office Action—U.S. Appl. No. 12/793,325.
Apr. 6, 2012 U.S. Applicant Initiated Interview Summary—U.S. Appl. No. 12/959,108.
Aug. 28, 2013 (US)—Non-Final Office Action—U.S. Appl. No. 13/730,079.
Jun. 9, 2010 U.S. Response to Amendment under Rule 312—U.S. Appl. No. 11/551,595.
May 13, 2014 U.S. Supplemental Amendment Response to Non-Final Rejection—U.S. Appl. No. 11/774,423.
Jul. 16, 2014 U.S. Office Action—U.S. Appl. No. 14/018,913.
Aug. 6, 2014 U.S. Office Action—U.S. Appl. No. 13/905,957.
Mar. 10, 2014 U.S. Amendment/Request Reconsideration After Non-Final Rejection—U.S. Appl. No. 11/774,423.
Nov. 13, 2014 U.S. Non-Final Office Action—U.S. Appl. No. 13/730,079.
Aug. 1, 2014 U.S. Amendment/Request Reconsideration After Non-Final Rejection—U.S. Appl. No. 13/730,079.
Jan. 13, 2015 (US)—Non-Final Office Action—U.S. Appl. No. 13/905,957.
Jan. 13, 2015 (US)—Non-Final Office Action—U.S. Appl. No. 14/311,046.
Mar. 2, 2015 U.S. Non-Final Office Action—U.S. Appl. No. 13/353,218.
May 4, 2016 U.S. Final Office Action—U.S. Appl. No. 14/501,287.
May 12, 2016 U.S. Final Office Action—U.S. Appl. No. 14/501,282.
May 18, 2016 U.S. Final Office Action—U.S. Appl. No. 13/905,957.
Jun. 3, 2016—U.S. Final Office Action—U.S. Appl. No. 13/730,079.
Jul. 29, 2016 —U.S. Non-Final Office Action—U.S. Appl. No. 13/112,825.
Jul. 15, 2016 U.S. Final Office Action—U.S. Appl. No. 14/060,326.
Jul. 8, 2016 (US)—Non-Final Office Action—U.S. Appl. No. 13/353,218.
Aug. 18, 2016—U.S. Non-Final Office Action—U.S. Appl. No. 11/774,423.
Timoteo, Paul, "A Total Loss", Aug. 1, 2002, Canadian Underwriter, pp. 1-4.
Kroll, Karen M., "Guaranteed-Replacement Coverage Fading Fast", Oct. 12, 2004, Bankrate.com, pp. 1-2.
Howard, J.D., "Auto Insurance Claims-General", Apr. 13, 2004, URL: http://ican2000.com/ussetauto.html, pp. 1-6.
Woller, "Is Your Car Worth Less Than Your Loan?", Feb. 1, 2001, URL: http://www.wolleranger.com/lessthanloan.html, 4 pp.
Sep. 6, 2016 U.S. Non-Final Office Action—U.S. Appl. No. 14/139,048.
Sept. 8, 2016 U.S. Final Office Action—U.S. Appl. No. 14/018,913.
Sep. 29, 2016—U.S. Appl. No. 14/311,046—Non-Final Office Action.
Oct. 4, 2016 U.S. Non-Final Office Action—U.S. Appl. No. 14/501,282.
Oct. 5, 2016 U.S. Non-Final Office Action—U.S. Appl. No. 14/501,287.
Oct. 19, 2016 U.S. Final Office Action—U.S. Appl. No. 13/353,218.
Nov. 2, 2016—U.S. Non-Final Office Action—U.S. Appl. No. 14/060,326.
Nov. 21, 2016 U.S. Final Office Action—U.S. Appl. No. 11/774,423.
Dec. 1, 2016—U.S. Non-Final Office Action—U.S. Appl. No. 12/426,667.
Dec. 2, 2016—U.S. Final Office Action—U.S. Appl. No. 14/139,048.
Jan. 12, 2017—U.S. Final Office Action—U.S. Appl. No. 14/311,046.
Jan. 30, 2017—U.S. Non-Final Office Action—U.S. Appl. No. 14/501,266.
Jan. 20, 2017—U.S. Non-Final Office Action—U.S. Appl. No. 14/018,913.
Charles L McClenahan "Principles of Ratemaking" Dec. 31, 1987.
Feb. 10, 2017—U.S. Non-Final Office Action—U.S. Appl. No. 13/353,218.
Feb. 24, 2017—U.S. Final Office Action—U.S. Appl. No. 13/112,825.
Feb. 24, 2017—U.S. Final Office Action—U.S. Appl. No. 14/501,282.
Mar. 28, 2017—U.S. Non-Final Office Action—U.S. Appl. No. 11/774,423.

(56) References Cited

OTHER PUBLICATIONS

Mar. 24, 2017—U.S. Final Office Action—U.S. Appl. No. 14/501,287.
Jun. 7, 2017—U.S. Non-Final Office Action—U.S. Appl. No. 11/774,442.
Jul. 25, 2017—U.S. Final Office Action—U.S. Appl. No. 12/426,667.
Jul. 31, 2017—U.S. Final Office Action—U.S. Appl. No. 11/774,423.
Sep. 12, 2017 U.S. Notice of Allowance—U.S. Appl. No. 14/060,326.
Sep. 12, 2017 U.S. Notice of Allowance—U.S. Appl. No. 14/139,048.
Oct. 18, 2017—U.S. Final Office Action—U.S. Appl. No. 11/774,442.
Sep. 24, 2018—(US) Non-Final Office Action—U.S. Appl. No. 11/774,423.
Massachusetts Safe Driver Insurance Plan. Jul. 19, 2008. Retrieved from [https://web.archive.org/web/20080719212350/http://www.mass.gov/Eoca/docs/doi/Legal_Hearings/211_134.PDF] on Jan. 8, 2014.
Safeco's New Auto Policy Gives Insurance Customers More Choices, printed from http://www.safeconews.com/pressrelease.php?p_id=78, Seattle—(Jul. 20, 2006). (Exhibit B-2 pages).
Lowering the Cost of Your Auto Insurance, printed from http://web.archive.bibalex.org/web/20010626032349/http://www.safeco.com/safeco/insurance/auto/lowercostasp. (Exhibit C-2 pages).
Auto Insurance, printed from http://web.archive.org/web/20010602142723/http://www.safeco.com/safeco/Insurance/Auto. (Exhibit D-4 pages).
Progressive Insurance Co. The place to insure your Motorhome!, printed from http://www.epinions.com/review/finc-Insurance-All-Progressive_Group_-_Auto/finc-review, written Oct. 24, 2000, Updated Jan. 2, 2001. (Exhibit D-2 pages).
Icasisa (Jul. 7, 2004), Boat Insurance, message posted to Blue Water Board at http://2coolfishing.comittmboforum/showthread.php?t=2769. (Exhibit E-4 pages).
Progressive Auto Product and Underwriting Guide, Sep. 30, 2004 Form No. 3200 (Sep. 2004) or Private Passenger Auto Program Copyright 2004 Progressive Casualty Insurance Company (Exhibit F-24 pages).
Progressive Watercraft Insurance Boat/ Personal Watercraft 2003-2004 Product Guide Underwriting Guidelines, Form No. 3365 (Sep. 2002), Copyright 2003 Progressive Casualty Insurance Company, (Exhibit G-17 pages).
Marketing Bulletin, American Modem Insurance Group, Inc.—Rated A + (Superior) by A.M. Best, Dec. 21, 2001, (Exhibit B-1 page).
American Modern Home Insurance Company, Travel Trailer Rate amd Rule Manual, American Modern Insurance Group 2002 (Exhibit C-10 pages).
American Modern Home Insurance Company, Minnesota Holiday Traveler Travel Trailer Application, Form V6TMN (Mar. 2002),
American Modem Insurance Group 2002, (Exhibit D-2 pages).
The Cambridge Group, Driving Multi-Billion Dollar Growth in a "Commodity" Insurance Market, printed from http://www.thecambridgegroup.com/casestudies/casestudy03.php. (Exhibit B-1 page).
Disappearing Deductible Clause, Form No. CF 03 45 (Ed. 05 77). (Exhibit B-1 page).
LexisNexis Financial News, MetLife Auto Home Unveils New Advertising Campaign; Snoopy(TM) Helps convey "That All Auto Insurers are Not the Same" Aug. 3, 2000, http://www.prnewswire.com, Load date Aug. 4, 2000 (Exhibit B-2 pages).
Nationwide Insurance Agency Locator; Retrieved from the internet: <URL: http://web.archive.org/30web/19980523213311/http://www.nationwide.cominationwide/locat . . . (includes text: "Copyright 1996-1998 Nationwide Mutual Insurance Company").
Metropolitan Group Property and Casualty Insurance Company—Automobile Insurance Declarations; Dated Jan. 4, 2011.
Metlife listing of Deductible Savings Benefit approval and effective dates by state; Dated Jun. 28, 2000.
Metlife Auto & Home radio advertisement script for Home Replacement Cost Guarantee; Dated Jun. 28, 2000.
Letter, Metlife to Insurance Division for State of Rhode Island re Revisions of Private Passenger Automobile Program; Dated Jan. 9, 2001.
Important Notice, "Your Policy Now Provides an Additional Benefit at No Extra Cost to You" Deductible Savings Benefit—Metlife; includes the text "MPL 1833-000","Printed in USA 0799".
Important Notice, "Deductible Savings Benefit—Your Policy Now Provides an Additional Benefit at No Extra Cost to You"—Metlife; includes the text "MPL 1833-000","Printed in USA 0901".
Coming Home to Personal-Lines Insurance by Robert A. Lanna, American Agent & Broker; Dated Apr. 1998.
Civil Action No. 1:12-CV-03609, N.D.I.L., Eastern Division, Judge Joan H. Lefkow [Subject to Protective Order].
Personal Lines Manual—New Jersey Skylands Insurance Associates, Personal Auto Program—New Jersey; includes the text "Effective Date Jun. 6, 2007", "S001 04 06", "S1002 04 06".
www.dtins.com. retrieved from web.archive.org.auto.html (Jun. 21, 2003). auto-xtras.html (Oct. 29, 2003).
Mutual Benefit Group, "Homeowners/Renters Insurance: The security system you can't afford to overlook," Apr. 3, 2004, http://mutualbenefitgroup.com/products.home.html.
Bhuyan, Laxmi N., "Parallell Processing Architectures," retrieved from http://www.cs.ucr.edu/-bhuyan, 23 pages.
Fairhall, John, "Accidents don't always raise insurance rate," The Courier, Jan. 1, 1984, p. 2C.
Jun. 11, 2018—(US) Final Office Action—U.S. Appl. No. 11/774,423.

\* cited by examiner

1300

1301 → SELECT PROFILE [SELECT ▼]

1303 {
FIRST NAME [         ]
LAST NAME [         ]
DATE OF BIRTH [  ] / [  ] / [  ]
EMAIL ADDRESS [                  ]
GENDER ○ MALE   ○ FEMALE
MARITAL STATUS [SELECT ▼]
ZIP [       ]
RENT/OWN [SELECT ▼]

VEHICLE
YEAR [SELECT ▼]  MAKE [SELECT ▼]  MODEL [SELECT ▼]
}

[ GET A QUOTE ] ← 1305

| DRIVERS | VEHICLES | QUOTE | PURCHASE |

ECONOMY PLAN
$86 PER MONTH
OR $516 FOR 6 MONTHS

PEOPLE LIKE ME
$96 PER MONTH
OR $556 FOR 6 MONTHS

ENHANCED PLAN
$106 PER MONTH
OR $636 FOR 6 MONTHS

☑ SAVE  ⊗ EXIT

GET LIVE HELP
🔍 CLICK TO TALK
📠 FIND AN AGENT
📞 OR CALL
xxx-xxx-xxxx

1501

PEOPLE LIKE ME
THIS PLAN PROVIDES FANTASTIC VALUE FOR YOUR INSURANCE DOLLAR, WITH A LEVEL OF PROTECTION WHICH IS POPULAR IN YOUR STATE. YOU CAN TAILOR THIS POLICY TO FIT YOUR SPECIFIC NEEDS BY CLICKING "EDIT" IN ANY OF THE SECTIONS BELOW.

AUTO: $96 /MO ($556 / 6 MO. POLICY, PAYABLE IN 5 INSTALLMENTS)    BUY NOW
START TODAY WITH A $90 DOWN PAYMENT ON CREDIT OR DEBIT CARD.

COVERAGE START DATE    PAYMENT OPTIONS
XX/XX/XXXX ⊙ EDIT    ☐ PAY IN FULL ⊙
                     ☐ BANK ACCOUNT EASY PAY ⊙

💡 MAJORITY OF PEOPLE IN YOUR ZIP CODE CHOOSE EASY PAY TO SAVE 5% ON PREMIUM AND ALSO CHOOSE PAY IN FULL TO SAVE AN ADDITIONAL 5%

INCLUDED DISCOUNTS  $255.14    SHOW DETAILS ▶
RETURN TO SAVINGS FINDER CALCULATOR    CUSTOMIZE

NOTE THE MONTHLY PAYMENT OPTION MAY INCLUDE INSTALLMENT FEES.

ADDITIONAL COVERAGES AND LIMITS MAY BE AVAILABLE THROUGH YOUR LOCAL AGENT. NOTE THAT THE PLANS REFERENCED ON THIS PAGE VARY BY COVERAGE LIMITS, BENEFITS AND FEATURES. YOU CAN EDIT OR CHANGE LIMITS OR FEATURES TO FIT YOUR SPECIFIC NEEDS. BE SURE TO REVIEW THE LIMITS SELECTED, FEATURES AND ANY LIMITATIONS BEFORE PURCHASING COVERAGES.

1503

👥 POLICY COVERAGES ⊙    ⊙ EDIT COVERAGES

| BODILY INJURY LIABILITY ⊙ | $25,000/$50,000 |
| PROPERTY DAMAGE LIABILITY ⊙ | $25,000 |
| MEDICAL PAYMENTS ⊙ | NOT DESIRED |
| UNINSURED/UNDERINSURED MOTORIST ⊙ | $25,000/$50,000 |
| UNINSURED MOTORIST PROPERTY DAMAGE ⊙ | NOT DESIRED |

💡 THE MAJORITY OF PEOPLE IN YOUR AREA MATCHING YOUR PROFILE, SELECT UNINSURED/UNDERINSURED COVERAGE OF $50,000/$100,000 BECAUSE OF THE ACCIDENT TYPES IN YOUR AREA.

🚗 VEHICLE DEDUCTIBLES AND ADDITIONAL COVERAGES ⊙    ⊙ EDIT DEDUCTIBLES

⊖ CAR1:

| COLLISION ⊙ | NOT DESIRED |
| COMPREHENSIVE ⊙ | $500 |
| RENTAL REIMBURSEMENT ⊙ | NOT DESIRED |
| TOWING AND LABOR COST ⊙ | NOT DESIRED |
| SOUND SYSTEM ⊙ | NOT DESIRED |

💡 80% OF PEOPLE WITH A VEHICLE OLDER THAN 10 YEARS ONLY SELECT LIABILITY COVERAGE INSTEAD OF COMPREHENSIVE COVERAGE

BUNDLE AND SAVE!!!
◀ 🚗+🏠 CUSTOMERS LIKE YOU OFTEN CONSIDER RENTERS INSURANCE ALONG WITH AUTO INSURANCE AND SAVE UP TO 20% ON INSURANCE ▶
⊙ ADD TO QUOTE

YOUR PERSONAL QUOTE IS NOT A CONTRACT OR BINDER OF INSURANCE. THESE PREMIUMS ARE AN ESTIMATE BASED UPON THE INFORMATION YOU PROVIDED AND ARE SUBJECT TO CHANGE. PREMIUMS ARE BASED ON THE ASSUMPTION YOU WILL PURCHASE COVERAGE AT THE TIME YOU COMPLETE YOUR QUOTE. TO APPLY FOR INSURANCE, YOU MUST COMPLETE THE APPLICATION PROCESS. RATES SUBJECT TO CHANGE. ADDITIONAL FEES, SURCHARGES, DISCOUNTS, EXCLUSIONS OR OTHER LIMITATIONS MAY APPLY.

FIG. 15A

DELIVERY OF CUSTOMIZED INSURANCE PRODUCTS AND SERVICES

CROSS-REFERENCE TO RELATED APPLICATIONS

The present application is a continuation-in-part of U.S. patent application Ser. No. 13/112,825 filed May 20, 2011, and entitled "Processing an Application for Insurance Coverage," which is a continuation of U.S. patent application Ser. No. 12/959,108 filed Dec. 2, 2010 and entitled "Processing an Application for Insurance Coverage," which is a continuation of Ser. No. 12/903,861 filed Oct. 13, 2010 and entitled "Processing an Application for Insurance Coverage," which is a continuation of U.S. patent application Ser. No. 12/793,325, filed Jun. 3, 2010 and entitled "Systems and Methods for Customizing Insurance" which is a continuation of U.S. patent application Ser. No. 11/551,595, filed Oct. 20, 2006 and entitled "Systems and Methods for Customizing Automobile Insurance" and patented as U.S. Pat. No. 7,774,217 which is a continuation-in-part of U.S. patent application Ser. No. 11/270,611, filed Nov. 10, 2005 and entitled "Systems and Methods for Customizing Insurance" which claims priority to U.S. Provisional Application No. 60/629,318, filed Nov. 19, 2004, the entire disclosures of which are hereby incorporated by reference.

TECHNICAL FIELD

The present invention relates to systems and methods for customizing insurance and, more particularly, to customizing insurance policies according to consumer preferences. The present invention also provides systems and methods for presenting insurance products/services to consumers.

BACKGROUND

Today's consumer is presented with an increasing number of purchase options and is more pressed than ever for time. With increasing choices and time demands, consumers can become overwhelmed when reviewing the massive amount of information they encounter in shopping. The pressures attendant the time constraints and information can pervade a consumer's shopping experience, including shopping for insurance.

New technologies, however, now make possible aids to help consumers as they make informed choices about insurance products/services in much less time that they could years ago. The challenge is how to harness those technologies.

SUMMARY

Methods and systems are provided for creating insurance packages and providing insurance services. Insurance packages may be created by performing research to identify a target population and a set of insurance features desired by the target population. The set of insurance features may be bundled into an insurance package. The packages may include standard components, combinations of optimized components, optimized combinations of standard components and various combinations. The insurance packages may provide automobile insurance, homeowner's insurance and other types of insurance.

In certain embodiments of the invention, aspects of the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

FIG. 13 shows a first user interface screen for inputting information used by an enhanced attributes analysis server in presenting insurance options to a potential customer/customer, in accordance with an embodiment of the invention;

FIG. 15A shows a third user interface screen presenting a detailed insurance option based on customer information entered in previous screens, in accordance with an embodiment of the invention;

DETAILED DESCRIPTION

Figure 1:
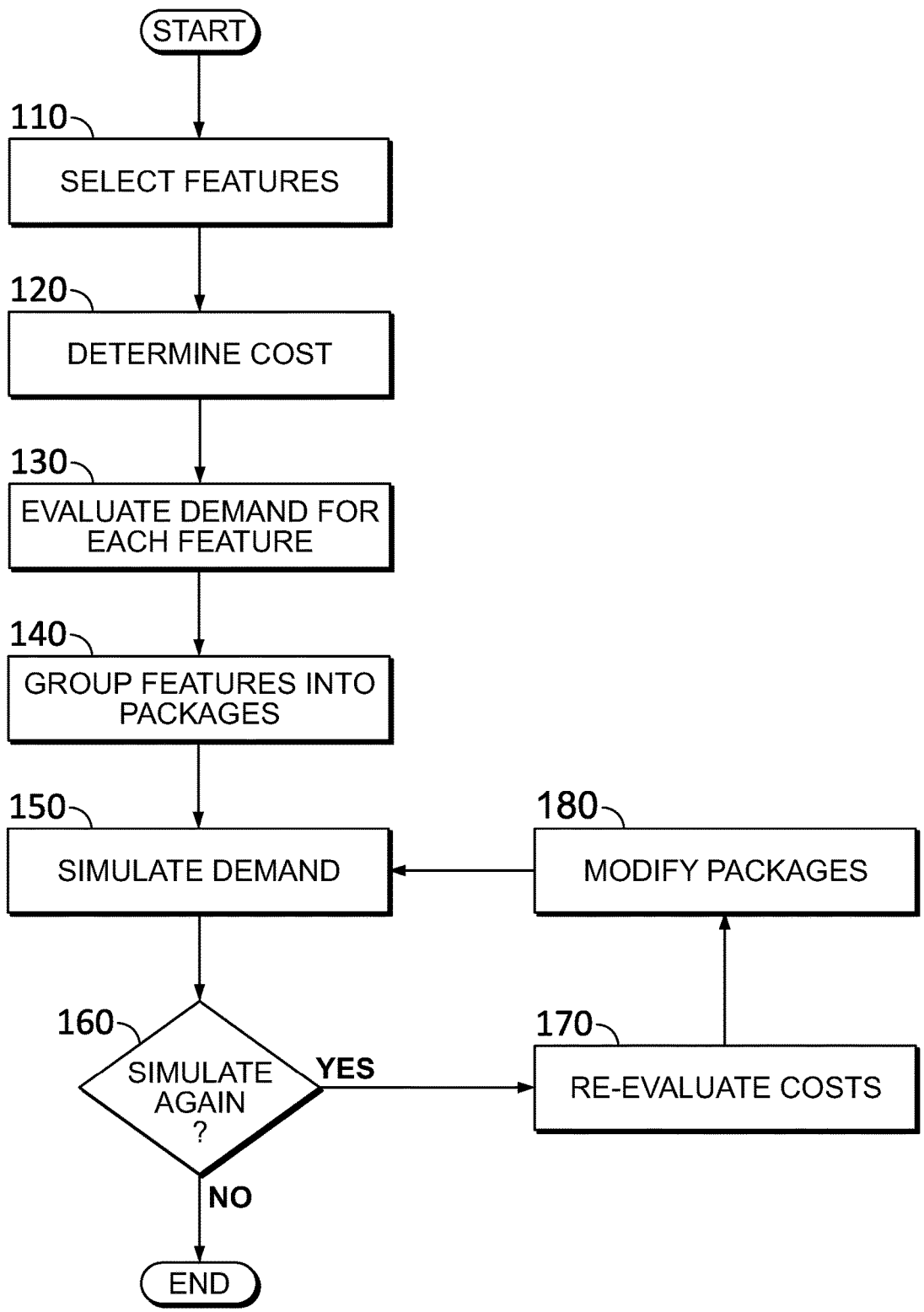
FIG. 1 is an exemplary flow chart for optimizing insurance products, in accordance with an embodiment of the invention.

Generally, insurance is an agreement by which an insurer, sometimes referred to as an underwriter, in exchange for consideration, undertakes to indemnify the insured party against loss, damage, or liability arising from certain risks. The consideration paid by an insured party is typically referred to as a premium, which is paid to keep the insurance in effect. In general, an insurance policy is a contract of insurance that defines the rights and duties of the contracting parties. A typical insurance policy includes limits on the amount and type of risk that the insurer will cover.

Systems and methods consistent with aspects of the present invention provide consumers with insurance products that may help them address some of their individual needs or wants by including features that a particular group may find desirable or appropriate. For the purposes of this application, features may include coverages, terms, and rewards. Generally, a coverage provides a protection or indemnification to the insured. A term includes any word, phrase, or provision of import that determines the nature and scope of an agreement, such as the coverage grant in an insurance coverage or the premium charged. A reward may include a discount, credit, or benefit provided to the insured upon the occurrence of a specified event.

When a feature is not included in a group, that particular feature is referred to as an ala carte feature. Ala carte features refer to coverages, terms, and rewards that are selected by the insured on an individual basis for inclusion in an insurance product.

Features may be grouped together to form a package. For example, one grouping may form a value package for price conscious consumers, another grouping may form a protection plus package providing additional features, and yet another grouping may form a platinum package including yet more additional features. An insurance product may also include a standard package that includes coverages required by state law, such as bodily injury liability coverage and property damage liability coverage. Coverages in a standard package may also include personal injury protection coverage, medical payment coverage, uninsured motorist coverage, underinsured motorist coverage, collision coverage, and comprehensive coverage.

Most states mandate minimum types and levels of automobile insurance coverage. For example, a state may require liability coverage with mandated minimum coverage limits. Depending upon the particular state, some common coverages may be mandatory or optional. Other coverages, such as collision and comprehensive, may be required by banks or financial institutions as a prerequisite to obtain vehicle financing.

In the marketplace today, an automobile insurance product offering might include standard coverages required by state law and/or financial institutions. A standard package includes coverages and coverage limits that meet minimum state law requirements. A standard package may also include other coverages that are required by financial institutions. Additionally, insurance companies may offer coverages and coverage limits that are not required by state law or by financial institutions. Coverage examples include towing reimbursement and car rental reimbursement.

Automobile insurance consumers find value in optional coverages designed around potential risks uniquely associated with driving and or repairing of vehicles. Some examples include towing and emergency repair coverage. A car rental reimbursement coverage may help pay for the use of a rented vehicle while the insured vehicle is being repaired due to a loss caused by a covered peril. Other personal coverages are also offered in the event certain covered perils occur.

The following provides a summary of an exemplary basic optimized package, two additional optimized packages, and various exemplary ala carte features that may be added by a consumer to one of the optimized packages. For example, a basic package might include a reduced premium by adding in a few terms. It is designed as an alternative for the customer particularly concerned about price. In particular, a customer may be required to participate in an arrangement that automatically makes periodic (for example, monthly) deductions from the insured's savings or checking account to pay the premium and other charges or fees associated with the insurance. Customers will be charged an early termination fee (such as $100) if the insurance is terminated by the insured, which might include the insured's failure to accept a renewal offer, or terminated for non-payment of premium, within a specified period of time after the package is added.

Another optimized package might offer an accident waiver enhancement feature and a safe driving deductible reward feature. The accident waiver enhancement feature might specify that the first rate-affecting accident that occurs will not cause the loss of certain discounts or result in the application of any accident surcharges. Subsequent rate affecting accidents will not cause the loss of the discounts or the application of any accident surcharges if the insured has not received this waiver in the thirty-six month experience period ending on the date of the accident. Similarly, a ticket forgiveness feature might specify that a ticket for a traffic violation will not cause the loss of certain discounts or result in a policy not being renewed.

The safe driving deductible reward feature might provide, upon enrollment, that the customer will receive an initial reduction (such as $100) in his or her collision deductible. For each twelve month experience period the policy is not assigned an accident, the insured will receive an additional reduction (up to a maximum $500 reduction) in their collision deductible that will apply to all covered collision claims during the next policy period.

Yet another optimized package might offer an accident waiver enhancement plus feature, a safe driving deductible reward feature, and a safe driving bonus feature. With the accident waiver enhancement plus feature, neither a single accident nor multiple accidents will cause the loss of certain discounts or the application of accident surcharges as long as the accidents occur while this feature is part of the policy. The safe driving bonus feature may provide if the policy is not assigned an accident for a designated six-month experience period, the insured will receive 5% of their previous term's premium for major coverages as a credit that can be applied toward the next six-month premium.

Both of the above-described exemplary optimized packages may also allow the customer the opportunity to add, for an additional premium, an additional feature in the form of a new car expanded protection coverage feature on an automobile that has collision and comprehensive coverages. The coverage provided by this feature will continue while collision and comprehensive coverages are maintained and will be removed at the first renewal that is effective in the calendar year that is three years greater than the auto's model year.

The new car expanded protection coverage feature may provide that, in the event of a covered loss to an automobile other than a total loss, the insurance carrier will pay to repair the auto without a deduction for depreciation. The repair coverage may not apply to losses caused by fire, theft, larceny, or flood. Furthermore, the amount payable will be reduced by any amounts paid or payable under the collision or comprehensive coverages as well as any applicable collision or comprehensive deductible.

The new car expanded protection coverage feature may also provide that, in the event of a covered total loss, the insurance carrier will pay to replace the automobile with a new one of the same make and model with the same equipment or, if a new automobile of the same make and model with the same equipment is not available, a new automobile that is similar in size, class, body type and equipment (subject to a price limitation described in the coverage). The replacement coverage may not apply to leased vehicles or to losses caused by fire, theft, larceny, or flood. Furthermore, the amount payable will be reduced by any amounts paid or payable under the collision or comprehensive coverages, any applicable collision or comprehensive deductible, and the dollar amount of any unrepaired damage that occurred prior to the total loss of the automobile.

The new car expanded protection coverage feature may also provide that, in the event of a covered total loss, if the amount the customer owes under the original automobile loan or automobile lease exceeds the actual cash value of the automobile at the time of loss, the insurance carrier will pay the difference between the amounts. The amount payable may be reduced by any overdue loan or lease payments (and any financial penalties associated with those overdue payments), the transfer or rollover of a previous outstanding loan or lease balance from another vehicle to the original loan or lease for the covered automobile, the dollar amount of unrepaired damage which occurred prior to the total loss, all refunds paid or payable to the customer as a result of the early termination of the automobile loan or automobile lease agreement (including financed warranty/extended service contracts), and any amount paid or payable under the replacement protection of the new car expanded coverage protection feature.

In forming the above exemplary packages that are offered for sale by an insurance carrier, one forming the package offerings might decide to consider consumer "need states" to group features into packages offered for sale. Need states refer to the complex web of rational and subconscious triggers that prompt a consumer to make a product selection. Need states may be prompted by a consumer deciding that he or she needs or wants to obtain a product. Furthermore, they are generally a result of an individual's situation at a particular point in time. Life stage events, such as a new driver in the family, shift consumers' need states. Of course, automobile insurance consumers may have varied circumstances, and consequently, differing insurance needs and wants. One may be a student with limited resources, and as a result, might select state mandated coverage. Another may be near retirement and focused on protection of assets and convenience of services.

Systems and methods consistent with aspects of the present invention identify distinct groupings of insurance consumers with similar need states and identify the most commonly desired optional features that consumers might chose to help meet their needs. Optional features are then combined by the system into optimized packages of insurance products that are offered for sale to consumers. By grouping features into packages that align with common need states, the offered products will be attractive to persons in need states that were considered when designing the packages.

An "optimized package" includes a set of insurance features that are packaged to help address the needs and wants of consumers in a particular grouping (e.g., geographic or demographic based groups, etc.). Ala carte features may also be optimized. For example, ala carte features may be optimized by grouping certain ala carte features together that share an attribute. Accordingly, both optimized features and optimized ala carte features include coverages, terms, and rewards that are selected from a group that shares an attribute. The shared attribute allows the features to be grouped around a common theme. For example, a value grouping may include features designed around lower price. A protection theme may include features optimized around protecting assets. For the most part, features are grouped to share an attribute, however, features that are grouped around a common theme may also include one or more features that do not share the common theme or are based on a regional theme.

More than one package may be grouped together to form a "plan." A plan refers to a grouping of a standard package with at least one optimized package of features. A consumer may also add ala carte features, or optimized ala carte features, to a plan on an individual basis.

The process by which packages are designed may involve consideration of market theories. When looking to a market, one needs to identify the individuals that might decide to purchase a product. A group of persons that may be interested in or share a need for a particular product or products is defined as a target population. Accordingly, the target population is the group to be reached through some action or intervention and may refer to groups with specific characteristics.

Market segmentation refers to the process of grouping persons in a target population into smaller subgroups called market segments. A market segment is a group within a heterogeneous market consisting of consumers or organizations with relatively homogeneous needs and wants. Consumers in a market segment are expected to respond to a given set of marketing stimuli in a similar manner. Ideally, individuals within a market segment will likely have similar feelings about a marketing mix comprised of a given product, sold at a given price, distributed in a certain way, and promoted in a certain way. Accordingly, a market segment is a more specifically defined group within the target population.

A target population or a market segment may share one or more common characteristics that statistically describe the persons within the target population or market segment. Characteristics may include gender, age, occupation, marital status, and family size. As will be discussed further below, other characteristics that a target population may share include credit risk, level of risk tolerance, value of assets needed to be protected, willingness of a person to pay more for a lower deductible, and desire for predictable out-of-pocket expenses annually, among other things.

To select features that might appeal to a particular target population or market segment, features may be grouped together along marketing demand parameters. Groups of features are offered in different product structures, which are discussed in further detail below. Utility-based groupings maximize product acceptance of product packages by statistically predicting consumer demand based on multidimensional analysis of consumer motivations. These motivations are then compiled through a demand simulator to identify and target product requirements that may be attractive to various segments of the consumer population. A demand simulator measures overall demand potential as well as consumer preferences for various product features and brands. By using a demand simulator, it is possible to identify the features that consumers might want most, and then measure the price they are willing to pay for them. Demand simulators are discussed more fully below.

For example, certain features have more universal consumer appeal while other features appeal to a specific consumer characteristic. An optimization process creates focused sets of features. The process may organize product packages around central motivation factors, such as price points and common feature acceptance. Using feature interest as a motivating factor, the most popular features can be grouped to form a set of features that are both universally popular and provide an acceptable profit to an insurance carrier.

Differentiation is introduced by adding features to packages that specifically address the motivations of a specific consumer group. For example, some consumer groups are interested in security features, while others may have young drivers in the household. Because some consumers are highly driven by features while others are driven by price, package structures may be optimized based on price to motivate a consumer segment. Alternatively, package structures may be optimized based on features that appeal to less price-sensitive members of the consumer population. In addition, some optimized package structures may be based upon both price and feature considerations.

Insurance products generated according to the present invention may be offered for sale in a variety of manners. For example, consistent with the present invention, optimized packages may be offered through any form of visual display, either electronically or by the use of brochures, posters, signs, standing displays, and any other form of visual and/or written communication. In addition, one may offer optimized packages through an insurance carrier's agents in person, over the telephone, or via the Internet. In an Internet implementation, or over the telephone using a voice recognition system, such interactions may occur automatically.

Reference will now be made in detail to exemplary embodiments of the invention, examples of which are illustrated in the accompanying drawings. Wherever possible, the same reference numbers will be used throughout the drawings to refer to the same or like parts.

FIG. 1 is a flow chart for optimizing customizable insurance products, in accordance with an embodiment of the invention. One may optimize insurance products by designing packages using a process that takes into account the considerations discussed in further detail below.

First, features are identified as candidates to be offered as part of various packages, which together form an insurance product. Step 110. To identify those features that one might consider as candidates, business performance data may be analyzed. Business performance data may include different subsets of data obtained by collecting existing information from the marketplace to analyze for trends and to understand the landscape of available options. A possible subset of business performance data is market-share data, which includes industry data used to evaluate current levels of market share for particular consumers to determine demand generated by specific product offerings. In this step of the process, one might identify a target population and/or a market segment.

Other categories of data considered in this step include industry-product-offering data and internal-pricing data. Industry-product-offering data includes an evaluation of the products and features offered in policies from various insurance carriers. In addition, this data may be supplemented by internal pricing data proprietary to the insurance carrier conducting the demand simulation.

Internal-pricing data may include the insurance carrier's premiums, loss, and expense data so that the cost of features can be taken into account. Internal-pricing data allows one to compare a specific insurance carrier's ability to provide a product to consumers at a price consumers are willing to pay. Other ways of arriving at candidate features include brainstorming with experts, examining the current and past marketplace, and by soliciting and receiving suggestions and input from consumers and agents.

Next, the cost of each candidate feature is determined. Step 120. In determining costs of the candidate features, the losses that are expected for a particular feature are examined when determining the premium that consumers will pay.

Once candidate features and costs are determined, the demand for each feature in the marketplace is evaluated. Step 130. During the evaluation, consumer preferences are evaluated to form price utility curves, which are created after conducting consumer research to better understand consumer preferences for each feature or combination of features.

The process of evaluating demand may include collecting information using focus groups selected from different geographic regions. For example, persons participating in focus groups can be selected across all age groups that have actively shopped for insurance during an appropriate time frame. Selection of groups may occur on the basis of any identified target population and/or market segment. During this step, features may be eliminated from further consideration based upon the focus groups' preferences. In addition, focus groups may provide survey information identifying the price each individual was willing to pay for certain features. Such considerations may involve an evaluation of sample packages containing different combinations of features offered at different prices.

Next, features may be grouped into possible packages. Step 140. During this step, cost prohibitive features may be eliminated from packages because consumers may not be willing to pay the price of a particular feature. Also, strategic alternatives data may be examined, including price-point data and variable-feature-level data. Price point data includes an evaluation of a particular insurance carrier's current prices to competitors' prices and includes an evaluation of the impact of adding packaged features. Variable feature level data may be considered to describe the most compelling packages of features. Variable feature level data is derived from consumer research and includes uniqueness and differentiation of features to evaluate the best features and how features should be grouped in packages.

In addition, incremental costs of strategic alternatives data includes variable-feature-cost data and fixed-cost-investments data. Variable-feature-cost data describes an insurance carrier's proprietary loss and expense data and is used to determine a cost to offer a given feature. Fixed-cost investments data takes into account systems, infrastructure, and other costs associated with implementation of an optimized product architecture.

When designing packages, another concept that may be incorporated into the process is that of self-selection. For example, packages should include features that appeal to consumers in a particular need state such that these consumers will recognize the value of a particular package and consider including it in their insurance selections.

Next, demand is simulated using a demand simulator. Step 150. The demand simulator estimates the number of individuals that will purchase a particular product offering. Optimization of packages is accomplished by iteratively trying all possible package combinations or by determining which features may be substituted for other features in the most optimal packages to arrive at a set of features that provides an arrangement of features that a consumer would find of value.

The demand simulator may be implemented as a software module, which processes data provided to it. During the operation of the demand simulator, user input may provide the ability to select different features and to alter inputs to the module. Consistent with the present invention, processing may also occur automatically at the direction of optimization software including automated logic.

Features that are used by the demand simulator may be selected with utility-based product segmentation. As discussed above, price-utility curve data may be used to determine packages. A utility value for each feature may be determined through consumer research to identify the features most attractive to the overall target population as well as to subsets of the target population that form market segments. Features are then grouped into packages, and groups of packages form an insurance product.

After the demand simulator provides an initial processing of features, a user may decide whether to simulate demand again. Step 160. If the user decides to stop, the process ends. If the user decides to continue, the process goes to Step 170. In Step 170, processing may be further refined by re-examining costs of packages by examining different feature combinations based on particular judgment criteria. For example, if the cost of offering a particular package is high, it may be identified using variable-feature-cost data and fixed-cost investment data, as described above in connection with Step 120.

After inspecting the costs, certain features may be removed or added to packages. Step 180. User input may further provide the ability to select different features and to alter inputs to the module. The process then returns to simulate demand for the newly modified packages. Step 150.

Figure 2:
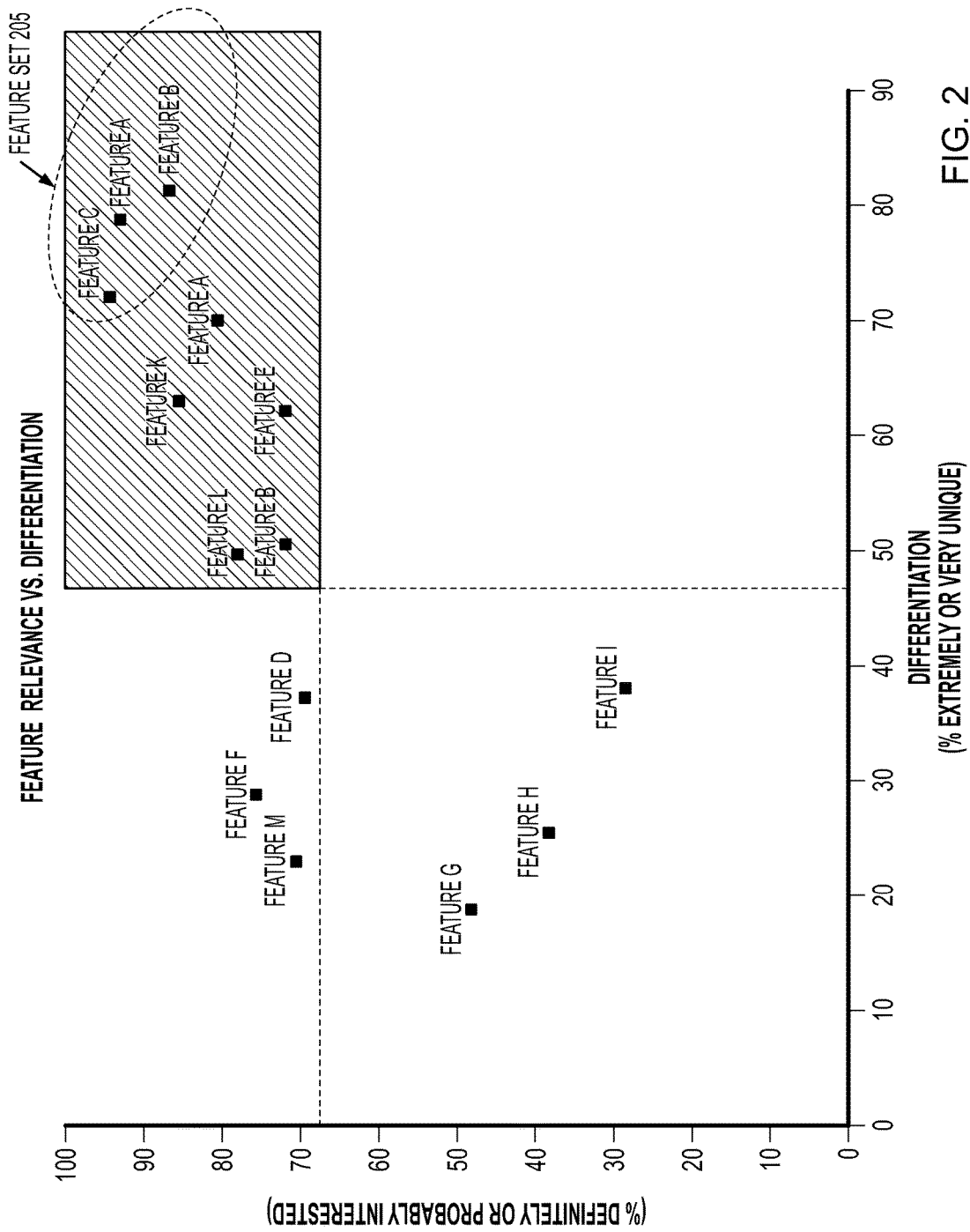
FIG. 2 is an exemplary chart comparing feature relevance and feature differentiation, in accordance with an embodiment of the invention.

FIG. 2 shows an exemplary chart comparing feature relevance and feature differentiation used to perform analysis used in optimizing features for packages. By plotting the data as shown in FIG. 2, it is possible to determine a feature set 205 that includes features that are highly relevant and distinctive. Such a process may be done for an entire population to arrive at feature set 205 and may also be done for sub-segments based on characteristics common to the sub-segments to determine the packages that most appeal to a particular group or subgroup.

Accordingly, research may be performed to identify a target population and a set of insurance features desired by the target population. The set of insurance features are bundled into an insurance package. A cost of the insurance package may be determined and the insurance package may be offered for sale.

Furthermore, the research to identify the insurance features may be carried out through an optimization process, as described above. In some embodiments, the optimization process is based upon consumer factors. In other embodiments, the optimization process is based also upon financial criteria that provide the insurance company with an acceptable profit. The research may also include examining common characteristics of the target population or of a market segment within the target population.

This procedure may be repeated for additional market segments. A set of ala carte features may also be identified and a cost for each of the ala carte features may also be identified, along with determining corresponding prices for the ala carte features and offering the ala carte features for sale at the corresponding prices.

In one embodiment of the invention, an optimized package includes a basic set of insurance features and may be offered for sale along with the insurance package. A standard package may include a set of insurance features required by a governing law. Alternatively, a standard package may also include a set of insurance features required by a financial institution.

For example, an optimized package may additionally include a set of insurance features created by performing research to identify a target population or a market segment. Alternatively, a standard package may also be combined with the optimized package to form a plan. Sets of additional insurance features may also be selected to form additional packages. Each plan may include a standard package and an optimized package.

In addition, a third party may sell optimized packages without a standard package. Such a situation might involve a third party's sale of optimized packages as additions to an existing insurance product. An insurance carrier has sold the existing insurance product to a consumer, who has then gone to a third party from which the consumer may obtain the optimized packages. The optimized packages, however, may be created or selected consistent with the principles of the present invention.

Figure 3:
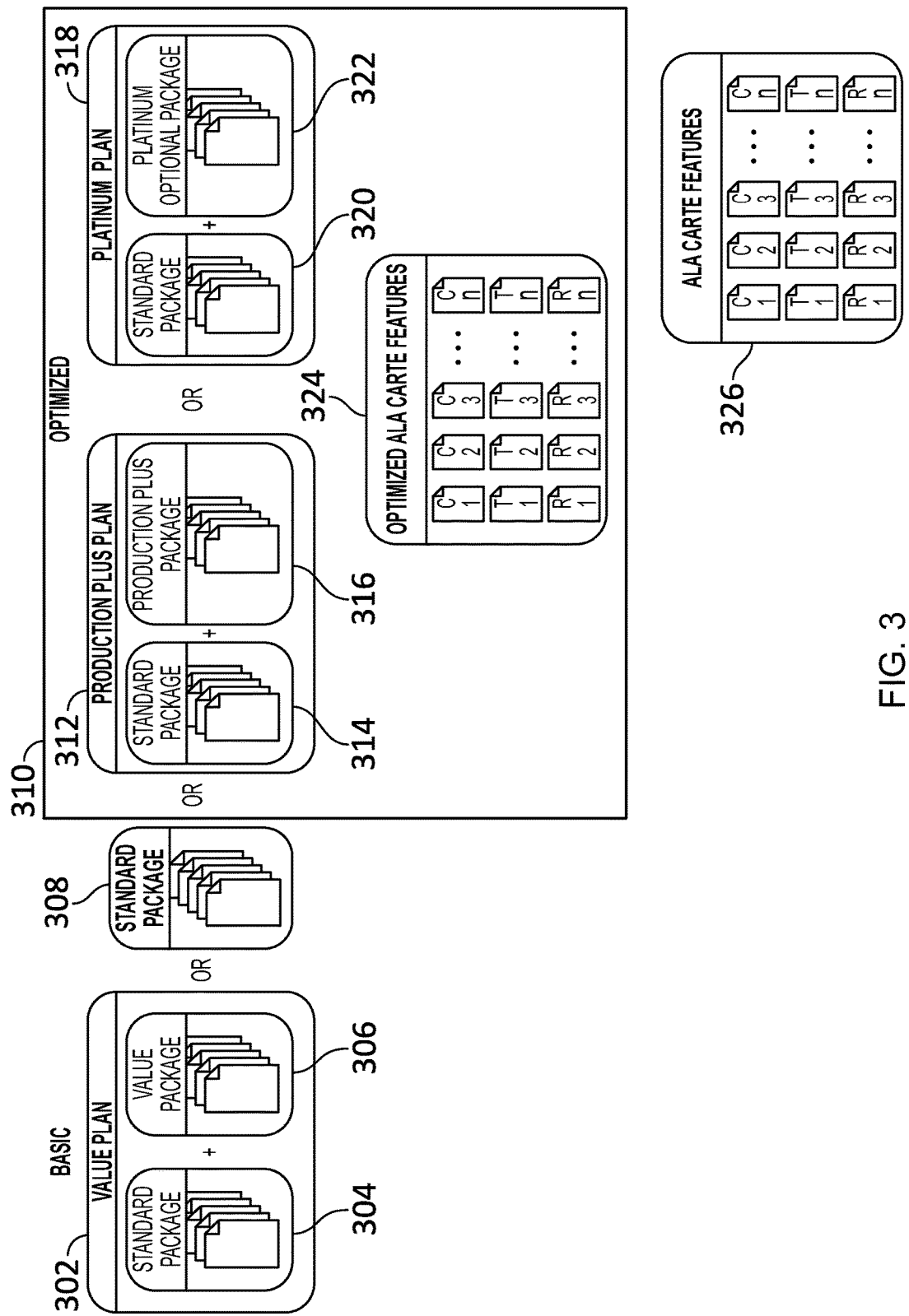
FIG. 3 is an exemplary method of offering insurance, in accordance with an embodiment of the invention.

FIG. 3 is an exemplary method of selling insurance, in accordance with an embodiment of the present invention. As shown in FIG. 3, a consumer is offered a variety of options. For example, a consumer may only want to purchase a basic insurance product. That consumer may select a standard package 308. Alternatively, the consumer may select a value plan 302, which includes a standard package 304 and a value package 306 with additional features.

However, if a consumer would like to purchase more than a basic insurance product, the consumer may select from optimized package group 310. FIG. 3 includes two exemplary optimized packages: a protection plus plan 312 and a platinum plan 318. Protection plus plan 312 includes a standard package 314 and a protection plus package 316. Protection plus package 316 may include features such as a repair/replace feature and a loan/lease-gap coverage feature. Alternatively, the consumer may select platinum plan 318, which includes a standard package 320 and a platinum options package 322. Platinum options package 322 may include features such as a repair/replace feature, a loan/lease-gap coverage feature, a monetary death indemnity feature, and a full roadside assistance feature.

In addition, the consumer may select from optimized ala carte features 324. Optimized ala carte features 324 are individual features sold separately as add-ons to certain optimized packages. Optimized ala carte features 324 have been keyed as a group to share an attribute. In addition, the consumer may also select from a general group of ala carte features 326 that have not been optimized. As shown in FIG. 3, there are many possible combinations and variations from which a consumer may select to form an insurance product.

Figure 4:
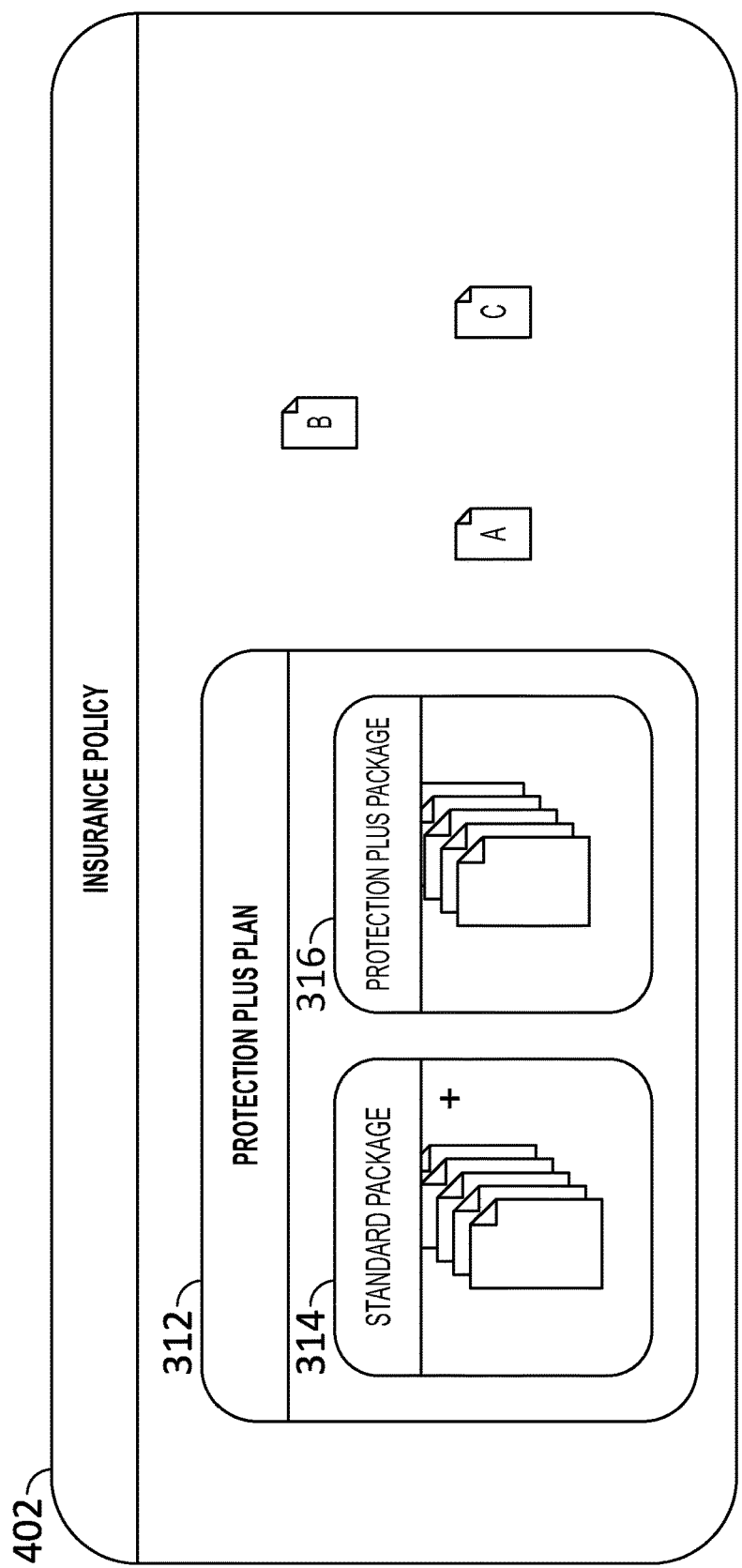
FIG. 4 shows an exemplary insurance product comprising packages selected from FIG. 3, in accordance with an embodiment of the invention.

FIG. 4 shows an exemplary insurance product comprising packages selected from FIG. 3. The example shown in FIG. 4 displays a possible selection that a consumer may make from the options provided in FIG. 3 to form insurance product 402. Insurance product 402 includes protection plus plan 312, which includes standard package 314 and protection plus package 316. In addition, insurance product 402 includes several ala carte features labeled A, B, and C, which may or may not be optimized.

Figure 5:
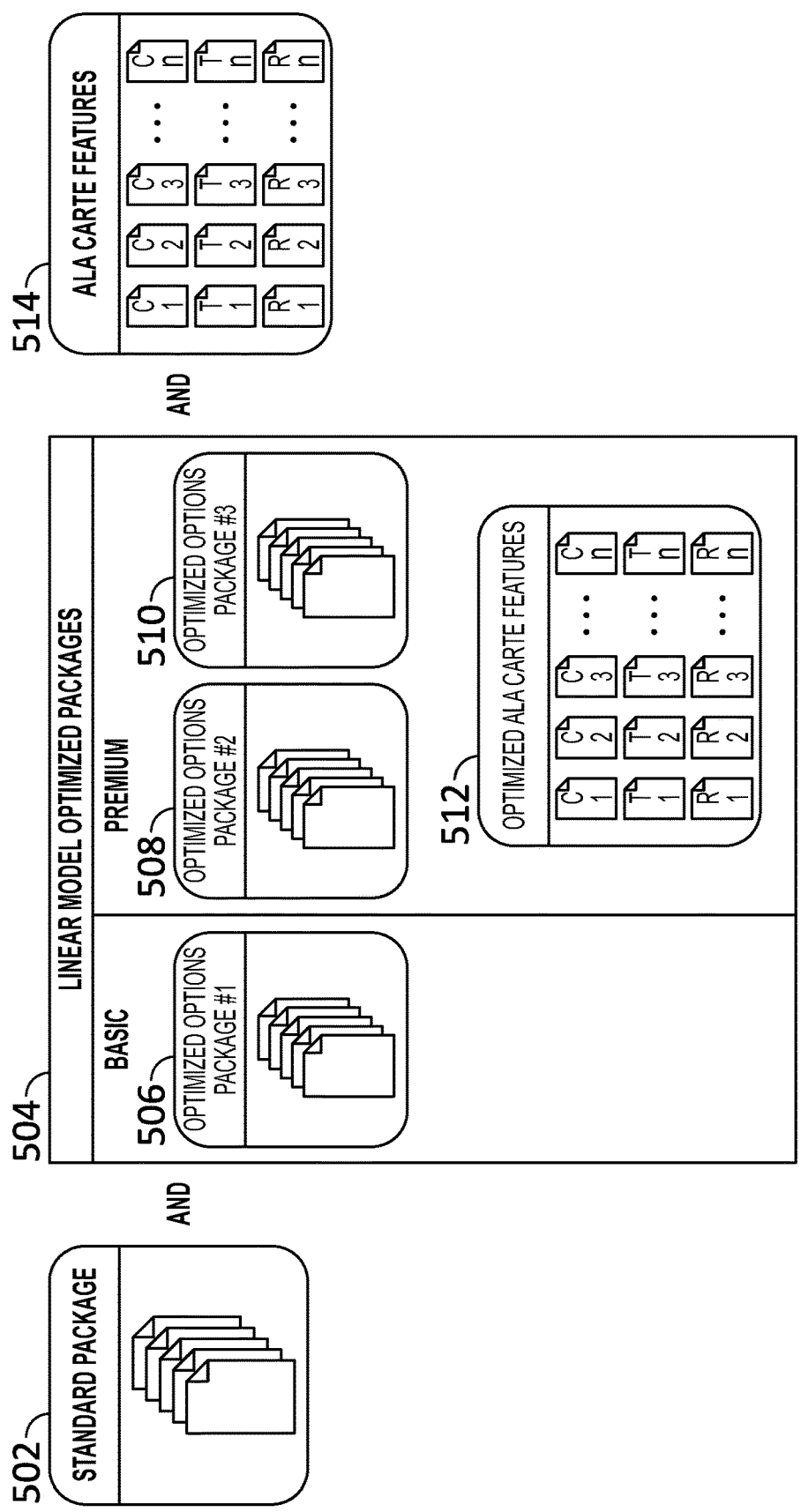
FIG. 5 is another exemplary method of offering insurance, in accordance with an embodiment of the invention.

FIG. 5 is another exemplary method of selling insurance in accordance with an embodiment of the invention. In the method shown in FIG. 5, a consumer combines packages in a linear fashion to form an insurance product. For example, the consumer selects a standard package 502. Since standard package 502 meets the minimum requirements for an insurance product, the consumer may decide only to purchase standard package 502. However, the consumer may also decide to select additional optimized packages from optimized package group 504. For example, the consumer may also select optimized options package 506, which is considered a "basic" optimized package. In addition, however, the consumer may also select optimized options package 508 and/or optimized options package 510. These additional optimized packages are considered "premium" packages because they offer additional features at a cost greater than the basic optimized package. Furthermore, optimized packages 506-510 may include features optimized in a manner consistent with the present invention. In some embodiments, a consumer may be required to first select, for example, a particular optimized options package before the consumer may select a further optimized package. Such a "tiered" arrangement requires the purchase of an initial optimized package as a prerequisite before additional optimized packages may be purchased.

Once the consumer has selected optimized options package 508 or optimized options package 510, the consumer may also select any one or more optimized ala carte features 512. Additionally, a consumer that has selected any one of optimized options packages 506-510 may also select one or more ala carte features 514. As shown in FIG. 5, there are many possible combinations and variations from which a consumer may select to form an insurance product.

Figure 6:
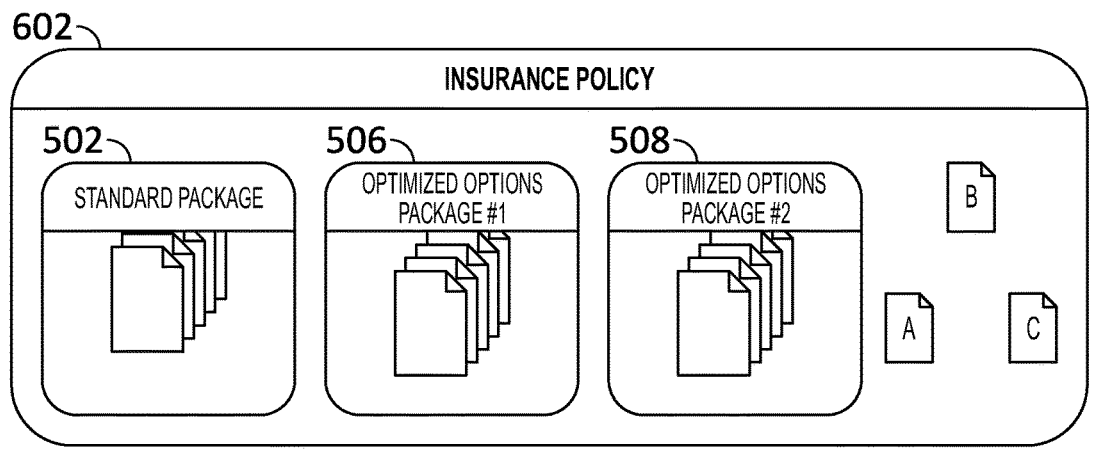
FIG. 6 shows an exemplary insurance product comprising packages selected from FIG. 5.

FIG. 6 shows an exemplary insurance product comprising packages from FIG. 5. The example in FIG. 5 shows a possible selection that a consumer may make to form insurance product 602. Insurance product 602 includes standard package 502, optimized package 506, and optimized package 508. In addition, insurance product 602 includes several ala carte features A, B, and C, which may or may not be optimized.

Figure 6A:
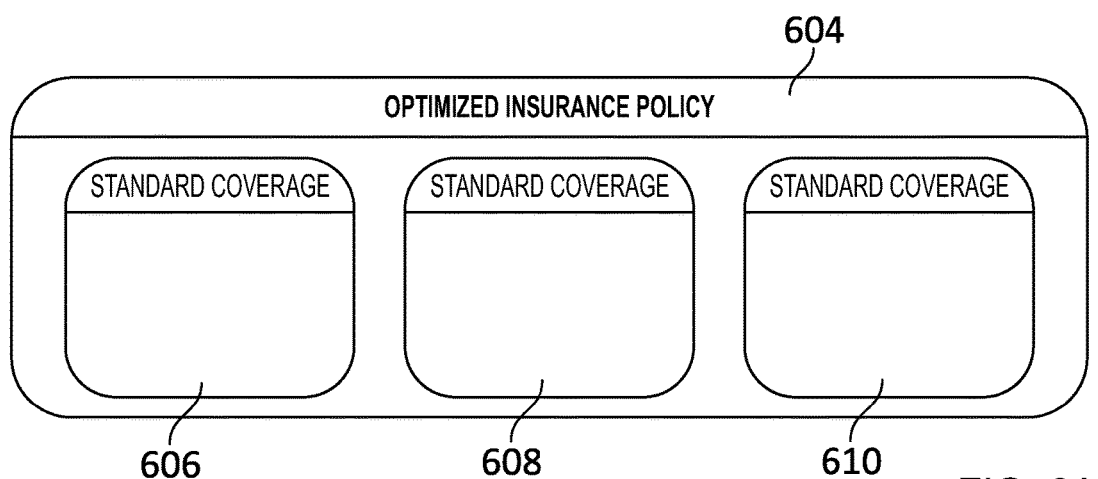
FIG. 6A shows an optimized insurance policy that includes a combination of standard coverage components, in accordance with an embodiment of the invention.
Figure 6B:
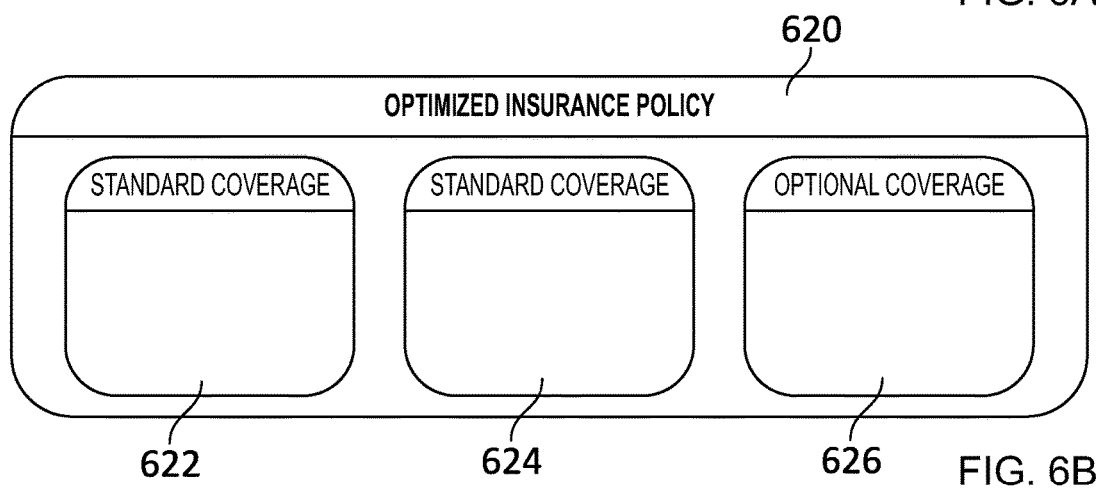
FIG. 6B shows an exemplary optimized insurance policy that includes standard coverage components and an optional coverage component, in accordance with an embodiment of the invention.

Those skilled in the art will appreciate that aspects of the invention may be applied to create a variety of different insurance products. The insurance products may include combinations of optimized components, optimized combinations of standard components and combinations of both. FIG. 6A, for example, shows an optimized insurance policy 604 that includes a combination of standard coverage components 606, 608 and 610. In one implementation, optimized insurance policy 604 is a homeowner's insurance policy. FIG. 6B illustrates an exemplary optimized insurance policy 620 that includes standard coverage components 622 and 624 and an optional coverage component 626. Optional coverage component 626 may include a grouping of insurance features that share a common attribute.

Figure 7:
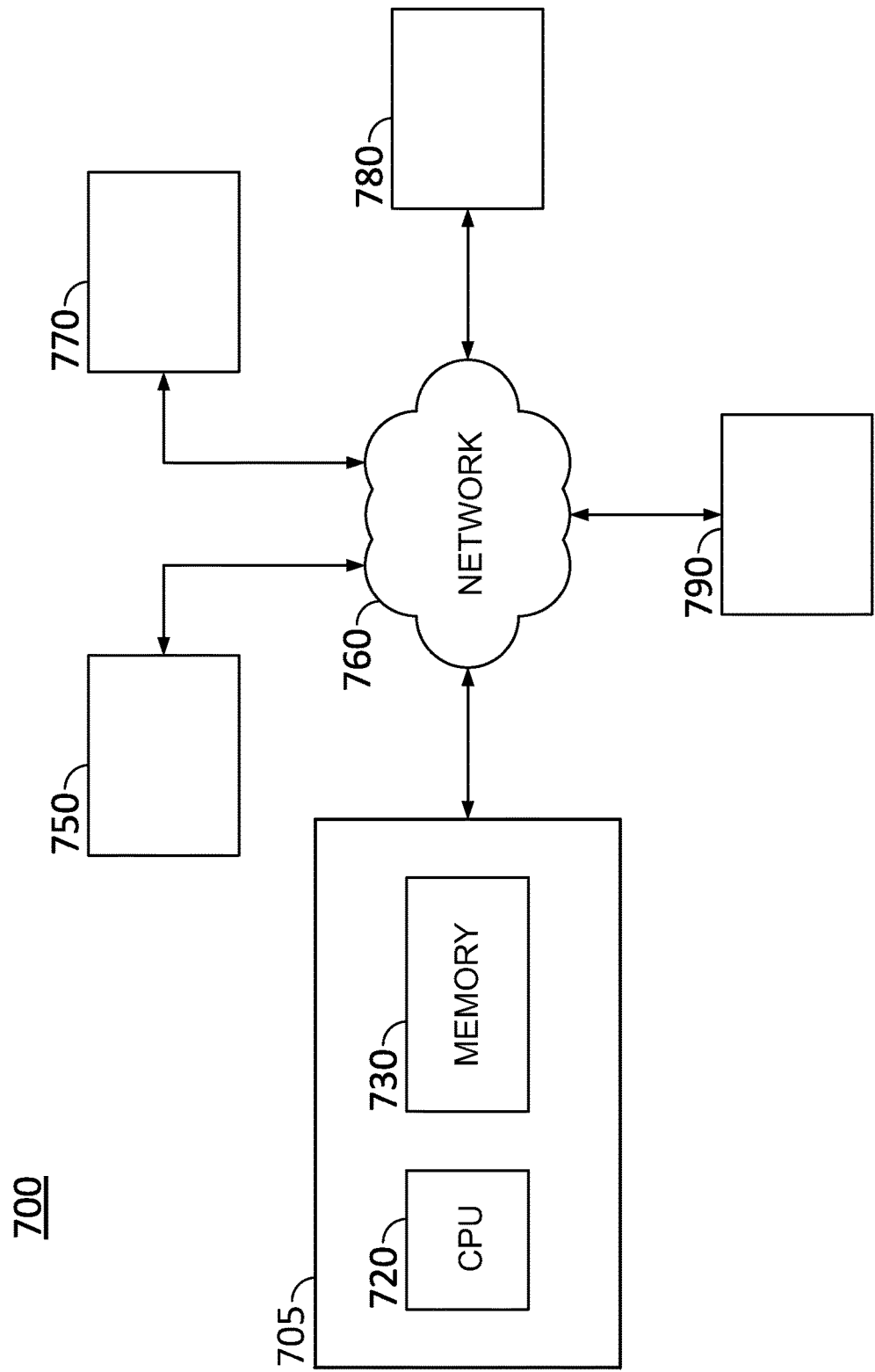
FIG. 7 is a first exemplary system, in accordance with an embodiment of the invention.

FIG. 7 illustrates a system 700 that may be used to implement at least some of the methods described above, in accordance with an embodiment of the present invention. System 700 includes a server 705, connected to a network 760, including a CPU 720 and a memory 730. Software loaded into memory 730 from, for example, a disk drive (not shown) at the direction of CPU 720 may be used to implement a program for optimizing insurance in a manner consistent with various embodiments of the present invention. For example, the software may execute instructions for performing demand simulation to analyze data and to form optimized packages. In addition, memory 730 may store, for example, a database (not shown) of market data and store research conducted to design packages.

Additionally, network 760 provides communications between the various entities in system 500, such as user terminals 770-790. Network 760 may be a shared, public, or private network and encompass a wide area or local area. Further, network 760 may be implemented through any suitable combination of wired and/or wireless communication networks. By way of example, network 760 may be implemented through a wide area network (WAN), local area network (LAN), an intranet, or the Internet.

Terminals 770-790 allow a user to exchange information with server 760. Terminals 770-790 may be any type of appropriate device for communicating with server 705 over network 760. For example, terminal 770 may be a PDA running a program for communicating with server 705, while terminal 780 may be a desktop type computer running a web browser for communicating with server 705 via the Internet. Terminal 790 may be a standard landline telephone or wireless phone.

Users may access server 705 via network 760 to customize an automobile insurance product through a web browser running on, for example, terminal 780. A website may include options to provide information or to fill out an application, and may present the user with a series of screens prompting the user to make various selections. The user may make appropriate selections to customize the insurance product. Additionally, a user at terminal 790, a telephone, may contact a consumer service representative at terminal 750. The consumer service representative may assist a consumer through a process that the customer can use to consider options for customizing an insurance product by asking a series of questions. During the process, the consumer service representative may use software running on terminal 750, and may send data to and from server 705.

Aspects of the invention may be used in connection with automobile insurance, homeowner's insurance and other types of insurance. One of skill in the art will readily recognize how to adapt the methodology described above to a variety of areas of insurance. For example, consistent with aspects of the present invention, an insurance carrier may expand its homeowner's insurance offerings to consumers by identifying features with appeal and profitability to design packages of related features at different pricing points. Customizable homeowner's insurance may include a standard package of typical coverages, and a consumer may further select optimized packages of features in a manner similar to that discussed above.

A homeowner's insurance product typically covers a building or structures on the premises and household personal property. A typical homeowner's insurance product usually also includes certain personal liability coverage and coverage for medical payments to others. Additional coverages or features are purchased ala carte.

Homeowner's insurance consistent with aspects of the present invention provides optional coverages that reflect different lifestyles and life stage needs. In particular, by implementing a methodology consistent with that described above, one may also create optimized homeowner packages. Optimized solutions may include coverages that are popular with most homeowners, as well as optimized coverages, that align with the wants and needs of a given consumer. Consumers may be offered optimized packages of coverages and terms that share a common attribute. Common attributes may relate to electronic data recovery, home enterprises, identity restoration, music & photography, prized possessions, jewelry, sports & leisure, yard & garden or other areas that present particular liability concerns to at least a group of consumers.

Optional insurance component 626 (shown in FIG. 6B) may include a grouping of insurance features that share a common attribute, such as one of the attributes described above. An electronic data recovery component may provide reimbursement for expenses incurred from an attempt to restore lost data resulting from a covered loss or computer virus. The coverage may have a limit, such as $5,000. A home enterprise coverage component may bundle increased limits for consumers who work from their home in an office/studio setting and desire additional protection for business property, liability, and/or office/studio equipment and furniture. In one embodiment of the invention, a home enterprise coverage component includes the features of an electronic data recovery component. An identity restoration component may reimburse consumers for lost wages and other covered expenses resulting from identity theft. The coverage may have a limit, such as $25,000 and may have no deductible. A music & photography component may include a bundle of increased limits for consumers who have musical instruments and photography equipment. A prized possessions component may include a bundle of increased coverage limits for consumers who have acquired certain types of assets, such as silverware, jewelry, furs, etc. A sports & leisure component may include a bundle of increased limits for consumers who have sports equipment and/or small watercraft.

A yard & garden component may include a bundle of increased limits for trees, shrubs, landscaping and other plants. The bundle may include coverage for motorized land vehicles used to service the residence premises. An increased limit, such as 10% or $1,000 per tree, may be included for replacement and debris removal of trees for certain perils. In certain embodiments increased debris removal coverage may be included in the bundle for the perils such as windstorm, hail, weight of ice, snow and sleet.

One of skill in the art will appreciate that aspects of the invention may be used to create insurance coverage packages that include standard homeowner's coverage components and at least one homeowner's component having a grouping of insurance features that share other common attributes. Exemplary common attributes may relate to home value protection, identity theft, blanket protection of valuables, limited personal umbrella policy coverage and any other attributes or combination of attributes that are desired by at least a group of consumers.

Figure 8:
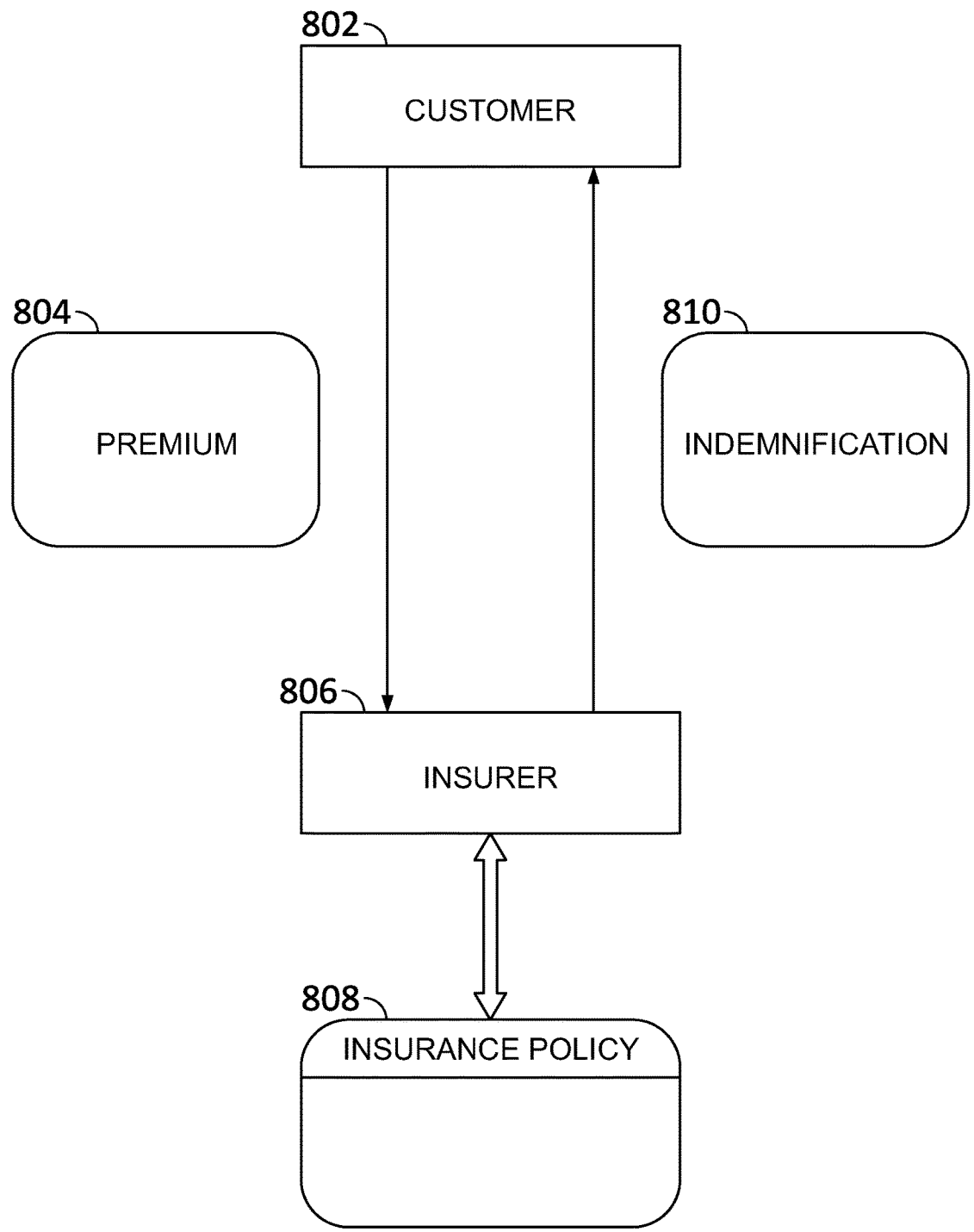
FIG. 8 illustrates a process of providing insurance coverage that may be used in connection with various embodiments of the invention.

FIG. 8 illustrates a process of providing insurance coverage that may be used in connection with the embodiments of the invention described herein. A customer 802 pays a premium 804 to an insurer 806. The premium is provided in exchange for insurance coverage described in an insurance policy 808. Insurer 806 provides indemnification 810 to customer 802 when an event covered by insurance policy 808 occurs.

Personal automobile and homeowners insurance are examples of property and casualty insurance offerings. One skilled in the art will recognize that the above-described methodology is applicable to other types of insurance products as well, such as commercial insurance for business customers. In addition, an insurance carrier may offer annuity products to consumers for retirement or financial planning purposes by identifying features with appeal and profitability to design packages of related features at different pricing points or expense levels. Customizable annuity products may include a standard annuity with typical accumulation, return, and payout features. A consumer may further select enhanced packages of features in a manner similar to that discussed above for automobile insurance.

Additional embodiments of the present invention are possible, each designed to cover other classes of insurable risk, including but not limited to, mortality risk and life insurance products; morbidity risk and health and long-term care insurance products; as well as professional practice risk and liability insurance.

Although not common in today's marketplace, it is possible to apply the disclosed methodology to so-called hybrid or multi-risk products that combine the coverages of two or more products from different classes of insurance risk into a single product. Customizable hybrid products may include a standard package across two or more risk classes with typical features in each class and a consumer may further select enhanced packages of features in a manner similar to that discussed above for automobile insurance.

In other aspects, the present invention provides systems and methods for allowing an entity (e.g., an insurance company) to present insurance product options to a potential customer/customer by accessing information stored about the entity's current customers that may share one or more attributes with the potential customer/customer (e.g., to determine the need states of the potential customer/customer).

Figure 9:
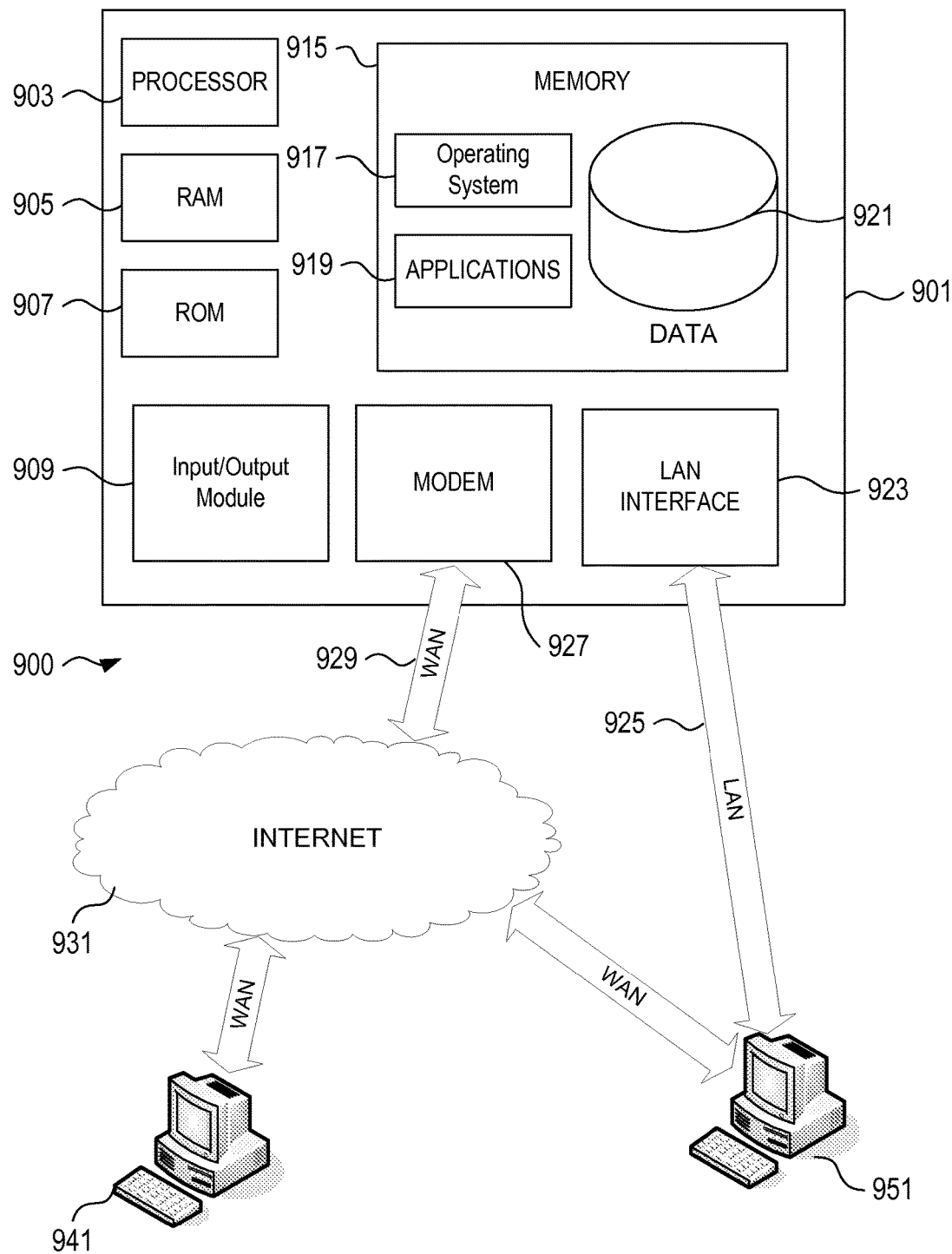
FIG. 9 is a second exemplary system, in accordance with an embodiment of the invention.

FIG. 9 illustrates a block diagram of an enhanced attributes analysis server 901 (e.g., a computer server) in communication system 900 that may be used according to this illustrative embodiment of the disclosure. The server 901 may have a processor 903 for controlling overall operation of the enhanced attributes analysis server 901 and its associated components, including RAM 905, ROM 907, input/output module 909, and memory 915.

I/O 909 may include a microphone, keypad, touch screen, and/or stylus through which a user of enhanced attributes analysis server 901 may provide input, and may also include one or more of a speaker for providing audio output and a video display device for providing textual, audiovisual and/or graphical output. Software may be stored within memory 915 and/or storage to provide instructions to processor 903 for enabling server 901 to perform various functions. For example, memory 915 may store software used by the server 901, such as an operating system 917, application programs 919, and an associated database 921. Processor 903 and its associated components may allow the server 901 to run a series of computer-readable instructions to present an insurance product/plan offering for a potential customer/customer of an entity (e.g., an insurance company) managing server 901. For instance, processor 903 may perform this operation by processing data associated with the potential customer/customer to determine various attributes of the potential customer/customer. In addition, processor 903 may access a database storing information related to insurance coverage details associated with current customers of the entity managing server 901. Further still, processor 903 may determine which current customers have attributes similar to those of the potential customer/customer being evaluated; once a matching set of current customers is found, processor 903 may use the insurance product/plan details of the matched customers to determine an insurance product/plan offering for the potential customer/customer.

The server 901 may operate in a networked environment supporting connections to one or more remote computers, such as terminals 941 and 951. The terminals 941 and 951 may be personal computers or servers that include many or all of the elements described above relative to the server 901. Alternatively, terminal 941 and/or 951 may be data stores for storing insurance product details related to current customers of an entity managing server 901. The network connections depicted in FIG. 9 include a local area network (LAN) 925 and a wide area network (WAN) 929, but may also include other networks. When used in a LAN networking environment, the server 901 is connected to the LAN 925 through a network interface or adapter 923. When used in a WAN networking environment, the server 901 may include a modem 927 or other means for establishing communications over the WAN 929, such as the Internet 931. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 919 used by the enhanced attributes analysis server 901 according to an illustrative embodiment of the disclosure may include computer executable instructions for invoking functionality related to generating a series of questions aimed at determining current customers that have similar attributes to a potential customer/customer.

Enhanced attributes analysis server 901 and/or terminals 941 or 951 may also be mobile terminals including various other components, such as a battery, speaker, and antennas (not shown).

The various embodiments of the invention are operational with numerous other general purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

Figure 10:
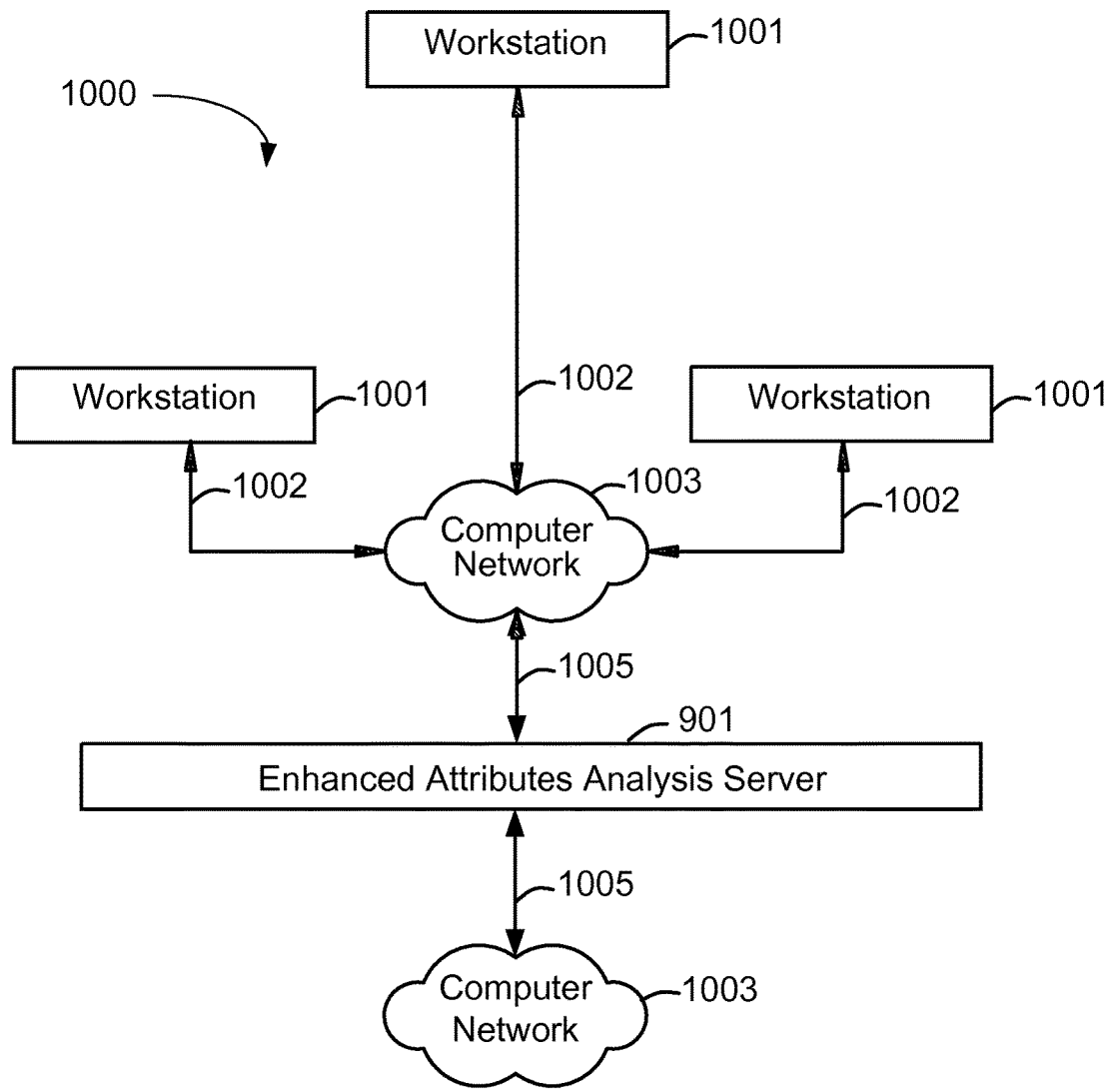
FIG. 10 is a third exemplary system, in accordance with an embodiment of the invention.

Referring to FIG. 10, an illustrative system 1000 for implementing methods according to embodiments of the invention is shown. As illustrated, system 1000 may include one or more workstations/servers 1001. Workstations 1001 may be local or remote, and are connected by one or more communications links 1002 to computer network 1003 that is linked via communications links 1005 to enhanced attributes analysis server 901. In certain embodiments, workstations 1001 may store customer data used by server 901 for presenting insurance plan/product options to a potential customer/customer of the entity managing server 901, or, in other embodiments, workstations 1001 may be different points at which the enhanced attributes analysis server 901 may be accessed. In system 1000, enhanced attributes analysis server 901 may be any suitable server, processor, computer, or data processing device, or combination of the same.

Computer network 1003 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1002 and 1005 may be any communications links suitable for communicating between workstations 1001 and server 901, such as network links, dial-up links, wireless links, hard-wired links, etc.

The steps that follow in the Figures may be implemented by one or more of the components in FIGS. 7, 9, and 10 and/or other components, including other computing devices.

In certain aspects, server 901 may present insurance product/plan options based on similarities between attributes of current customers of the entity managing server 901 and attributes of a potential customer/customer being evaluated for a new insurance product/plan. For instance, server 901 may evaluate these similarities based on a common life-phase scenario (e.g., college graduate, newly married, first child, retired, death in the family, death of spouse, etc.) that the potential customer/customer shares with current customers of the entity managing server 901.

In other aspects, server 901 may present insurance package/plan options to a potential customer/customer by examining the social network of the potential customer/customer (e.g., via Twitter®, Facebook®, etc.) In this aspect, server 901 may interface with the social network of the potential customer/customer and may determine the insurance products/plans preferred by various members of the social network. Server 901 may then present some or all of the features associated with insurance products preferred by the social network to the potential customer/customer. In addition, server 901 may involve the social network of a potential customer/customer after an initial insurance product has been presented to the potential customer/customer. In this aspect, server 901 may present the same or a similar insurance product option to each member of a social network of a potential customer/customer.

Upon receipt of a request for a new insurance product/plan, server 901 may process any customer data (e.g., name, address, driver's license number, answers to a predetermined set of questions, etc.) accompanying the request and may use this information to access more information stored in external databases (e.g., credit bureau, mortgage records, motor vehicle accident history, etc.) about a potential insurance customer/insurance customer. Server 901 may then compile the customer data and information from the external databases to determine a set of attributes that may be relevant to a determination of an insurance product/plan for the potential insurance customer/insurance customer. These attributes may include any number of things, including the current residence of the potential customer/customer, number of automobiles owned by the potential customer/customer, value of a home owned by the potential customer/customer, credit score of the potential customer/customer, etc.

Once the attributes of the potential customer/customer are determined, server 901 may access a database (e.g., workstations 1001, etc.) storing data about attributes and insurance coverage details associated with current customers of the entity managing server 901. Then server 901 may determine which of the current customers have attributes that match those of the potential customer/customer being evaluated. Once a selection of similar current customers has been determined, server 901 may present one or more features associated with the insurance products/plans of the matched current customers to the potential customer/customer being evaluated. In some embodiments, server 901 may further refine presented insurance product/plan options by determining a set of trade-off offerings (e.g., those based on various levels of cost, coverage, etc.). One of ordinary skill in the art would understand that server 901 may present any number of insurance products, including those for automobile, home, and life insurance, among other things.

For instance, in presenting features for an automobile insurance policy to a potential customer, server 901 may access a database storing data about attributes and automobile insurance coverage details associated with current customers of the entity managing server 901. In particular, the database may store information related to bodily injury limits, liability, collision, and/or comprehensive coverage associated with automobile insurance policies of current customers. By comparing relevant attributes of the potential customer with those of the current customers, server 901 may determine that a majority (greater than 50 percent) and/or plurality of current customers whose attributes are similar to the potential customer have automobile insurance products that have certain features. Server 901 may then proceed to present an automobile insurance policy option that has these features (e.g., a predetermined bodily injury limit (e.g., $20,000), liability ($10,000), collision ($10,000), and/or comprehensive ($15,000) coverage). In some aspects, the presented features may represent a range of values rather than a discrete value. In addition, server 901 may present a predetermined deductible associated with each of these coverages. In some aspects, server 901 may further output a percentage of current customers have the presented insurance policy feature.

In presenting trade-off insurance product/plan options, server 901 may analyze the information in the customer database, and determine that while a majority and/or plurality of current customers have an insurance product with a first set of features, a smaller percentage have similar insurance products with other sets of features. In this scenario, server 901 may present each set of features as a trade-off insurance product. For instance, to extend the above example of an automobile insurance product, server 901 may determine that a plurality of current customers with matched attributes has an automobile insurance policy with a $250 deductible for collision coverage but that a significant minority also has policies with a $500 deductible and a $1000 deductible for the same type of coverage. In this scenario, server 901 may present the three levels of deductibles for collision coverage as a set of trade-off options, perhaps as a way to attract potential customers who desire varying premium levels for their automobile collision coverage.

In certain aspects, server 901 may ask one or more questions of a potential customer/customer in determining various attributes of the potential customer/customer. One or more of these questions may relate to general identifying information about the potential customer/customer, including those related to the name, address, social security number, and driver's license number of the potential customer/customer. Other questions may relate to behavioral trade-off preferences (e.g., a desired premium level, a desired coverage level, level of risk tolerance, value of assets needed to be protected, desire for predictable out-of-pocket expenses annually, etc.) that the potential customer/customer may have.

In some aspects, server 901 may present an initial set of insurance policy features based on general identifying information from a potential customer/customer and related information in internal/external databases (e.g., to be used in determining which insurance policy features a select group of current customers of the entity managing server 901 may prefer). Then server 901 may give the potential customer/customer an option to customize/optimize the initial set of insurance policy features. If the potential customer/customer decides to accept an option to customize the initial insurance presentation, server 901 may then ask the potential customer/customer questions related to behavioral trade-off preferences. Server 901 may use answers to the trade-off questions to generate various trade-off insurance policy feature options, including those based on different cost/coverage levels. In certain aspects, server 901 may dynamically (e.g., in real-time) generate a price quote for a presented insurance policy option as the potential customer/customer answers one or more questions or provides more information. In other aspects, the number and/or type of trade-off questions asked may depend on the level of customization that a potential customer/customer may prefer. In other words, the potential customer/customer may decide that all, none, and/or only a subset of the available questions are answered to reach a desired presentation of insurance options. In this way, when no trade-off scenario questions are asked, server 901 may present insurance feature options based on data-driven factors (e.g., customer identifiable information, internal data, external data, etc.). In addition, when trade-off scenario questions are asked, server 901 may present insurance feature options based on a customer-driven trade-off scenario answers.

In the above example of a potential customer seeking an automobile insurance policy, server 901 may present trade-off options based both on what a group (a majority or minority) of current customers prefers and on the potential customer's answers to any of the trade-off questions. For instance, suppose that different groups within a current set of customers with matched attributes to the potential customer prefer an automobile insurance policy with high coverage (high cost plan), medium coverage (medium cost plan), and low coverage (low cost plan). Suppose also that a plurality of current customers prefer the low cost plan, followed by the medium cost plan and the high cost plan. Based solely on the general identifying information of the potential customer and information in external/internal databases matched to related information of current customers, with no trade-off questions, server 901 may present the low cost plan to the potential customer (because the most number of current customers prefer this plan). However, suppose that the potential customer indicates a preference for a high coverage plan in spite of the associated cost in one of answers to a trade-off question. In this scenario, server 901 may present the high cost plan as a first preference, with the medium and low cost plans presented as trade-off options. As such, server 901 may use both general customer information and more customized customer responses to present options with features for an insurance policy.

In some aspects, the insurance product/plan selection process implemented by server 901 may be an adaptive selection process that "learns" over time as customer data sets increase. In this aspect, the selection process may present more and more accurate insurance policy options as the data sets evolve and increase to become more statistically significant. In particular, as the selection process "learns" over time, server 901 may build various profiles or personas to help in presenting insurance options for customers with a predetermined set of attributes. In another aspect, questions asked by server 901 may dynamically change over time as the server 901 recognizes correlations between answers to certain questions and the associated profitability of insurance products presented to customers giving the answers and/or the associated return to the customers themselves giving the answers. In other words, the adaptive selection process discussed herein may allow for refinement of this process by presenting those products/services that have previously been selected most often. In some aspects, prior to presenting an insurance option, server 901 may consider the acceptance rate of a presented insurance product, the availability of new data that may be relevant to a presented insurance product, and any alternative solutions/options that have not yet been presented.

Figure 11:
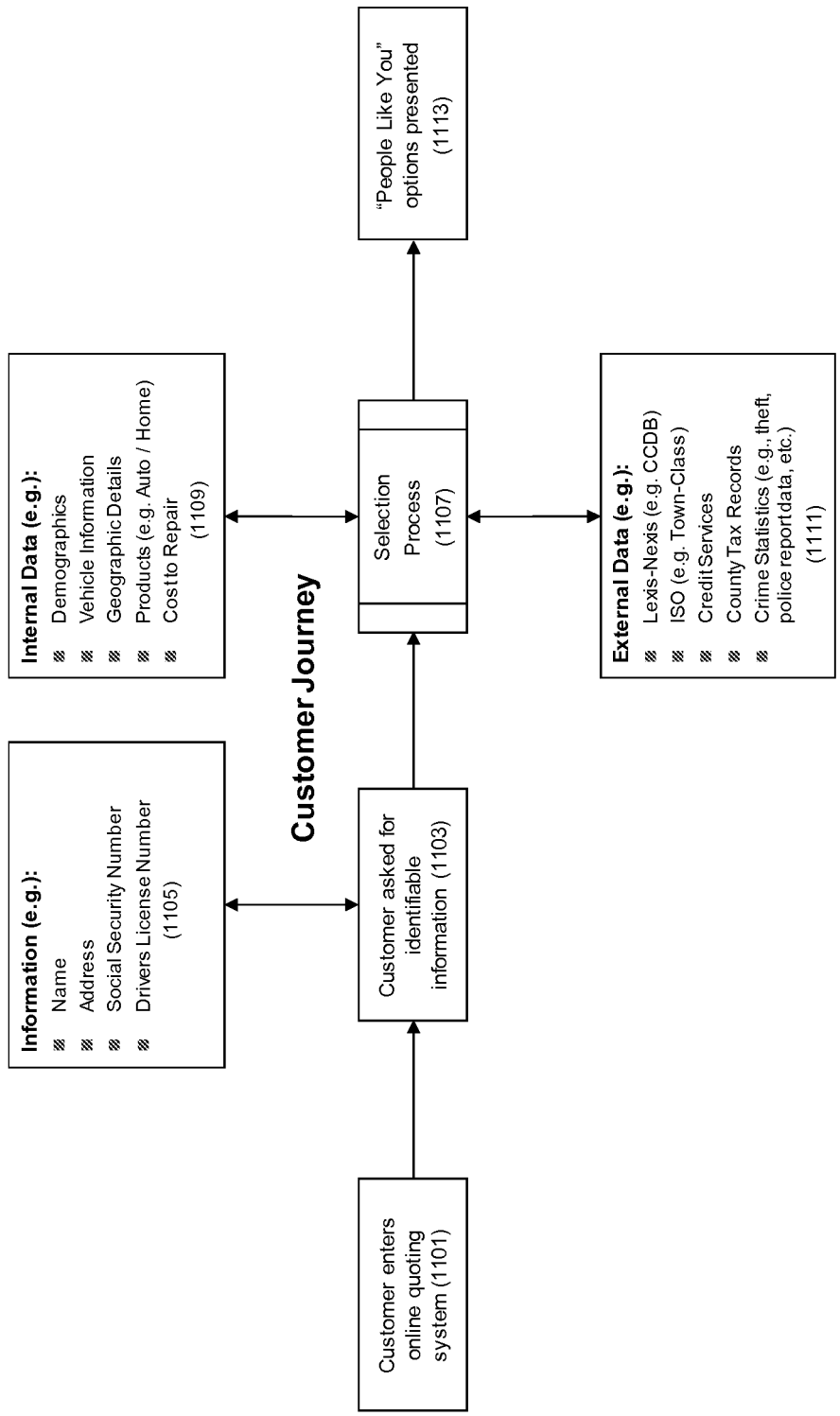
FIG. 11 is a flow chart showing the steps of a data-driven process implemented by an enhanced attributes analysis server, in accordance with an embodiment of the invention.

FIG. 11 is a flow chart showing the steps of a data-driven selection process implemented by an enhanced attributes analysis server 901, in accordance with at least one embodiment of the invention. The process in FIG. 11 may start out at step 1101 where a potential customer/customer of an entity (e.g., an insurance company) managing enhanced attributes analysis server 901 may enter into (e.g., login, etc.) an online quoting system of the entity. One of ordinary skill in the art would recognize that while the embodiment shown in FIG. 11 uses an online interface into the enhanced attributes analysis server 901, other communication methodologies (e.g., telephone, short message service (SMS), postal mail, etc.) may be used as well.

The process in FIG. 11 may then move to step 1103 where server 901 may query the potential customer/customer for identifiable information such as name, address, social security number, driver's license number, etc. as shown in box 1105. Then the process may move to step 1107, where server 901 may run a selection process for presenting various features for an insurance policy. In running the selection process, server 901 may first attempt to supplement the customer information obtained in box 1105 with data from internal sources 1109 and external sources 1111.

For instance, internal databases 1109 associated with the entity managing server 901 may include information related to demographics of where the potential customer/customer lives, the vehicle owned by the potential customer/customer, geographic details of where the potential customer/customer lives, insurance products already purchased by the potential customer (e.g., auto and/or home insurance, etc.), and the cost to repair previously damaged insured items owned by the potential customer/customer. Meanwhile, external databases 1111 associated with the entity managing server 901 may include the Lexis-Nexis databases (e.g., Current Carrier Database (CCDB), etc.), Insurance Services Office (ISO) databases (e.g., Town-Class, etc.), credit services databases, county tax records databases, and/or crime statistics databases (e.g., theft, police report data, etc.). Also, the internal and external databases 1109 and 1111 may store information related to the age of the potential customer/customer, gender of the potential customer/customer, marital status of the potential customer/customer, number of years that the potential customer/customer has been driving, zip code where the potential customer/customer lives, global positioning system (GPS) code where the potential customer/customer lives, city/state where the potential customer/customer lives, area code where the potential customer/customer lives, time zone where the potential customer/customer lives, designated market area (e.g., as indicated by Nielson Media Research definitions, etc.) associated with the potential customer/customer, metropolitan statistical area (e.g., as indicated by the Census, etc.) associated with the potential customer/customer, number of uninsured and/or underinsured drivers in the zip code where the potential customer/customer lives, type of vehicle that the potential customer/customer drives, type of home that the potential customer/customer insures, and/or number of years that the potential customer/customer has been with a prior insurance carrier.

In addition, internal and external databases 1109 and 1111 may store information related to urban and/or rural factors related to where the potential customer/customer lives, weather factors related to where the potential customer/customer lives, model year of the vehicle driven by the potential customer/customer, category (e.g., sports utility vehicle, sedan, etc.) of the vehicle driven by the potential customer/customer, list price of the vehicle driven by the potential customer/customer, ownership (e.g., own, lease, etc.) of the vehicle driven by the potential customer/customer, usage (e.g., work, pleasure, school, etc.) of the vehicle driven by the potential customer/customer, whether or not the household of the potential customer/customer owns multiple vehicles, whether or not there is a student driver in the household of the potential customer/customer, whether anyone in the household of the potential customer/customer rents or owns a vehicle, the credit score of the potential customer/customer, the driving record of the potential customer/customer, and the propensity of someone like the potential customer/customer to bundle/have multiple insurance products.

In some embodiments, server 901 may weigh one or more pieces of information as being more important than other pieces of information in presenting insurance options. Also, in some aspects one or more pieces of information may not be included at all in the selection process. For instance, in one example, the age of a potential customer/customer, address of the potential customer/customer, and value of a home owned by the potential customer/customer may be the only attributes that are considered by server 901 in presenting insurance options. Meanwhile, in another example, the number of years that the potential customer/customer has been with a prior insurance carrier and the number of years that the potential customer/customer has been driving may be the only attributes considered by server 901 in presenting insurance options. Moreover, in this second example, server 901 may weight the number of years with a prior insurance carrier as less important than the number of years that the potential customer/customer has been driving. In yet other embodiments, the weightings for each of the attributes may change as server 901 encounters larger datasets.

Once all relevant attributes of the potential customer/customer are determined from various sources 1105, 1109, and 1111, server 901 may access a database including information related to attributes of current customers of the entity managing server 901 and their associated insurance policies. Once accessed, server 901 may match some or all of the attributes of the potential customer/customer to the attributes of a subset of the current customers in the database. After a matching set of current customers is found, server 901 may use one or more features of the insurance policies preferred by current customers in presenting insurance options to the potential customer/customer. Server 901 may present these insurance options as "people like you" options, (e.g., displayed as insurance options preferred by people with similar attributes to the potential customer/customer) as shown in step 1113. In some aspects, server 901 may present various aspects of the insurance options on a display screen associated with a user terminal that the potential customer/customer may be using.

Figure 12:
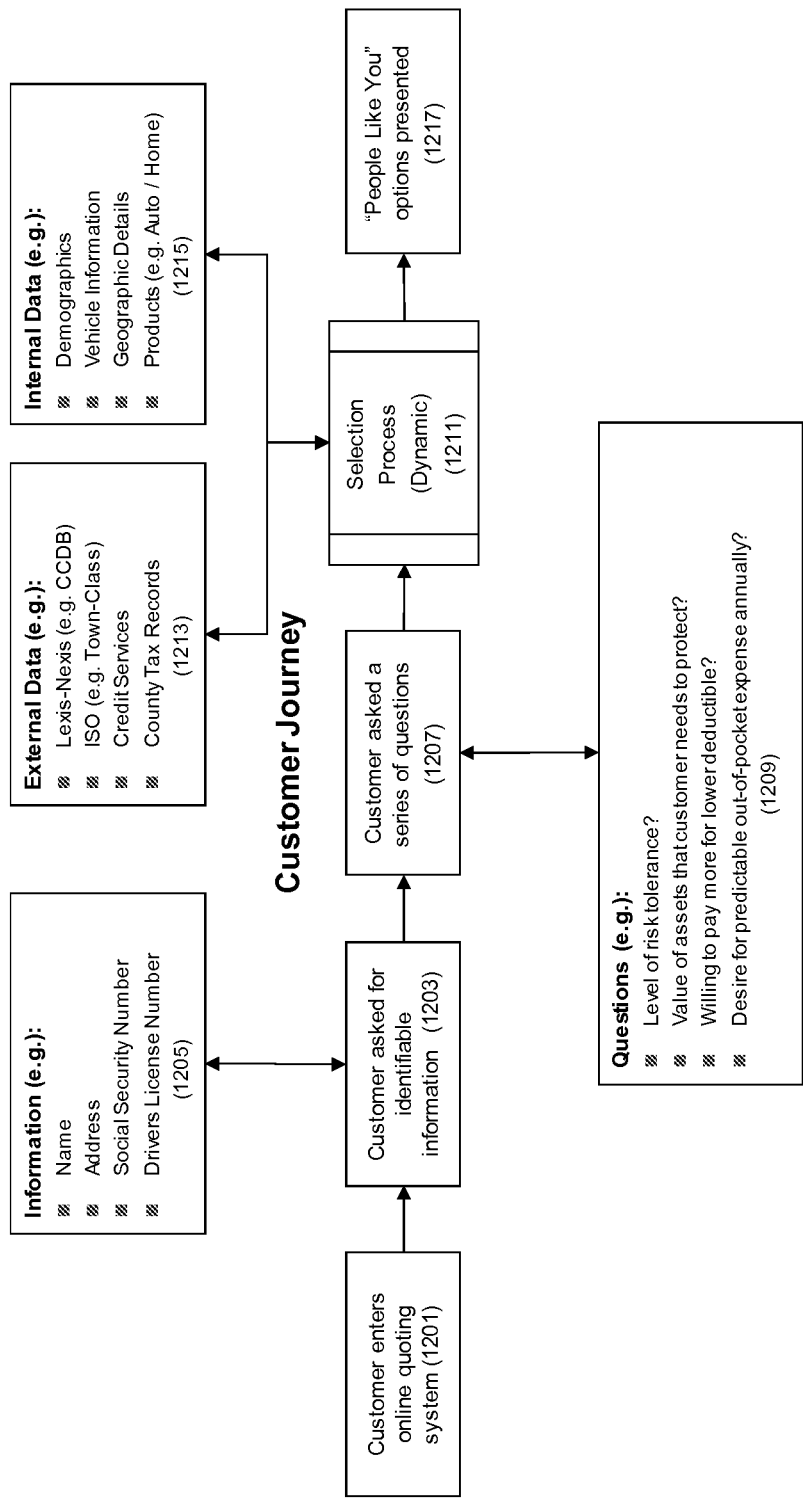
FIG. 12 is a flow chart showing the steps of a customer-driven trade-off process implemented by an enhanced attributes analysis server, in accordance with an embodiment of the invention.

FIG. 12 is a flow chart showing the steps of a customer-driven trade-off selection process implemented by an enhanced attributes analysis server 901, in accordance with at least one embodiment of the invention. Similar to the process shown in FIG. 11, the process in FIG. 12 may start out at step 1201 where a potential customer/customer of an entity (e.g., an insurance company) managing enhanced attributes analysis server 901 may enter into (e.g., login, etc.) an online quoting system of the entity. One of ordinary skill in the art would recognize that while the embodiment shown in FIG. 12 uses an online interface into the enhanced attributes analysis server 901, other communication methodologies (e.g., telephone, short message service (SMS), postal mail, etc.) may be used as well.

The process in FIG. 12 may then move to step 1203 where server 901 may query the potential customer/customer for identifiable information such as name, address, social security number, driver's license number, etc. as shown in box 1205. Then the process may move to step 1207, where server 901 may query the potential customer/customer with one or more questions 1209 related to the generation of trade-off scenarios. For instance, these questions 1209 may relate to the level of risk tolerated by the potential customer/customer (e.g., customer does/does not worry about catastrophic events occurring, etc.), the value of assets that the potential customer/customer may need to protect (e.g., insurable versus non-insurable assets, etc.), the willingness of the potential customer/customer to pay more money for a lower deductible, the stability of a potential customer's/customer's personal and profession situation (e.g., does the potential customer/customer foresee his/her personal/professional situation changing within a predetermined time period?, etc.), and/or the desire for a predictable out-of-pocket expense annually (e.g., self-insurability, etc.), among other things.

Then the process may move to step 1211, where server 901 may run a dynamic selection process for presenting various features for an insurance policy. In running the selection process, server 901 may first attempt to supplement the customer information obtained in box 1205 and 1209 with data from internal sources 1215 and external sources 1213, as mentioned for FIG. 11.

Once all relevant attributes of the potential customer/customer are determined from various sources 1205, 1209, 1213, and 1215, server 901 may access a database including information related to attributes of current customers of the entity managing server 901 and their associated insurance policies. Once accessed, server 901 may match some or all of the attributes of the potential customer/customer to the attributes of a subset of the current customers in the database. After a matching set of current customers is found, server 901 may use one or more features of the insurance policies preferred by current customers as insurance options presented to the potential customer/customer. Again, server 901 may present these insurance options as "people like you" options (e.g., displayed as insurance options preferred by people with similar attributes to the potential customer/customer) as shown in step 1217.

In some aspects, server 901 may present various aspects of the insurance options on a display screen associated with a user terminal that the potential customer/customer may be using. In presenting insurance options, server 901 may display various trade-off scenarios based on the level of coverage and/or cost preferred by the potential customer/customer, as detailed in the answers to the trade-off questions 1209. The potential customer/customer may be given the option to answer any number of trade-off questions. In other words, the potential customer/customer may choose the level of customization achieved by the options presented by server 901. The selection process 1211 may dynamically present various insurance product features by taking into account both the preferences of current customers who share attributes with the potential customer/customer and the specific answers given by the potential customer/customer to the trade-off scenario questions.

In other aspects, the selection process shown in FIGS. 11 and 12 may also be used by the entity managing server 901 to present ancillary services or generate partnerships with third-party entities (e.g., car maintenance services, extended warranty services, security services, financial planning services, asset preservation services, etc.). An example of a way in which the entity managing server 901 may present ancillary services may encompass a situation in which a potential customer/customer requests home insurance for a home that public records show does not have an alarm system. If the home is located in a place that is at higher risk for theft, crime, etc., the entity managing server 901 (e.g., an insurance company) may present options for discounted installation and monitoring of a home security system in partnership with a home alarm services company, in addition to the presentation of home insurance options. In this way, the entity managing server 901 may present options for complementary products/services that may not be manufactured by the entity itself.

In some aspects, this platform may help to convey a sense of confidence and reassurance to a potential customer/customer that an insurance product they will be purchasing is the right choice and that no other information is necessary to validate the purchase. Also, server 901 may present meaningful options to keep potential consumers/consumers engaged (e.g., by creating momentum, etc.) so that they obtain an insurance quote quicker. In addition to presenting options for an insurance product/plan, server 901 may also facilitate customer reviews of presented insurance products/plans, insight into whether or not the reviews were helpful, other ratings, and sales ranks In one aspect, web analytics tags (e.g., JavaScript computer code) may be used to generate data on the performance of presented insurance options.

Also, this functionality may allow server 901 to help potential customers/customers bundle various insurance features, products, and/or plans by presenting insurance options based on what similar customers have preferred. For instance, when a potential customer/customer makes a request for automobile insurance, server 901 may present not only options for automobile insurance but also for other types of insurance, including homeowner's insurance, life insurance, etc.

The functionality behind server 901 may be integrated into a web server, mobile device, social media platform (e.g., Facebook®, etc.), and other tools for insurance agents/representatives. Software applications running on hardware devices supporting the functionality of server 901 may use Extensible Markup Language (XML), among other file types.

In some aspects, server 901 may include an interactive simulator to help potential customers/customers understand and choose the best coverage for a given situation. A "coverage illustrator" that is a part of server 901 may help to show how coverages may work in different situations. The output from the "coverage illustrator" may be used in conjunction with situational, demographic, geographic, or vehicle information to present interactive, customized insurance options.

In addition, the hardware platform supporting the functionality of server 901 may also consider other attributes associated with a potential customer/customer in presenting insurance options, including an analysis of the most frequent types of insurance claims filed in the area that the potential customer/customer lives, an analysis of particularly hazardous driving spots such as dangerous intersections within the area, a listing of cars reported stolen within the area, and an analysis of weather-related coverages in the area.

Figure 14:
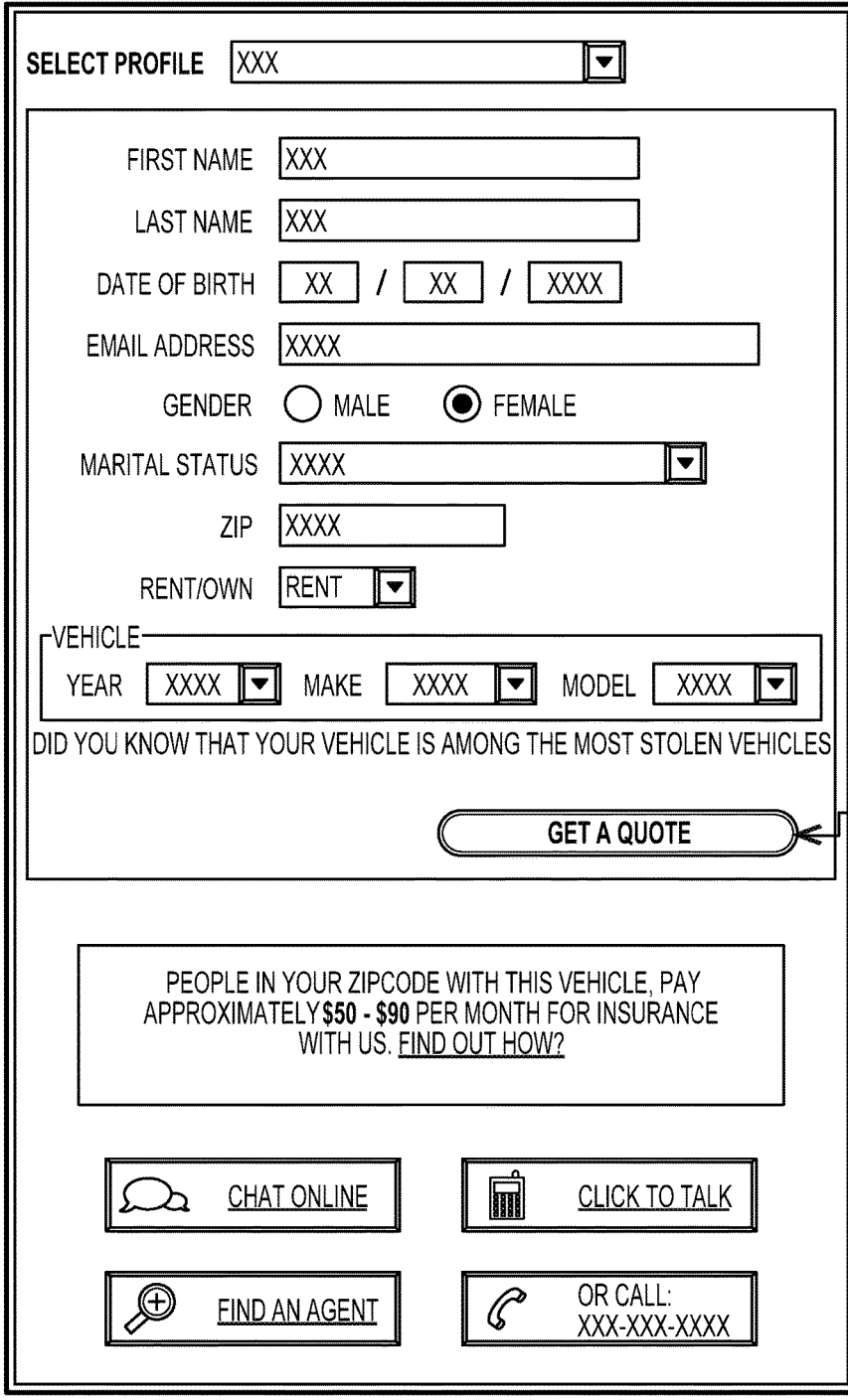
FIG. 14 shows a second user interface screen for inputting information used by an enhanced attributes analysis server in presenting insurance options to a potential customer/customer, in accordance with an embodiment of the invention.

FIGS. 13-15 show various illustrations of user interface screens for interacting with server 901, in accordance with at least one embodiment of the invention. These screens may be presented on display screens associated with user terminals (e.g., workstations 1001) in communication with server 901. In particular, FIG. 13 shows a first user interface screen 1300 for inputting information used by server 901 in presenting insurance options (e.g., a quick insurance quote, etc.) to a potential customer/customer of an entity (e.g., an insurance company) managing server 901, in accordance with at least one embodiment of the invention. Screen 1300 includes various sections that ask a user (e.g., potential customer/customer, insurance agent, etc.), to enter customer information, including a profile name 1301 and other customer-identifying information 1303. The profile name 1301 may refer to a high-level name that groups a potential customer/customer into a category with other potential customers/customers. In one embodiment, the profile name 1301 may be chosen based on predetermined attributes of the potential customer/customer, including age, homeownership status, and/or automobile make/model. Other customer-identifying information 1303 may include the first name, last name, date of birth, email address, gender, marital status, and zip code of the potential customer/customer. Information 1303 may also include an indicator of whether the potential customer/customer rents or owns a vehicle/home and the year, make, and model of the vehicle owned by the potential customer/customer. In some aspects, information 1303 may also include a mailing address and phone number of the potential customer/customer. In addition, screen 1300 includes a button 1305 for allowing a user to obtain insurance package options based on the information entered in sections 1301 and 1303.

FIG. 14 shows a second user interface screen 1400 for inputting information used by server 901 in presenting insurance options to a potential customer/customer of an entity (e.g., an insurance company) managing server 901, in accordance with at least one embodiment of the invention. Screen 1400 is similar to screen 1300; however, screen 1400 also includes an example profile name 1401 and sample customer-identifying information 1403. After inputting information into sections 1401 and 1403 of screen 1400, a user has pushed button 1405, causing server 901 to generate an insurance quote 1407. In this case, quote 1407 includes a statement about the approximate monthly premiums paid by people within the same zip code as the potential customer/customer. One of ordinary skill in the art would recognize that any number of other attributes may be used to match current customers of the entity managing server 901 with the potential customer/customer.

In addition, screen 1400 also includes various options 1409 which allow a user to obtain additional information about the insurance quote 1407, including an option to chat online, talk to a representative, find an agent, or call a specific phone number.

Figure 15B:
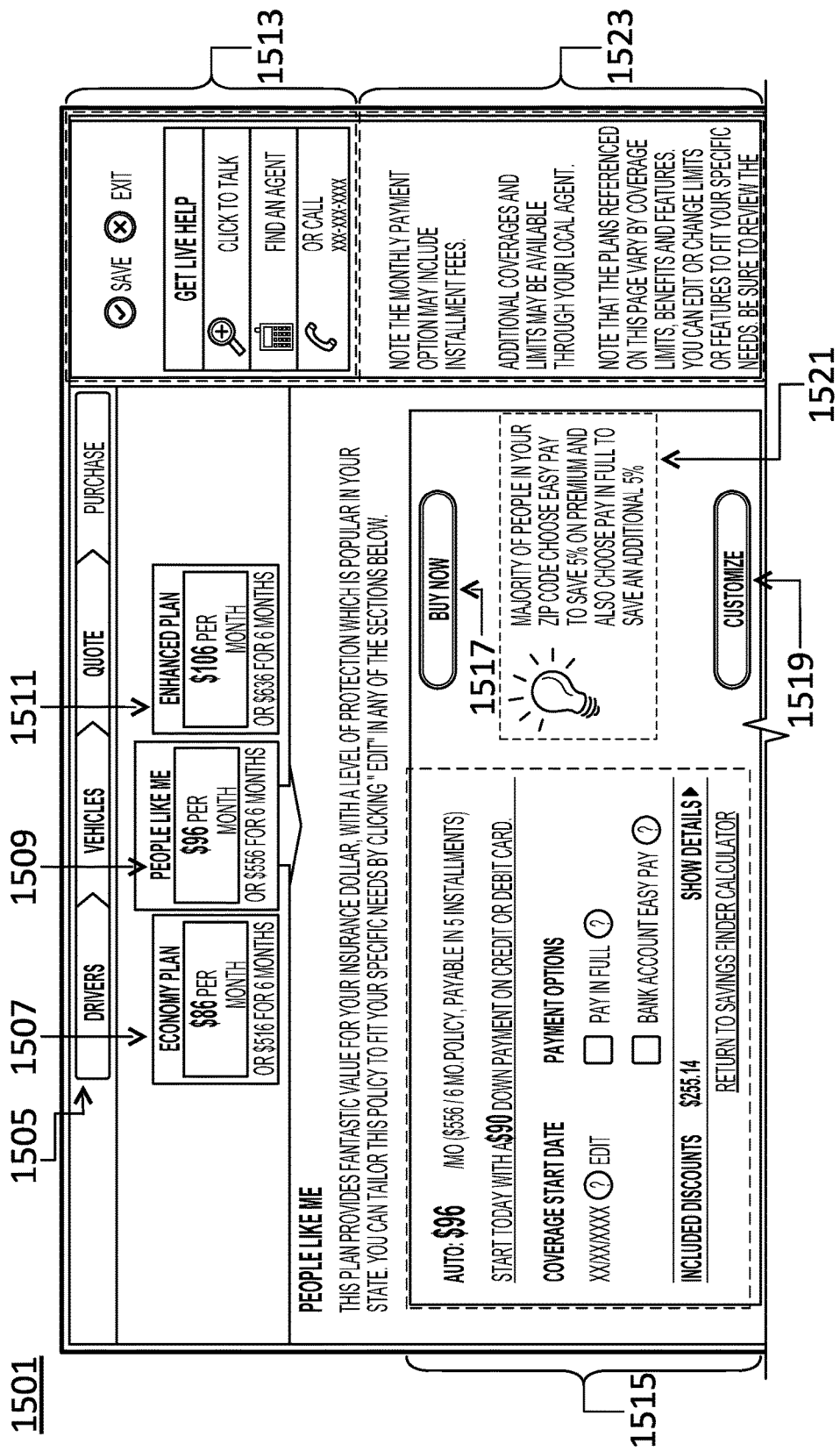
FIG. 15B shows a detailed view of the upper section of the screen shown in FIG. 15A, in accordance with an embodiment of the invention.

FIG. 15a shows a third user interface screen 1500 depicting a detailed insurance option based on information entered in screens 1300 and/or 1400, in accordance with at least one embodiment of the invention. For clarity, screen 1500 has been divided into an upper section 1501 and a lower section 1503. FIG. 15b shows a detailed view of upper section 1501 of screen 1500, in accordance with at least one embodiment of the invention. Upper section 1501 of screen 1500 includes a menu 1505 that may allow a user to navigate from entering information about a potential customer/customer and/or his/her insurable assets (e.g., vehicles, etc.) to generating a quote and purchasing a presented insurance product/plan option.

Section 1501 also presents options generated by server 901 for three automobile insurance plans based on customer information entered in, for example, screens 1300 and/or 1400 and information accessed through internal/external databases. The options presented by server 901 include an economy plan 1507, a "people like me" plan 1509, and an enhanced plan 1511. The three plans may be seen as trade-off options based on varying levels of cost and coverage. For instance, the "people like me" plan 1509 may represent the automobile insurance plan that is most commonly purchased by current customers that have similar attributes to the potential customer/customer seeking a new insurance plan. Meanwhile, the economy plan 1505 may represent a less expensive plan preferred by matched current customers that are particularly sensitive to cost and the enhanced plan 1511 may represent a more expensive plan preferred by matched current customers that are particularly interested in enhanced coverage.

Upper section 1501 of screen 1500 may also include section 1513 where a user may save the information on screen 1500, exit from screen 1500, and/or obtain additional information about the insurance product/plan presented, including an option to talk to a representative, find an agent, or call a specific phone number. The upper section 1501 of screen 1500 may also include a section 1515 that may further describe details of the insurance product/plan options presented by server 901. In this case, section 1515 includes details of the "people like me" option 1509, including details about the coverage start date, payment options, and included discounts. Section 1501 also includes buttons 1517 and 1519 to either buy a presented insurance product/plan or further customize the presented product/plan. In addition, helpful tips 1521 may be strategically placed throughout screen 1500. Finally, upper section 1501 of screen 1500 may also include a notes section 1523 that may describe further details on the presented plan, including a date that the plan was presented, fees associated with the insurance quote, and other disclaimers.

Figure 15C:
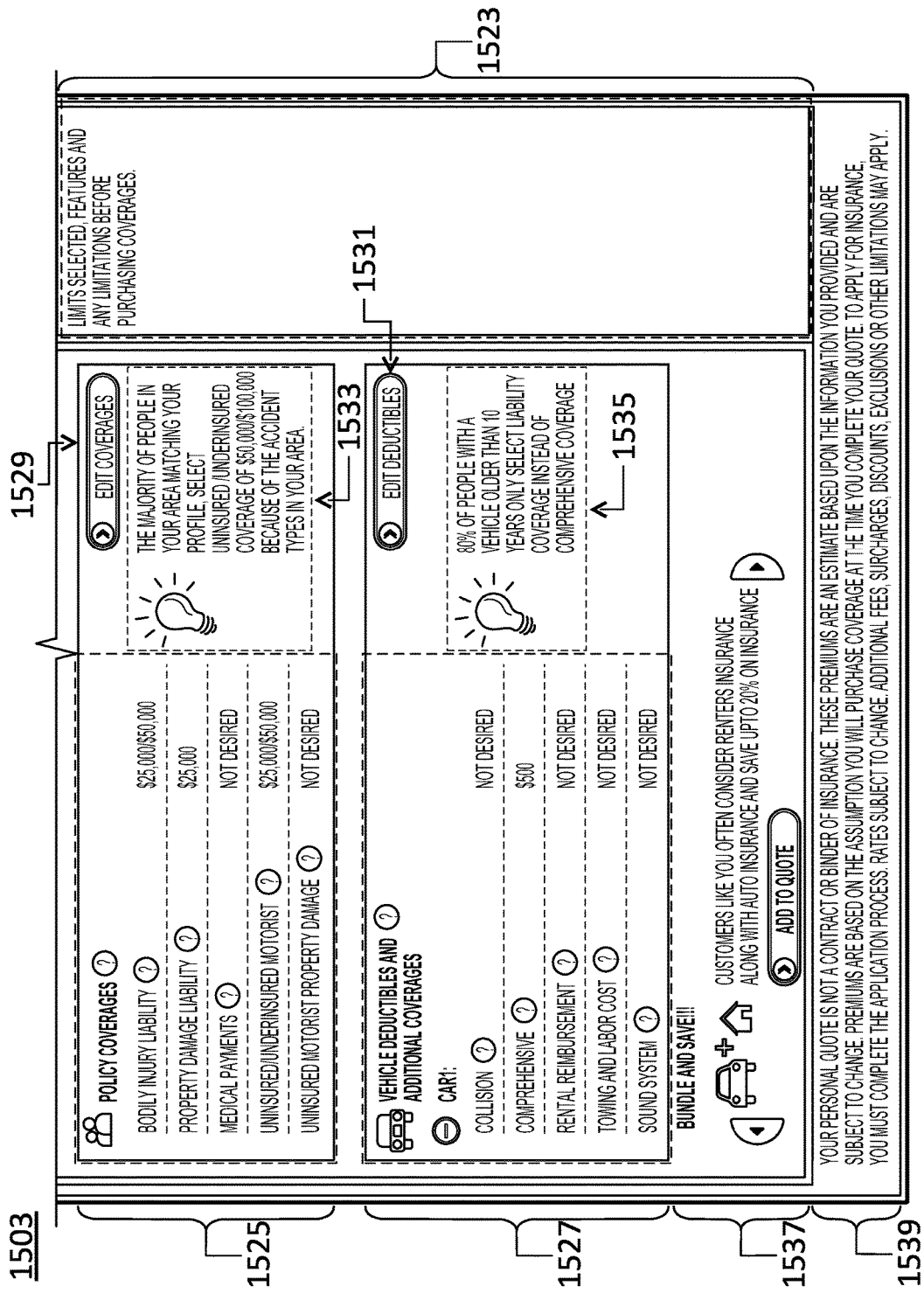
FIG. 15C shows a detailed view of the lower section of the screen shown in FIG. 15A, in accordance with an embodiment of the invention.

FIG. 15c shows a detailed view of lower section 1503 of screen 1500, in accordance with at least one embodiment of the invention. Lower section 1503 of screen 1500 may include a section 1525 that further describes coverages associated with the presented insurance policy and a section 1527 that further describes deductibles and/or additional coverages associated with the presented insurance policy.

For instance, section 1525 includes details about coverages associated with an automobile insurance option, including details about bodily injury liability coverage, property damage liability coverage, medical payment coverage, uninsured/underinsured motorist coverage, and/or uninsured motorist property damage coverage. In addition, section 1527 includes details about deductibles and/or additional coverages associated with the automobile insurance option, including details about collision coverage, comprehensive coverage, rental reimbursement coverage, towing and labor cost coverage, and sound system coverage.

Lower section 1503 of screen 1500 may also include buttons 1529 and/or 1531 to edit the presented coverages/deductibles. Also, as mentioned earlier, helpful tips 1533 and 1535 may be placed strategically throughout screen 1500. In addition, notes section 1523 from FIG. 15*b* may also extend into FIG. 15*c*.

Lower section 1503 of screen 1500 may include a section 1537 that includes details about options for bundling the presented insurance product/plan with other insurance products/plans to realize additional savings. Finally, section 1503 may include a disclaimer section 1539 for additional disclaimers about the insurance options presented.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method comprising:
   (a) receiving data from an insurance consumer at a server;
   (b) searching at least one first database to retrieve additional information about the insurance consumer;
   (c) using a processor, compiling the data with the additional information to determine a first plurality of attributes of the insurance consumer;
   (d) accessing at least one second database storing information about a plurality of customers associated with a second plurality of attributes and a plurality of insurance features;
   (e) using a processor, determining a plurality of features preferred by a subset of the plurality of customers, wherein the subset of the plurality of customers is based on at least one match between at least one of the first plurality of attributes associated with the insurance consumer and at least one of the second plurality of attributes associated with at least one of the plurality of customers;
   (f) using a processor and based on the determination, presenting a description of how the at least one of the first plurality of attributes associated with the insurance consumer matches with the at least one of the second plurality of attributes associated with at least one of the plurality of customers and further presenting at least one of the plurality of insurance features preferred by the subset of the plurality of customers; and
   (g) using a processor and based on receiving a selection from the insurance consumer, generating web analytics tags comprising performance data associated with the description.

2. The method of claim 1, wherein the data include a name, address, social security number, and driver's license number associated with the insurance consumer.

3. The method of claim 1, wherein the at least one first database includes credit services databases, vehicle information databases, and demographics databases.

4. The method of claim 1, wherein the first plurality of attributes include age, gender, and marital status of the insurance consumer.

5. The method of claim 1, wherein the first plurality of attributes include model year, category, list price, ownership status, and use related to a vehicle operated by the insurance consumer.

6. The method of claim 1, further comprising: using a processor, generating at least one question for the insurance consumer for display of trade-off insurance options.

7. The method of claim 6, wherein the trade-off insurance options are based on varying levels of cost and coverage.

8. The method of claim 6, further comprising: using a processor, customizing the presentation based on answers to the at least one question.

9. The method of claim 1, further comprising: accessing a social network of the insurance consumer.

10. The method of claim 1, wherein the processor in step (c) is the same as the processor in step (e).

11. A non-transitory computer-readable storage medium having computer-executable program instructions stored thereon that when executed by a processor, cause the processor to perform steps comprising:
    (i) receiving identifying information from an insurance consumer;
    (ii) based on the identifying information, accessing a first plurality of databases for additional information about the insurance consumer;
    (iii) based on the identifying information and the additional information, determining a first plurality of attributes of the insurance consumer;
    (iv) accessing a second plurality of databases storing information about a plurality of customers associated with a second plurality of attributes and a plurality of insurance features;
    (v) determining a portion of the plurality of customers based on at least one of the second plurality of attributes matching the first plurality of attributes;
    (vi) determining at least one preferred insurance feature of the plurality of insurance features associated with the portion of the plurality of customers;
    (vii) presenting the at least one preferred insurance feature and a description of how the at least one of the second plurality of attributes matches the first plurality of attributes; and
    (viii) generating, based on receiving a selection from the insurance consumer, web analytics tags comprising performance data associated with the at least one preferred insurance feature.

12. The non-transitory computer-readable storage medium of claim 11, wherein the processor further performs: accessing a social network associated with the insurance consumer.

13. The non-transitory computer-readable storage medium of claim 12, wherein the presentation is further based on insurance products preferred by members of the social network.

14. The non-transitory computer-readable storage medium of claim 11, wherein the first plurality of attributes includes a life-phase scenario associated with the insurance consumer.

15. The non-transitory computer-readable storage medium of claim 14, wherein the life-phase scenario is chosen from the group consisting of: college graduate, newly married, first child, retired, death in family, and death of spouse.

16. The non-transitory computer-readable storage medium of claim 11, wherein the at least one of the plurality of insurance features relates to more than one type of insurance.

17. The non-transitory computer-readable storage medium of claim 11, further comprising: modifying the presentation based on answers to at least one question for determining a trade-off scenario for the insurance consumer.

18. An apparatus comprising:
a processor; and
a memory storing computer-readable instructions that, when executed by the processor, cause the apparatus at least to perform:
receiving data from an insurance consumer;
based on the received data, generating a plurality of questions to be answered by the insurance consumer;
receiving a plurality of answers to the plurality of questions;
determining a set of current customers that is similar to the insurance consumer based on the received data and the plurality of answers matching at least one answer provided by the set of current customers;
analyzing a plurality of insurance features preferred by the set of current customers;
based on the analysis, presenting at least one of the plurality of insurance features to the insurance consumer and a description of an association of the plurality of insurance features, the received data, and the plurality of answers matching the at least one answer provided by the set of current customers; and
generating, based on receiving a selection from the insurance consumer, web analytics tags comprising performance data associated with the at least one of the plurality of insurance features.

19. The apparatus of claim 18, wherein the plurality of questions relate to a level of risk tolerance preferred by the insurance consumer, value of assets that the insurance consumer seeks to protect, a willingness by the insurance consumer to pay more for a lower deductible, and a desire by the insurance consumer for predictable out-of-pocket expenses.

20. The apparatus of claim 18, wherein the processor further performs: analyzing feedback received by the insurance consumer to modify the plurality of questions.

21. The apparatus of claim 18, wherein the set of the current customers has similar need states to the insurance consumer.

* * * * *